US012619833B2

(12) United States Patent
Grinberg et al.

(10) Patent No.: US 12,619,833 B2
(45) Date of Patent: May 5, 2026

(54) DIGITAL PROCESSING SYSTEMS AND METHODS FOR IMPLEMENTING AND MANAGING ARTIFICIAL INTELLIGENCE FUNCTIONALITIES IN APPLICATIONS

(71) Applicant: MONDAY.COM LTD., Tel Aviv (IL)

(72) Inventors: Nadav Grinberg, Haifa (IL); Etay Liberman, Tel Aviv (IL); Vlad Mystetskyi, Petah Tikva (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 18/400,839

(22) Filed: Dec. 29, 2023

(65) Prior Publication Data

US 2025/0061285 A1     Feb. 20, 2025

Related U.S. Application Data

(63) Continuation of application No. PCT/IB2023/061992, filed on Nov. 28, 2023.

(Continued)

(51) Int. Cl.
*G06F 40/40*          (2020.01)
*G06F 9/445*          (2018.01)
(Continued)

(52) U.S. Cl.
CPC .......... *G06F 40/40* (2020.01); *G06F 9/44526* (2013.01); *G06F 16/9035* (2019.01); *G06Q 10/06393* (2013.01); *H04L 67/1001* (2022.05)

(58) Field of Classification Search
CPC ............................. G06F 40/40; G06F 16/9035
(Continued)

(56) References Cited

U.S. PATENT DOCUMENTS 4,972,314 A    11/1990  Getzinger et al.
5,220,657 A     6/1993  Bly et al.
(Continued)

FOREIGN PATENT DOCUMENTS

CA        2828011 A1    9/2012
CN      103064833 A     4/2013
(Continued)

OTHER PUBLICATIONS

Abor Jr, C., "Low-Code and No-Code AI: New AI Development—What is code anymore ?!?!" (as retrieved from https://www.linkedin.com/pulse/ low-code-no-code-ai-new-development-what-code-anymore-c-I-abor-jr); Jul. 15, 2023 (Year: 2023).
(Continued)

*Primary Examiner* — Thierry L Pham
(74) *Attorney, Agent, or Firm* — Finnegan, Henderson, Farabow, Garrett & Dunner LLP

(57) ABSTRACT

Systems and methods are disclosed for selection operations for improving quality of Artificial Intelligence responses. The operations include accessing an application that employs AI functionality, receiving from a user, via the application, a query for which a response is sought from an AI agent, analyzing the query for determining a context, based on the context, selecting a particular AI agent from a pool of a plurality of AI agents, to which the query should be sent for response, and directing the query to the selected AI agent.

26 Claims, 14 Drawing Sheets

Related U.S. Application Data

(60) Provisional application No. 63/519,519, filed on Aug. 14, 2023.

(51) Int. Cl.
| | |
|---|---|
| *G06F 16/9035* | (2019.01) |
| *G06Q 10/0639* | (2023.01) |
| *H04L 67/1001* | (2022.01) |

(58) Field of Classification Search
USPC .............................................. 704/9
See application file for complete search history.

(56) References Cited

U.S. PATENT DOCUMENTS

| | | |
|---|---|---|
| 5,479,602 A | 12/1995 | Baecker et al. |
| 5,517,663 A | 5/1996 | Kahn |
| 5,632,009 A | 5/1997 | Rao et al. |
| 5,657,437 A | 8/1997 | Bishop et al. |
| 5,682,469 A | 10/1997 | Linnett et al. |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,438 A | 1/2000 | Wakayama |
| 6,016,553 A | 1/2000 | Schneider et al. |
| 6,023,695 A | 2/2000 | Osborn et al. |
| 6,034,681 A | 3/2000 | Miller et al. |
| 6,049,622 A | 4/2000 | Robb et al. |
| 6,088,707 A | 7/2000 | Bates et al. |
| 6,108,573 A | 8/2000 | Debbins et al. |
| 6,111,573 A | 8/2000 | Mccomb et al. |
| 6,157,381 A | 12/2000 | Bates et al. |
| 6,167,405 A | 12/2000 | Rosensteel et al. |
| 6,169,534 B1 | 1/2001 | Raffel et al. |
| 6,182,127 B1 | 1/2001 | Cronin, III et al. |
| 6,185,582 B1 | 2/2001 | Zellweger et al. |
| 6,195,794 B1 | 2/2001 | Buxton |
| 6,252,594 B1 | 6/2001 | Xia et al. |
| 6,266,067 B1 | 7/2001 | Owen et al. |
| 6,275,809 B1 | 8/2001 | Tamaki et al. |
| 6,330,022 B1 | 12/2001 | Seligmann |
| 6,377,965 B1 | 4/2002 | Fries et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,510,459 B2 | 1/2003 | Cronin et al. |
| 6,522,347 B1 | 2/2003 | Tsuji et al. |
| 6,527,556 B1 | 3/2003 | Koskinen |
| 6,567,830 B1 | 5/2003 | Madduri |
| 6,606,740 B1 | 8/2003 | Lynn et al. |
| 6,626,959 B1 | 9/2003 | Moise et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 6,988,248 B1 | 1/2006 | Tang et al. |
| 7,027,997 B1 | 4/2006 | Robinson et al. |
| 7,034,860 B2 | 4/2006 | Lia et al. |
| 7,043,529 B1 | 5/2006 | Simonoff |
| 7,054,891 B2 | 5/2006 | Cole |
| 7,228,492 B1 | 6/2007 | Graham |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,380,202 B1 | 5/2008 | Lindhorst et al. |
| 7,383,320 B1 | 6/2008 | Silberstein et al. |
| 7,389,473 B1 | 6/2008 | Sawicki et al. |
| 7,415,664 B2 | 8/2008 | Aureglia et al. |
| 7,417,644 B2 | 8/2008 | Cooper et al. |
| 7,461,077 B1 | 12/2008 | Greenwood |
| 7,489,976 B2 | 2/2009 | Adra |
| 7,565,270 B2 | 7/2009 | Bramwell et al. |
| 7,617,443 B2 | 11/2009 | Mills et al. |
| 7,685,152 B2 | 3/2010 | Chivukula et al. |
| 7,707,514 B2 | 4/2010 | Forstall et al. |
| 7,710,290 B2 | 5/2010 | Johnson |
| 7,747,782 B2 | 6/2010 | Hunt et al. |
| 7,770,100 B2 | 8/2010 | Chamberlain et al. |
| 7,827,476 B1 | 11/2010 | Roberts et al. |
| 7,827,615 B1 | 11/2010 | Allababidi et al. |
| 7,836,408 B1 | 11/2010 | Ollmann et al. |
| 7,916,157 B1 | 3/2011 | Kelley et al. |
| 7,921,360 B1 | 4/2011 | Sundermeyer et al. |
| 7,933,952 B2 | 4/2011 | Parker et al. |
| 7,945,622 B1 | 5/2011 | Pegg |
| 7,954,043 B2 | 5/2011 | Bera |
| 7,954,064 B2 | 5/2011 | Forstall et al. |
| 8,046,703 B2 | 10/2011 | Busch et al. |
| 8,060,518 B2 | 11/2011 | Timmons |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,407,217 B1 | 3/2013 | Zhang |
| 8,413,261 B2 | 4/2013 | Nemoy et al. |
| 8,423,909 B2 | 4/2013 | Zabielski |
| 8,543,566 B2 | 9/2013 | Weissman et al. |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,621,652 B2 | 12/2013 | Slater |
| 8,635,520 B2 | 1/2014 | Christiansen et al. |
| 8,677,448 B1 | 3/2014 | Kauffman et al. |
| 8,719,071 B2 | 5/2014 | Macintyre et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,825,758 B2 | 9/2014 | Bailor et al. |
| 8,838,533 B2 | 9/2014 | Kwiatkowski et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,021,118 B2 | 4/2015 | John et al. |
| 9,026,897 B2 | 5/2015 | Zarras |
| 9,043,362 B2 | 5/2015 | Weissman et al. |
| 9,063,958 B2 | 6/2015 | Müller et al. |
| 9,129,234 B2 | 9/2015 | Campbell et al. |
| 9,159,246 B2 | 10/2015 | Rodriguez et al. |
| 9,172,738 B1 | 10/2015 | daCosta |
| 9,177,238 B2 | 11/2015 | Windmueller et al. |
| 9,183,303 B1 | 11/2015 | Goel et al. |
| 9,223,770 B1 | 12/2015 | Ledet |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,286,475 B2 | 3/2016 | Li et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,424,545 B1 | 8/2016 | Lee |

(56) References Cited

U.S. PATENT DOCUMENTS

| | | | |
|---|---|---|---|
| 9,430,458 | B2 | 8/2016 | Rhee et al. |
| 9,449,031 | B2 | 9/2016 | Barrus et al. |
| 9,495,386 | B2 | 11/2016 | Tapley et al. |
| 9,519,699 | B1 | 12/2016 | Kulkarni et al. |
| 9,558,172 | B2 | 1/2017 | Rampson et al. |
| 9,569,511 | B2 | 2/2017 | Morin |
| 9,613,086 | B1 | 4/2017 | Sherman |
| 9,635,091 | B1 | 4/2017 | Laukkanen et al. |
| 9,659,284 | B1 | 5/2017 | Wilson et al. |
| 9,679,456 | B2 | 6/2017 | East |
| 9,720,602 | B1 | 8/2017 | Chen et al. |
| 9,727,376 | B1 | 8/2017 | Bills et al. |
| 9,760,271 | B2 | 9/2017 | Persaud |
| 9,794,256 | B2 | 10/2017 | Kiang et al. |
| 9,798,829 | B1 | 10/2017 | Baisley |
| 9,811,676 | B1 | 11/2017 | Gauvin |
| 9,866,561 | B2 | 1/2018 | Psenka et al. |
| 9,870,136 | B2 | 1/2018 | Pourshahid |
| 10,001,908 | B2 | 6/2018 | Grieve et al. |
| 10,043,296 | B2 | 8/2018 | Li |
| 10,067,928 | B1 | 9/2018 | Krappe |
| 10,078,668 | B1 | 9/2018 | Woodrow et al. |
| 10,169,306 | B2 | 1/2019 | O'Shaughnessy et al. |
| 10,176,154 | B2 | 1/2019 | Ben-Aharon et al. |
| 10,235,441 | B1 | 3/2019 | Makhlin et al. |
| 10,255,609 | B2 | 4/2019 | Kinkead et al. |
| 10,282,405 | B1 | 5/2019 | Silk et al. |
| 10,282,406 | B2 | 5/2019 | Bissantz |
| 10,311,080 | B2 | 6/2019 | Folting et al. |
| 10,318,624 | B1 | 6/2019 | Rosner et al. |
| 10,327,712 | B2 | 6/2019 | Beymer et al. |
| 10,347,017 | B2 | 7/2019 | Ruble et al. |
| 10,372,706 | B2 | 8/2019 | Chavan et al. |
| 10,380,140 | B2 | 8/2019 | Sherman |
| 10,423,758 | B2 | 9/2019 | Kido et al. |
| 10,445,702 | B1 | 10/2019 | Hunt |
| 10,452,360 | B1 | 10/2019 | Burman et al. |
| 10,453,118 | B2 | 10/2019 | Smith et al. |
| 10,474,317 | B2 | 11/2019 | Ramanathan et al. |
| 10,489,391 | B1 | 11/2019 | Tomlin |
| 10,489,462 | B1 | 11/2019 | Rogynskyy et al. |
| 10,496,737 | B1 | 12/2019 | Sayre et al. |
| 10,505,825 | B1 | 12/2019 | Bettaiah et al. |
| 10,528,599 | B1 | 1/2020 | Pandis et al. |
| 10,534,507 | B1 | 1/2020 | Laukkanen et al. |
| 10,540,152 | B1 | 1/2020 | Krishnaswamy et al. |
| 10,540,434 | B2 | 1/2020 | Migeon et al. |
| 10,546,001 | B1 | 1/2020 | Nguyen et al. |
| 10,564,622 | B1 | 2/2020 | Dean et al. |
| 10,573,407 | B2 | 2/2020 | Ginsburg |
| 10,579,724 | B2 | 3/2020 | Campbell et al. |
| 10,587,714 | B1 | 3/2020 | Kulkarni et al. |
| 10,628,002 | B1 | 4/2020 | Kang et al. |
| 10,649,739 | B2 | 5/2020 | Burges et al. |
| 10,698,594 | B2 | 6/2020 | Sanches et al. |
| 10,706,061 | B2 | 7/2020 | Sherman et al. |
| 10,719,220 | B2 | 7/2020 | Ouellet et al. |
| 10,733,256 | B2 | 8/2020 | Fickenscher et al. |
| 10,740,117 | B2 | 8/2020 | Ording et al. |
| 10,747,764 | B1 | 8/2020 | Plenderleith |
| 10,747,950 | B2 | 8/2020 | Dang et al. |
| 10,748,312 | B2 | 8/2020 | Ruble et al. |
| 10,754,688 | B2 | 8/2020 | Powell |
| 10,761,691 | B2 | 9/2020 | Anzures et al. |
| 10,795,555 | B2 | 10/2020 | Burke et al. |
| 10,809,696 | B1 | 10/2020 | Principato |
| 10,817,660 | B2 | 10/2020 | Rampson et al. |
| D910,077 | S | 2/2021 | Naroshevitch et al. |
| 10,963,578 | B2 | 3/2021 | More et al. |
| 11,010,371 | B1 | 5/2021 | Slomka et al. |
| 11,030,259 | B2 | 6/2021 | Mullins et al. |
| 11,042,363 | B1 | 6/2021 | Krishnaswamy et al. |
| 11,042,699 | B1 | 6/2021 | Sayre et al. |
| 11,048,714 | B2 | 6/2021 | Sherman et al. |
| 11,086,894 | B1 | 8/2021 | Srivastava et al. |
| 11,144,854 | B1 | 10/2021 | Mouawad |
| 11,222,167 | B2 | 1/2022 | Gehrmann et al. |
| 11,243,688 | B1 | 2/2022 | Remy et al. |
| 11,429,384 | B1 | 8/2022 | Navert et al. |
| 11,443,390 | B1 | 9/2022 | Caligaris et al. |
| 11,570,182 | B1 | 1/2023 | Tran et al. |
| 11,620,615 | B2 | 4/2023 | Jiang et al. |
| 11,682,091 | B2 | 6/2023 | Sukman et al. |
| 2001/0008998 | A1 | 7/2001 | Tamaki et al. |
| 2001/0032248 | A1 | 10/2001 | Krafchin |
| 2001/0039551 | A1 | 11/2001 | Saito et al. |
| 2002/0002459 | A1 | 1/2002 | Lewis et al. |
| 2002/0065848 | A1 | 5/2002 | Walker et al. |
| 2002/0065849 | A1 | 5/2002 | Ferguson et al. |
| 2002/0065880 | A1 | 5/2002 | Hasegawa et al. |
| 2002/0069207 | A1 | 6/2002 | Alexander et al. |
| 2002/0075309 | A1 | 6/2002 | Michelman et al. |
| 2002/0082892 | A1 | 6/2002 | Raffel et al. |
| 2002/0099777 | A1 | 7/2002 | Gupta et al. |
| 2002/0138528 | A1 | 9/2002 | Gong et al. |
| 2003/0033196 | A1 | 2/2003 | Tomlin |
| 2003/0041113 | A1 | 2/2003 | Larsen |
| 2003/0051377 | A1 | 3/2003 | Chirafesi |
| 2003/0052912 | A1 | 3/2003 | Bowman et al. |
| 2003/0058277 | A1 | 3/2003 | Bowman-Amuah |
| 2003/0065662 | A1 | 4/2003 | Cosic |
| 2003/0093408 | A1 | 5/2003 | Brown et al. |
| 2003/0101416 | A1 | 5/2003 | McInnes et al. |
| 2003/0135558 | A1 | 7/2003 | Bellotti et al. |
| 2003/0137536 | A1 | 7/2003 | Hugh |
| 2003/0187864 | A1 | 10/2003 | McGoveran |
| 2003/0200215 | A1 | 10/2003 | Chen et al. |
| 2003/0204490 | A1 | 10/2003 | Kasriel |
| 2003/0233224 | A1 | 12/2003 | Marchisio et al. |
| 2004/0032432 | A1 | 2/2004 | Baynger |
| 2004/0078373 | A1 | 4/2004 | Ghoneimy et al. |
| 2004/0098284 | A1 | 5/2004 | Petito et al. |
| 2004/0133441 | A1 | 7/2004 | Brady et al. |
| 2004/0138939 | A1 | 7/2004 | Theiler |
| 2004/0139400 | A1 | 7/2004 | Allam et al. |
| 2004/0162833 | A1 | 8/2004 | Jones et al. |
| 2004/0172592 | A1 | 9/2004 | Collie et al. |
| 2004/0212615 | A1 | 10/2004 | Uthe |
| 2004/0215443 | A1 | 10/2004 | Hatton |
| 2004/0230940 | A1 | 11/2004 | Cooper et al. |
| 2004/0268227 | A1 | 12/2004 | Brid |
| 2005/0034058 | A1 | 2/2005 | Mills et al. |
| 2005/0034064 | A1 | 2/2005 | Meyers et al. |
| 2005/0039001 | A1 | 2/2005 | Hudis et al. |
| 2005/0039033 | A1 | 2/2005 | Meyers et al. |
| 2005/0044486 | A1 | 2/2005 | Kotler et al. |
| 2005/0063615 | A1 | 3/2005 | Siegel et al. |
| 2005/0066306 | A1 | 3/2005 | Diab |
| 2005/0086360 | A1 | 4/2005 | Mamou et al. |
| 2005/0091314 | A1 | 4/2005 | Blagsvedt et al. |
| 2005/0091596 | A1 | 4/2005 | Anthony et al. |
| 2005/0096973 | A1 | 5/2005 | Heyse et al. |
| 2005/0114305 | A1 | 5/2005 | Haynes et al. |
| 2005/0125395 | A1 | 6/2005 | Boettiger |
| 2005/0165600 | A1 | 7/2005 | Kasravi et al. |
| 2005/0171881 | A1 | 8/2005 | Ghassemieh et al. |
| 2005/0210371 | A1 | 9/2005 | Pollock et al. |
| 2005/0216830 | A1 | 9/2005 | Turner et al. |
| 2005/0228250 | A1 | 10/2005 | Bitter et al. |
| 2005/0251021 | A1 | 11/2005 | Kaufman et al. |
| 2005/0257204 | A1 | 11/2005 | Bryant et al. |
| 2005/0278297 | A1 | 12/2005 | Nelson |
| 2005/0289170 | A1 | 12/2005 | Brown et al. |
| 2005/0289342 | A1 | 12/2005 | Needham et al. |
| 2005/0289453 | A1 | 12/2005 | Segal et al. |
| 2006/0009960 | A1 | 1/2006 | Valencot et al. |
| 2006/0013462 | A1 | 1/2006 | Sadikall |
| 2006/0015499 | A1 | 1/2006 | Clissold et al. |
| 2006/0015806 | A1 | 1/2006 | Wallace |
| 2006/0031148 | A1 | 2/2006 | O'Dell et al. |
| 2006/0031764 | A1 | 2/2006 | Keyser et al. |
| 2006/0036568 | A1 | 2/2006 | Moore et al. |
| 2006/0047811 | A1 | 3/2006 | Lau et al. |
| 2006/0053096 | A1 | 3/2006 | Subramanian et al. |

(56)     References Cited

U.S. PATENT DOCUMENTS

| | | |
|---|---|---|
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0085744 A1 | 4/2006 | Hays et al. |
| 2006/0090169 A1 | 4/2006 | Daniels et al. |
| 2006/0101324 A1 | 5/2006 | Goldberg et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0129913 A1 | 6/2006 | Vigesaa et al. |
| 2006/0136828 A1 | 6/2006 | Asano |
| 2006/0150090 A1 | 7/2006 | Swamidass |
| 2006/0173908 A1 | 8/2006 | Browning et al. |
| 2006/0190313 A1 | 8/2006 | Lu |
| 2006/0212299 A1 | 9/2006 | Law |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0236246 A1 | 10/2006 | Bono et al. |
| 2006/0250369 A1 | 11/2006 | Keim |
| 2006/0253205 A1 | 11/2006 | Gardiner |
| 2006/0271574 A1 | 11/2006 | Villaron et al. |
| 2006/0287998 A1 | 12/2006 | Folting et al. |
| 2006/0294451 A1 | 12/2006 | Kelkar et al. |
| 2007/0027932 A1 | 2/2007 | Thibeault |
| 2007/0032993 A1 | 2/2007 | Yamaguchi et al. |
| 2007/0033531 A1 | 2/2007 | Marsh |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0092048 A1 | 4/2007 | Chelstrom et al. |
| 2007/0094607 A1 | 4/2007 | Morgan et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0150389 A1 | 6/2007 | Aamodt et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0233647 A1 | 10/2007 | Rawat et al. |
| 2007/0239746 A1 | 10/2007 | Masselle et al. |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034307 A1 | 2/2008 | Cisler et al. |
| 2008/0034314 A1 | 2/2008 | Louch et al. |
| 2008/0052291 A1 | 2/2008 | Bender |
| 2008/0059312 A1 | 3/2008 | Gern et al. |
| 2008/0059539 A1 | 3/2008 | Chin et al. |
| 2008/0065460 A1 | 3/2008 | Raynor |
| 2008/0077530 A1 | 3/2008 | Banas et al. |
| 2008/0097748 A1 | 4/2008 | Haley et al. |
| 2008/0104091 A1 | 5/2008 | Chin |
| 2008/0126389 A1 | 5/2008 | Mush et al. |
| 2008/0133736 A1 | 6/2008 | Wensley et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0183593 A1 | 7/2008 | Dierks |
| 2008/0195948 A1 | 8/2008 | Bauer |
| 2008/0209318 A1 | 8/2008 | Allsop et al. |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0256429 A1 | 10/2008 | Penner et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons et al. |
| 2009/0006171 A1 | 1/2009 | Blatchley et al. |
| 2009/0006283 A1 | 1/2009 | Labrie et al. |
| 2009/0007157 A1 | 1/2009 | Ward et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0043814 A1 | 2/2009 | Faris et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0075694 A1 | 3/2009 | Kim et al. |
| 2009/0077164 A1 | 3/2009 | Phillips et al. |
| 2009/0077217 A1 | 3/2009 | Mcfarland et al. |
| 2009/0083140 A1 | 3/2009 | Phan |
| 2009/0094514 A1 | 4/2009 | Dargahi et al. |
| 2009/0113310 A1 | 4/2009 | Appleyard et al. |
| 2009/0129596 A1 | 5/2009 | Chavez et al. |
| 2009/0132331 A1 | 5/2009 | Cartledge et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0192787 A1 | 7/2009 | Roon |
| 2009/0198715 A1 | 8/2009 | Barbarek |
| 2009/0222760 A1 | 9/2009 | Halverson et al. |
| 2009/0248710 A1 | 10/2009 | McCormack et al. |
| 2009/0256972 A1 | 10/2009 | Ramaswamy et al. |
| 2009/0262690 A1 | 10/2009 | Breuer et al. |
| 2009/0271696 A1 | 10/2009 | Bailor et al. |
| 2009/0276692 A1 | 11/2009 | Rosner |
| 2009/0292690 A1 | 11/2009 | Culbert |
| 2009/0313201 A1 | 12/2009 | Huelsman et al. |
| 2009/0313537 A1 | 12/2009 | Fu et al. |
| 2009/0313570 A1 | 12/2009 | Po |
| 2009/0319623 A1 | 12/2009 | Srinivasan et al. |
| 2009/0319882 A1 | 12/2009 | Morrison et al. |
| 2009/0327240 A1 | 12/2009 | Meehan et al. |
| 2009/0327301 A1 | 12/2009 | Lees et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0031135 A1 | 2/2010 | Naghshin et al. |
| 2010/0070845 A1 | 3/2010 | Facemire et al. |
| 2010/0070895 A1 | 3/2010 | Messer |
| 2010/0082705 A1 | 4/2010 | Ramesh et al. |
| 2010/0083164 A1 | 4/2010 | Martin et al. |
| 2010/0088636 A1 | 4/2010 | Yerkes et al. |
| 2010/0095219 A1 | 4/2010 | Stachowiak et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0205521 A1 | 8/2010 | Folting |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241968 A1 | 9/2010 | Tarara et al. |
| 2010/0241972 A1 | 9/2010 | Spataro et al. |
| 2010/0241990 A1 | 9/2010 | Gabriel et al. |
| 2010/0251090 A1 | 9/2010 | Chamberlain et al. |
| 2010/0251386 A1 | 9/2010 | Gilzean et al. |
| 2010/0257015 A1 | 10/2010 | Molander |
| 2010/0262625 A1 | 10/2010 | Pittenger |
| 2010/0268705 A1 | 10/2010 | Douglas et al. |
| 2010/0268773 A1 | 10/2010 | Hunt et al. |
| 2010/0287163 A1 | 11/2010 | Sridhar et al. |
| 2010/0287221 A1 | 11/2010 | Battepati et al. |
| 2010/0313119 A1 | 12/2010 | Baldwin et al. |
| 2010/0324964 A1 | 12/2010 | Callanan et al. |
| 2010/0332973 A1 | 12/2010 | Kloiber et al. |

(56) References Cited

U.S. PATENT DOCUMENTS

| | | |
|---|---|---|
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0154192 A1 | 6/2011 | Yang et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1 | 8/2011 | Hammond et al. |
| 2011/0219321 A1 | 9/2011 | Gonzalez Veron et al. |
| 2011/0225525 A1 | 9/2011 | Chasman et al. |
| 2011/0231273 A1 | 9/2011 | Buchheit |
| 2011/0238716 A1 | 9/2011 | Amir et al. |
| 2011/0258040 A1 | 10/2011 | Gnanasambandam |
| 2011/0288900 A1 | 11/2011 | McQueen et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036423 A1 | 2/2012 | Haynes et al. |
| 2012/0036462 A1 | 2/2012 | Schwartz et al. |
| 2012/0050802 A1 | 3/2012 | Masuda |
| 2012/0066587 A1 | 3/2012 | Zhou et al. |
| 2012/0072821 A1 | 3/2012 | Bowling |
| 2012/0079408 A1 | 3/2012 | Rohwer |
| 2012/0081762 A1 | 4/2012 | Yamada |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089610 A1 | 4/2012 | Agrawal et al. |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0130907 A1 | 5/2012 | Thompson et al. |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz et al. |
| 2012/0229867 A1 | 9/2012 | Takagi |
| 2012/0233150 A1 | 9/2012 | Naim et al. |
| 2012/0233533 A1 | 9/2012 | Yücel et al. |
| 2012/0234907 A1 | 9/2012 | Clark et al. |
| 2012/0236368 A1 | 9/2012 | Uchida et al. |
| 2012/0239454 A1 | 9/2012 | Taix et al. |
| 2012/0244891 A1 | 9/2012 | Appleton |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0284197 A1 | 11/2012 | Sitrick et al. |
| 2012/0297307 A1 | 11/2012 | Rider et al. |
| 2012/0300931 A1 | 11/2012 | Ollikainen et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2012/0311672 A1 | 12/2012 | Connor et al. |
| 2012/0324348 A1 | 12/2012 | Rounthwaite |
| 2013/0015954 A1 | 1/2013 | Thorne et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024418 A1 | 1/2013 | Sitrick et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0054514 A1 | 2/2013 | Barrett-Kahn et al. |
| 2013/0055113 A1 | 2/2013 | Chazin et al. |
| 2013/0059598 A1 | 3/2013 | Miyagi et al. |
| 2013/0063490 A1 | 3/2013 | Zaman et al. |
| 2013/0086460 A1 | 4/2013 | Folting et al. |
| 2013/0090969 A1 | 4/2013 | Rivere |
| 2013/0097490 A1 | 4/2013 | Kotler et al. |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0179209 A1 | 7/2013 | Milosevich |
| 2013/0211866 A1 | 8/2013 | Gordon et al. |
| 2013/0212197 A1 | 8/2013 | Karlson |
| 2013/0212234 A1 | 8/2013 | Bartlett et al. |
| 2013/0215475 A1 | 8/2013 | Noguchi |
| 2013/0238363 A1 | 9/2013 | Ohta et al. |
| 2013/0238968 A1 | 9/2013 | Barrus |
| 2013/0246384 A1 | 9/2013 | Mctor |
| 2013/0262527 A1 | 10/2013 | Hunter et al. |
| 2013/0268331 A1 | 10/2013 | Bitz et al. |
| 2013/0297468 A1 | 11/2013 | Hirsch et al. |
| 2013/0307997 A1 | 11/2013 | O'Keefe et al. |
| 2013/0318424 A1 | 11/2013 | Boyd |
| 2013/0339051 A1 | 12/2013 | Dobrean |
| 2014/0002863 A1 | 1/2014 | Hasegawa et al. |
| 2014/0006326 A1 | 1/2014 | Bazanov |
| 2014/0012616 A1 | 1/2014 | Moshenek |
| 2014/0019842 A1 | 1/2014 | Montagna et al. |
| 2014/0033307 A1 | 1/2014 | Schmidtler |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0058801 A1 | 2/2014 | Deodhar et al. |
| 2014/0059017 A1 | 2/2014 | Chaney et al. |
| 2014/0068403 A1 | 3/2014 | Bhargav et al. |
| 2014/0074545 A1 | 3/2014 | Minder et al. |
| 2014/0075301 A1 | 3/2014 | Mihara |
| 2014/0078557 A1 | 3/2014 | Hasegawa et al. |
| 2014/0082525 A1 | 3/2014 | Kass et al. |
| 2014/0095237 A1 | 4/2014 | Ehrler et al. |
| 2014/0101527 A1 | 4/2014 | Suciu |
| 2014/0108985 A1 | 4/2014 | Scott et al. |
| 2014/0109012 A1 | 4/2014 | Choudhary et al. |
| 2014/0111516 A1 | 4/2014 | Hall et al. |
| 2014/0115515 A1 | 4/2014 | Adams et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137003 A1 | 5/2014 | Peters et al. |
| 2014/0137144 A1 | 5/2014 | Järvenpää et al. |
| 2014/0172475 A1 | 6/2014 | Olliphant et al. |
| 2014/0173401 A1 | 6/2014 | Oshlag et al. |
| 2014/0181155 A1 | 6/2014 | Homsany |
| 2014/0188748 A1 | 7/2014 | Cavoue et al. |
| 2014/0195933 A1 | 7/2014 | Rao Dv |
| 2014/0214404 A1 | 7/2014 | Kalla et al. |
| 2014/0215303 A1 | 7/2014 | Grigorovitch et al. |
| 2014/0229816 A1 | 8/2014 | Yakub |
| 2014/0240735 A1 | 8/2014 | Salgado |
| 2014/0249877 A1 | 9/2014 | Hull et al. |
| 2014/0257568 A1 | 9/2014 | Czaja et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0280377 A1 | 9/2014 | Frew |
| 2014/0281868 A1 | 9/2014 | Vogel et al. |

(56) References Cited

U.S. PATENT DOCUMENTS

| | | |
|---|---|---|
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck |
| 2014/0310345 A1 | 10/2014 | Megiddo et al. |
| 2014/0324497 A1 | 10/2014 | Verma et al. |
| 2014/0324501 A1 | 10/2014 | Davidow et al. |
| 2014/0325552 A1 | 10/2014 | Evans et al. |
| 2014/0365938 A1 | 12/2014 | Black et al. |
| 2014/0372856 A1 | 12/2014 | Radakovitz et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0035918 A1 | 2/2015 | Matsumoto et al. |
| 2015/0039387 A1 | 2/2015 | Akahoshi et al. |
| 2015/0046209 A1 | 2/2015 | Choe |
| 2015/0067556 A1 | 3/2015 | Tibrewal et al. |
| 2015/0074721 A1 | 3/2015 | Fishman et al. |
| 2015/0074728 A1 | 3/2015 | Chai et al. |
| 2015/0088822 A1 | 3/2015 | Raja et al. |
| 2015/0095752 A1 | 4/2015 | Studer et al. |
| 2015/0106736 A1 | 4/2015 | Torman et al. |
| 2015/0125834 A1 | 5/2015 | Mendoza Tascon |
| 2015/0142676 A1 | 5/2015 | McGinnis et al. |
| 2015/0142829 A1 | 5/2015 | Lee et al. |
| 2015/0153943 A1 | 6/2015 | Wang |
| 2015/0154660 A1 | 6/2015 | Weald et al. |
| 2015/0169514 A1 | 6/2015 | Sah et al. |
| 2015/0169531 A1 | 6/2015 | Campbell et al. |
| 2015/0178657 A1 | 6/2015 | Kleehammer et al. |
| 2015/0188964 A1 | 7/2015 | Sharma et al. |
| 2015/0205830 A1 | 7/2015 | Bastide et al. |
| 2015/0212717 A1 | 7/2015 | Nair et al. |
| 2015/0220491 A1 | 8/2015 | Cochrane et al. |
| 2015/0234887 A1 | 8/2015 | Greene et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0262121 A1 | 9/2015 | Riel-Dalpe et al. |
| 2015/0278699 A1 | 10/2015 | Danielsson |
| 2015/0281292 A1 | 10/2015 | Kim et al. |
| 2015/0295877 A1 | 10/2015 | Roman et al. |
| 2015/0310126 A1 | 10/2015 | Steiner et al. |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370776 A1 | 12/2015 | New |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2015/0379472 A1 | 12/2015 | Gilmour et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0035546 A1 | 2/2016 | Platt et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0068960 A1 | 3/2016 | Jung et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0098574 A1 | 4/2016 | Bargagni |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0196310 A1 | 7/2016 | Dutta |
| 2016/0210572 A1 | 7/2016 | Shaaban et al. |
| 2016/0224532 A1 | 8/2016 | Miller et al. |
| 2016/0224676 A1 | 8/2016 | Miller et al. |
| 2016/0224939 A1 | 8/2016 | Chen et al. |
| 2016/0231915 A1 | 8/2016 | Nhan et al. |
| 2016/0232489 A1 | 8/2016 | Skaaksrud |
| 2016/0246490 A1 | 8/2016 | Cabral |
| 2016/0253982 A1 | 9/2016 | Cheung et al. |
| 2016/0259856 A1 | 9/2016 | Ananthapur Bache et al. |
| 2016/0275150 A1 | 9/2016 | Bourbonnais et al. |
| 2016/0292206 A1 | 10/2016 | Ruiz Velazquez et al. |
| 2016/0299655 A1 | 10/2016 | Migos et al. |
| 2016/0308963 A1 | 10/2016 | Kung |
| 2016/0321235 A1 | 11/2016 | He et al. |
| 2016/0321604 A1 | 11/2016 | Imaeda et al. |
| 2016/0335302 A1 | 11/2016 | Wright et al. |
| 2016/0335303 A1 | 11/2016 | Madhalam et al. |
| 2016/0335604 A1 | 11/2016 | Reminick et al. |
| 2016/0335731 A1 | 11/2016 | Hall |
| 2016/0335903 A1 | 11/2016 | Mendoza Tascon |
| 2016/0344828 A1 | 11/2016 | Häusler et al. |
| 2016/0350950 A1 | 12/2016 | Ritchie et al. |
| 2016/0381099 A1 | 12/2016 | Keslin et al. |
| 2017/0017779 A1 | 1/2017 | Huang et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0061820 A1 | 3/2017 | Firoozbakhsh |
| 2017/0063722 A1 | 3/2017 | Cropper et al. |
| 2017/0075557 A1 | 3/2017 | Noble et al. |
| 2017/0076101 A1 | 3/2017 | Kochhar et al. |
| 2017/0090734 A1 | 3/2017 | Fitzpatrick |
| 2017/0090736 A1 | 3/2017 | King et al. |
| 2017/0091337 A1 | 3/2017 | Patterson |
| 2017/0093876 A1 | 3/2017 | Feng et al. |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0124740 A1 | 5/2017 | Campbell et al. |
| 2017/0126772 A1 | 5/2017 | Campbell et al. |
| 2017/0132296 A1 | 5/2017 | Ding |
| 2017/0132652 A1 | 5/2017 | Kedzlie et al. |
| 2017/0139874 A1 | 5/2017 | Chin |
| 2017/0139884 A1 | 5/2017 | Bendig et al. |
| 2017/0139891 A1 | 5/2017 | Ah-Soon et al. |
| 2017/0139992 A1 | 5/2017 | Morin |
| 2017/0140047 A1 | 5/2017 | Bendig et al. |
| 2017/0140219 A1 | 5/2017 | King et al. |
| 2017/0153771 A1 | 6/2017 | Chu |
| 2017/0161246 A1 | 6/2017 | Klima |
| 2017/0177556 A1 | 6/2017 | Fay et al. |
| 2017/0177888 A1 | 6/2017 | Arora et al. |
| 2017/0185575 A1 | 6/2017 | Sood et al. |
| 2017/0185668 A1 | 6/2017 | Convertino et al. |
| 2017/0200122 A1 | 7/2017 | Edson et al. |
| 2017/0206366 A1 | 7/2017 | Fay et al. |
| 2017/0212924 A1 | 7/2017 | Semlani et al. |
| 2017/0220813 A1 | 8/2017 | Mullins et al. |
| 2017/0221072 A1 | 8/2017 | AthuluruTIrumala et al. |
| 2017/0228421 A1 | 8/2017 | Sharma et al. |
| 2017/0228445 A1 | 8/2017 | Chiu et al. |
| 2017/0228460 A1 | 8/2017 | Amel et al. |
| 2017/0229152 A1 | 8/2017 | Loganathan et al. |
| 2017/0236081 A1 | 8/2017 | Grady Smith et al. |
| 2017/0242921 A1 | 8/2017 | Rota |
| 2017/0257517 A1 | 9/2017 | Panda |
| 2017/0262786 A1 | 9/2017 | Khasis |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0277620 A1 | 9/2017 | Kadioglu |
| 2017/0277669 A1 | 9/2017 | Sekharan |
| 2017/0285879 A1 | 10/2017 | Pilkington et al. |
| 2017/0285890 A1 | 10/2017 | Dolman |
| 2017/0289619 A1 | 10/2017 | Xu et al. |
| 2017/0300039 A1 | 10/2017 | Dyer et al. |
| 2017/0315683 A1 | 11/2017 | Boucher et al. |

(56) References Cited

U.S. PATENT DOCUMENTS

| | | |
|---|---|---|
| 2017/0315974 A1 | 11/2017 | Kong et al. |
| 2017/0315979 A1 | 11/2017 | Boucher et al. |
| 2017/0322963 A1 | 11/2017 | Ramamurthi et al. |
| 2017/0324692 A1 | 11/2017 | Zhou |
| 2017/0329479 A1 | 11/2017 | Rauschenbach et al. |
| 2017/0351252 A1 | 12/2017 | Kleifges et al. |
| 2017/0372442 A1 | 12/2017 | Mejias |
| 2017/0374205 A1 | 12/2017 | Panda |
| 2018/0011827 A1 | 1/2018 | Avery et al. |
| 2018/0025084 A1 | 1/2018 | Conlan et al. |
| 2018/0026954 A1 | 1/2018 | Toepke et al. |
| 2018/0032492 A1 | 2/2018 | Altshuller et al. |
| 2018/0032570 A1 | 2/2018 | Miller et al. |
| 2018/0039651 A1 | 2/2018 | Tobin et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081505 A1 | 3/2018 | Ron et al. |
| 2018/0081863 A1 | 3/2018 | Bathla |
| 2018/0081868 A1 | 3/2018 | Willcock et al. |
| 2018/0088753 A1 | 3/2018 | Viégas et al. |
| 2018/0088989 A1 | 3/2018 | Nield et al. |
| 2018/0089299 A1 | 3/2018 | Collins et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0121028 A1 | 5/2018 | Kuscher et al. |
| 2018/0121994 A1 | 5/2018 | Matsunaga et al. |
| 2018/0128636 A1 | 5/2018 | Zhou |
| 2018/0129651 A1 | 5/2018 | Latvala et al. |
| 2018/0143967 A1 | 5/2018 | Anbazhagan et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0157633 A1 | 6/2018 | He et al. |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0189734 A1 | 7/2018 | Newhouse et al. |
| 2018/0210936 A1 | 7/2018 | Reynolds et al. |
| 2018/0225270 A1 | 8/2018 | Bhide et al. |
| 2018/0260371 A1 | 9/2018 | Theodore et al. |
| 2018/0260435 A1 | 9/2018 | Xu |
| 2018/0262705 A1 | 9/2018 | Park et al. |
| 2018/0276417 A1 | 9/2018 | Cerezo Sanchez |
| 2018/0285918 A1 | 10/2018 | Staggs |
| 2018/0293217 A1 | 10/2018 | Callaghan |
| 2018/0293587 A1 | 10/2018 | Oda |
| 2018/0293669 A1 | 10/2018 | Jackson et al. |
| 2018/0329930 A1 | 11/2018 | Eberlein et al. |
| 2018/0330320 A1 | 11/2018 | Kohli |
| 2018/0357047 A1 | 12/2018 | Brown et al. |
| 2018/0357305 A1 | 12/2018 | Kinast et al. |
| 2018/0365429 A1 | 12/2018 | Segal |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2018/0374479 A1 | 12/2018 | Hall et al. |
| 2019/0005094 A1 | 1/2019 | Yi et al. |
| 2019/0011310 A1 | 1/2019 | Turnbull et al. |
| 2019/0012342 A1 | 1/2019 | Cohn |
| 2019/0034395 A1 | 1/2019 | Curry et al. |
| 2019/0036989 A1 | 1/2019 | Eirinberg et al. |
| 2019/0042628 A1 | 2/2019 | Rajpara |
| 2019/0050445 A1 | 2/2019 | Griffith et al. |
| 2019/0050466 A1 | 2/2019 | Kim et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0068703 A1 | 2/2019 | Vora et al. |
| 2019/0073350 A1 | 3/2019 | Shiotani |
| 2019/0095413 A1 | 3/2019 | Davis et al. |
| 2019/0097909 A1 | 3/2019 | Puri et al. |
| 2019/0108046 A1 | 4/2019 | Spencer-Harper et al. |
| 2019/0113935 A1 | 4/2019 | Kuo et al. |
| 2019/0114308 A1 | 4/2019 | Hancock |
| 2019/0114589 A1 | 4/2019 | Voss et al. |
| 2019/0123924 A1 | 4/2019 | Embiricos et al. |
| 2019/0130413 A1 | 5/2019 | Nelson et al. |
| 2019/0130611 A1 | 5/2019 | Black et al. |
| 2019/0138583 A1 | 5/2019 | Silk et al. |
| 2019/0138588 A1 | 5/2019 | Silk et al. |
| 2019/0138653 A1 | 5/2019 | Roller et al. |
| 2019/0147030 A1 | 5/2019 | Stein et al. |
| 2019/0155821 A1 | 5/2019 | Dirisala |
| 2019/0179501 A1 | 6/2019 | Seeley et al. |
| 2019/0199823 A1 | 6/2019 | Underwood et al. |
| 2019/0208058 A1 | 7/2019 | Dvorkin et al. |
| 2019/0213557 A1 | 7/2019 | Dotan-Cohen et al. |
| 2019/0220161 A1 | 7/2019 | Loftus et al. |
| 2019/0236188 A1 | 8/2019 | McKenna |
| 2019/0238636 A1 | 8/2019 | Li et al. |
| 2019/0243879 A1 | 8/2019 | Harley et al. |
| 2019/0251884 A1 | 8/2019 | Burns et al. |
| 2019/0258461 A1 | 8/2019 | Li et al. |
| 2019/0258706 A1 | 8/2019 | Li et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0325012 A1 | 10/2019 | Delaney et al. |
| 2019/0327294 A1 | 10/2019 | Subramani Nadar et al. |
| 2019/0340550 A1 | 11/2019 | Denger et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2019/0377791 A1 | 12/2019 | Abou Mahmoud et al. |
| 2019/0391707 A1 | 12/2019 | Ristow et al. |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0019548 A1 | 1/2020 | Agnew et al. |
| 2020/0019595 A1 | 1/2020 | Azua Garcia |
| 2020/0026352 A1 | 1/2020 | Wang et al. |
| 2020/0026397 A1 | 1/2020 | Wohlstadter et al. |
| 2020/0042648 A1 | 2/2020 | Rao |
| 2020/0050696 A1 | 2/2020 | Mowatt et al. |
| 2020/0053176 A1 | 2/2020 | Jimenez Salgado et al. |
| 2020/0125574 A1 | 4/2020 | Ghoshal et al. |
| 2020/0134002 A1 | 4/2020 | Tung et al. |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0175094 A1 | 6/2020 | Palmer |
| 2020/0176089 A1 | 6/2020 | Jones et al. |
| 2020/0192785 A1 | 6/2020 | Chen |
| 2020/0193388 A1 | 6/2020 | Tran-Kiem et al. |
| 2020/0247661 A1 | 8/2020 | Rao et al. |
| 2020/0265112 A1 | 8/2020 | Fox et al. |
| 2020/0279315 A1 | 9/2020 | Manggala |
| 2020/0293616 A1 | 9/2020 | Nelson et al. |
| 2020/0301678 A1 | 9/2020 | Burman et al. |
| 2020/0301902 A1 | 9/2020 | Maloy et al. |
| 2020/0310835 A1 | 10/2020 | Momchilov |
| 2020/0310888 A1 | 10/2020 | Gopalan et al. |
| 2020/0326824 A1 | 10/2020 | Magahern et al. |
| 2020/0327244 A1 | 10/2020 | Blass et al. |
| 2020/0334019 A1 | 10/2020 | Bosworth et al. |
| 2020/0348809 A1 | 11/2020 | Drescher |
| 2020/0349320 A1 | 11/2020 | Owens |
| 2020/0356740 A1 | 11/2020 | Principato |
| 2020/0356873 A1 | 11/2020 | Nawrocke et al. |
| 2020/0372055 A1* | 11/2020 | Joko ..................... G06F 40/268 |
| 2020/0374146 A1 | 11/2020 | Chhabra et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2020/0409949 A1 | 12/2020 | Saxena et al. |
| 2020/0410395 A1 | 12/2020 | Ray et al. |
| 2021/0014136 A1 | 1/2021 | Rath |

(56) References Cited

U.S. PATENT DOCUMENTS

| | | |
|---|---|---|
| 2021/0019287 A1 | 1/2021 | Prasad et al. |
| 2021/0021603 A1 | 1/2021 | Gibbons |
| 2021/0034058 A1 | 2/2021 | Subramanian et al. |
| 2021/0035069 A1 | 2/2021 | Parikh |
| 2021/0042796 A1 | 2/2021 | Khoury et al. |
| 2021/0049524 A1 | 2/2021 | Nachum et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0065203 A1 | 3/2021 | Billigmeier et al. |
| 2021/0072883 A1 | 3/2021 | Migunova et al. |
| 2021/0073526 A1 | 3/2021 | Zeng et al. |
| 2021/0084120 A1 | 3/2021 | Fisher et al. |
| 2021/0117864 A1 | 4/2021 | Weast et al. |
| 2021/0117893 A1 | 4/2021 | Sohum et al. |
| 2021/0124749 A1 | 4/2021 | Suzuki et al. |
| 2021/0124872 A1 | 4/2021 | Lereya |
| 2021/0136027 A1 | 5/2021 | Barbitta et al. |
| 2021/0149553 A1 | 5/2021 | Lereya et al. |
| 2021/0149688 A1 | 5/2021 | Newell et al. |
| 2021/0149925 A1 | 5/2021 | Mann et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0174006 A1 | 6/2021 | Stokes |
| 2021/0192126 A1 | 6/2021 | Gehrmann et al. |
| 2021/0248311 A1 | 8/2021 | Helft et al. |
| 2021/0257065 A1 | 8/2021 | Mander et al. |
| 2021/0264220 A1 | 8/2021 | Wei et al. |
| 2021/0271726 A1 | 9/2021 | Trainor |
| 2021/0273957 A1 | 9/2021 | Boyer et al. |
| 2021/0304020 A1 | 9/2021 | Kaplan |
| 2021/0326519 A1 | 10/2021 | Lin et al. |
| 2021/0328888 A1 | 10/2021 | Rath |
| 2021/0342785 A1 | 11/2021 | Mann et al. |
| 2021/0365446 A1 | 11/2021 | Srivastava et al. |
| 2021/0374197 A1 | 12/2021 | Chauhan |
| 2021/0397585 A1 | 12/2021 | Seward |
| 2022/0099454 A1 | 3/2022 | Decrop et al. |
| 2022/0103589 A1 | 3/2022 | Shen et al. |
| 2022/0121325 A1 | 4/2022 | Roberts et al. |
| 2022/0121478 A1 | 4/2022 | Chivukula et al. |
| 2022/0221591 A1 | 7/2022 | Smith et al. |
| 2022/0291666 A1 | 9/2022 | Cella et al. |
| 2022/0292180 A1 | 9/2022 | Chauhan |
| 2022/0382522 A1 | 12/2022 | Heynemann Nascentes da Silva et al. |
| 2023/0016946 A1 | 1/2023 | Wouhaybi et al. |
| 2023/0153651 A1 | 5/2023 | Bi et al. |
| 2023/0188516 A1 | 6/2023 | Danilov et al. |
| 2023/0281040 A1 | 9/2023 | Cao |
| 2023/0316382 A1 | 10/2023 | Faricy et al. |
| 2023/0419161 A1 | 12/2023 | Dines |
| 2024/0046142 A1 | 2/2024 | Marks et al. |
| 2024/0053727 A1 | 2/2024 | Timisescu et al. |
| 2024/0283759 A1 | 8/2024 | Adams |
| 2024/0345807 A1 | 10/2024 | Duggal et al. |
| 2024/0361995 A1 | 10/2024 | Somasundaram et al. |
| 2025/0028743 A1 | 1/2025 | Massoudian et al. |

FOREIGN PATENT DOCUMENTS

| | | |
|---|---|---|
| CN | 107123424 A | 9/2017 |
| CN | 107422666 A | 12/2017 |
| CN | 107623596 A | 1/2018 |
| CN | 107885656 A | 4/2018 |
| CN | 108717428 A | 10/2018 |
| CN | 112929172 A | 6/2021 |
| EP | 3443466 B1 | 12/2021 |
| KR | 20150100760 A | 9/2015 |
| KR | 20220016276 A | 2/2022 |
| WO | 2004100015 A2 | 11/2004 |
| WO | 2006116580 A2 | 11/2006 |
| WO | 2008109541 A1 | 9/2008 |
| WO | 2014088393 A1 | 6/2014 |
| WO | 2017202159 A1 | 11/2017 |
| WO | 2018023798 A1 | 2/2018 |
| WO | 2018042424 A1 | 3/2018 |
| WO | 2020139865 A1 | 7/2020 |
| WO | 2020187408 A1 | 9/2020 |
| WO | 2020215123 A1 | 10/2020 |
| WO | 2021096944 A1 | 5/2021 |
| WO | 2021144656 A1 | 7/2021 |
| WO | 2021161104 A1 | 8/2021 |
| WO | 2021183312 A1 | 9/2021 |
| WO | 2021220058 A1 | 11/2021 |
| WO | 2022153122 A1 | 7/2022 |
| WO | 2023186048 A1 | 10/2023 |

OTHER PUBLICATIONS

Anupam et al., "Personalizing the Web Using Site Descriptions", Proceedings of the Tenth International Workshop on Database and Expert Systems Applications, ISBN: 0-7695-0281-4, DOI:10.1109/DEXA.1999.795275, Jan. 1, 1999, pp. 732-738. (Year: 1999).

Aylward, Grant, "Drag-and-Drop AI Enables Digital Workforce Deployment at Scale Share" (as retrieved from https://www.blueprism.com/resources/ blog/drag-and-drop-ai-enables-digital-workforce-deployment-at-scale/); Mar. 19 202 (Year: 2020).

Baarslag, "Negotiation as an Interaction Mechanism for Deciding App Permissions." In Proceedings of the 2016 CHI Conference Extended Abstracts on Human Factors in Computing Systems, pp. 2012-2019. 2016 (Year: 2016).

Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018 (Year: 2018).

Barai et al., "Image Annotation System Using Visual and Textual Features," In: Proceedings of the 16th International Conference on Distributed Multi-media Systems, pp. 289-296 (2010).

Breitgand et al., "Serverless Data Analytics Platform," CloudButton, Feb. 13, 2022, retrieved on [Jan. 14, 2024]. Retrieved from the internet <URL: https://cloudbutton.eu/docs/deliverables/CloudButton_D3.1_Public.pdf> (Year: 2022).

Chen et al., "Artificial Intelligence in Education: A Review," IEEEAccess vol. 8, pp. 75264-75278 (Year: 2020).

D'Alessio et al., Monday.com Walkthrough 2018\All Features, Platforms & Thoughts, Mar. 1, 2018, pp. 1-55 (Year: 2018).

Dapulse.com "features," extracted from web.archive.org/web/2014091818421/https://dapulse.com/features; Sep. 2014 (Year: 2014).

Dapulse.com, "High Level Overview", Extracted from https://web.archive.org/web/20161104170936/https://dapulse.com (Year: 2016).

"demonstracion en espanol de Monday.com," published Feb. 20, 2019. https://www.youtube.com/watch?v=zOgydTgof1A (Year: 2019).

Desmedt et al., "Function-Based Access Control (FBAC) From Access Control Matrix to Access Control Tensor." In Proceedings of the 8th ACM CCS International Workshop on Managing Insider Security Threats, pp. 89-92 (2016).

Donath, "Interfaces Make Meaning" chapter from The Social Machine: Designs for Living Online, pp. 41-76, copyright 2014. (Year: 2014).

Dorn et al., "Efficient Full-Field Vibration Measurements and Operational Modal Analysis Using Neuromorphic Event-Based Imaging," Journal of Engineering Mechanics, vol. 144, No. 7, Jul. 1, 2018 (Year: 2018).

Freund, K., "SiMa.ai Creates Drag-And-Drop Platform For Building AI Workflows" (as retrieved from https://www.forbes.com/sites/karlfreund/2023/09/12/simaai-creates-drag-and-drop-platform-for-building-ai-workflows/?sh=789de8466046); Sep. 12, 2023 (Year: 2023).

Gutwin et al., "Supporting Informal Collaboration in Shared-Workspace Groupware", J. Univers. Comput. Sci., 14(9), 1411-1434 (2008).

Hupfer et al., "Introducing collaboration into an application development environment." In Proceedings of the 2004 ACM conference

(56) References Cited

OTHER PUBLICATIONS on Computer supported cooperative work (CSCW '04). Association for Computing Machinery, New York, NY, USA, pp. 21-24 (Year: 2004).

International Search Report and Written Opinion of the International Search Authority in PCT/IB2020/000024, mailed May 3, 2021 (13 pages).

International Search Report and Written Opinion of the International Search Authority in PCT/IB2020/000658, mailed Nov. 11, 2020 (12 pages).

International Search Report and Written Opinion of the International Search Authority in PCT/IB2020/000974, mailed May 3, 2021 (19 pages).

International Search Report and Written Opinion of the International Search Authority in PCT/IB2021/000090 dated Jul. 27, 2021.

International Search Report and Written Opinion of the International Search Authority in PCT/IB2021/000297, mailed Oct. 12, 2021 (20 pages).

International Search Report and Written Opinion of the International Search Authority in PCT/IB2023/061991, mailed Feb. 26, 2024 (6 pages).

Ionescu et al., "A chat-centric collaborative environment for web-based real-time collaboration," 2015 IEEE 10th Jubilee International Symposium on Applied Computational Intelligence and Informatics, Timisoara, Romania, 2015, pp. 105-110 (Year: 2015).

Kantorovitz, I., "Lexical Analysis Tool," May 2004, [Retrieved on Nov. 19, 2021], Retrieved from the internet: <URL: https://dl.acm.org/doi/pdf/10.1145/997140.997147> pp. 66-74 (Year: 2004).

Kollmann, F., "Realizing Fine-Granular Read and Write Rights on Tree Structured Documents." in The Second International Conference on Availability, Reliability and Security (ARES'07), pp. 517-523. IEEE, 2007. (Year: 2007).

Larson et al., "Introducing Data Mining Concepts Using Microsoft Excel's Table Analysis Tools," Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

List, B., "An Evaluation of Conceptual Business Process Modelling Languages", SAC'06, Apr. 23-27, 2006, pp. 1532-1539 (Year: 2006).

Monday.Com et. al., "Basic Walkthrough", https://www.youtube.com/watch?v=VpbgWyPf74g; Aug. 9, 2019. (Year: 2019).

Pedersen et al., "Tivoli: an electronic whiteboard for informal workgroup meetings," Conference on Human Factors in Computing Systems: Proceedings of the INTERACT '93 and CHI '93 conference on Human factors in computing systems; Apr. 24-29, 1993, pp. 391-398 (Year 1993).

Peltier, J., "Clustered and Stacked col. and Bar Charts", Aug. 2011, Peltier Technical Services, Inc., pp. 1-128; (Year: 2011).

"Pivot table"—Wikipedia; URL: https://en.wikepedia .org/w/index. php?title=Pivottable&oldid=857163289, originally retrieve on Oct. 23, 2019; retrieved on Jul. 16, 2021.

Rodrigo, A., Project Management with Monday.com: a 101 Introduction; Jul. 22, 2019, pp. 1-21, 2019.

ShowMyPC, "Switch Presenter While Using ShowMyPC"; web archive.org; Aug. 20, 2016.

Singh, V., "A Theoretical Framework of a BIM-based Multi-Disciplinary Collaboration Platform", Nov. 5, 2020, Automation in Construction, 20 (2011), pp. 134-144 (Year: 2011).

Sreenath et al., "Agent-based service selection," Journal of Web Semantics 1.3, pp. 261-279 (Year: 2004).

Stancu et al., "SecCollab-Improving Confidentiality for Existing Cloud-Based Collaborative Editors." In 2017 21st International Conferences on Control Systems and Computer Scient (CSCS), pp. 324-331. IEEE,2017. (Year: 2017).

Stohr, E., Workflow Automation: Overview and Research Issues, 2001, Information Systems Frontiers 3:3, pp. 281-296 (Year: 2001).

"Using Filters in Overview," published Mar. 7, 2017. https://www.youtube.com/watch?v=hycANhz7gww (Year: 2017).

Wilson et al., "Beyond Social Graphs: User Interactions in Online Social Networks and their Implications," ACM Transactions on the Web, vol. 6, No. 4, Article 17, Nov. 2012 (Year: 2012).

Zhang et al., "Integrating semantic NLP and logic reasoning into a unified system for fully-automated code checking," Automation in Construction, vol. 73, 2017, pp. 45-57, ISSN 0926-5805, https://doi.org/10.1016/j.autcon.2016.08.027.

Zhenjiang et al., "Asynchronous Event-Based Visual Shape Tracking for Stable Haptic Feedback in Microrobotics," IEEE Transactions on Robotics, IEEE Service Center, Piscataway, NJ, vol. 28, No. 5, Oct. 1, 2012, pp. 1081-1089 (Year: 2012).

Ziheng, G., "Advanced Cyberinfrastructure for Managing Hybrid Geoscientific AI Workflows" (Year: 2019).

International Search Report and Written Opinion in PCT/IB2023/061992, mailed Mar. 19, 2024, 7 pages.

Lins et al., "Artificial Intelligence as a Service," Business & Information Systems Engineering, vol. 63, 2021, pp. 441-456.

Zhang et al. "Artificial intelligence in recommender systems." Complex & intelligent systems 7.1 (2021): 439-457.

* cited by examiner

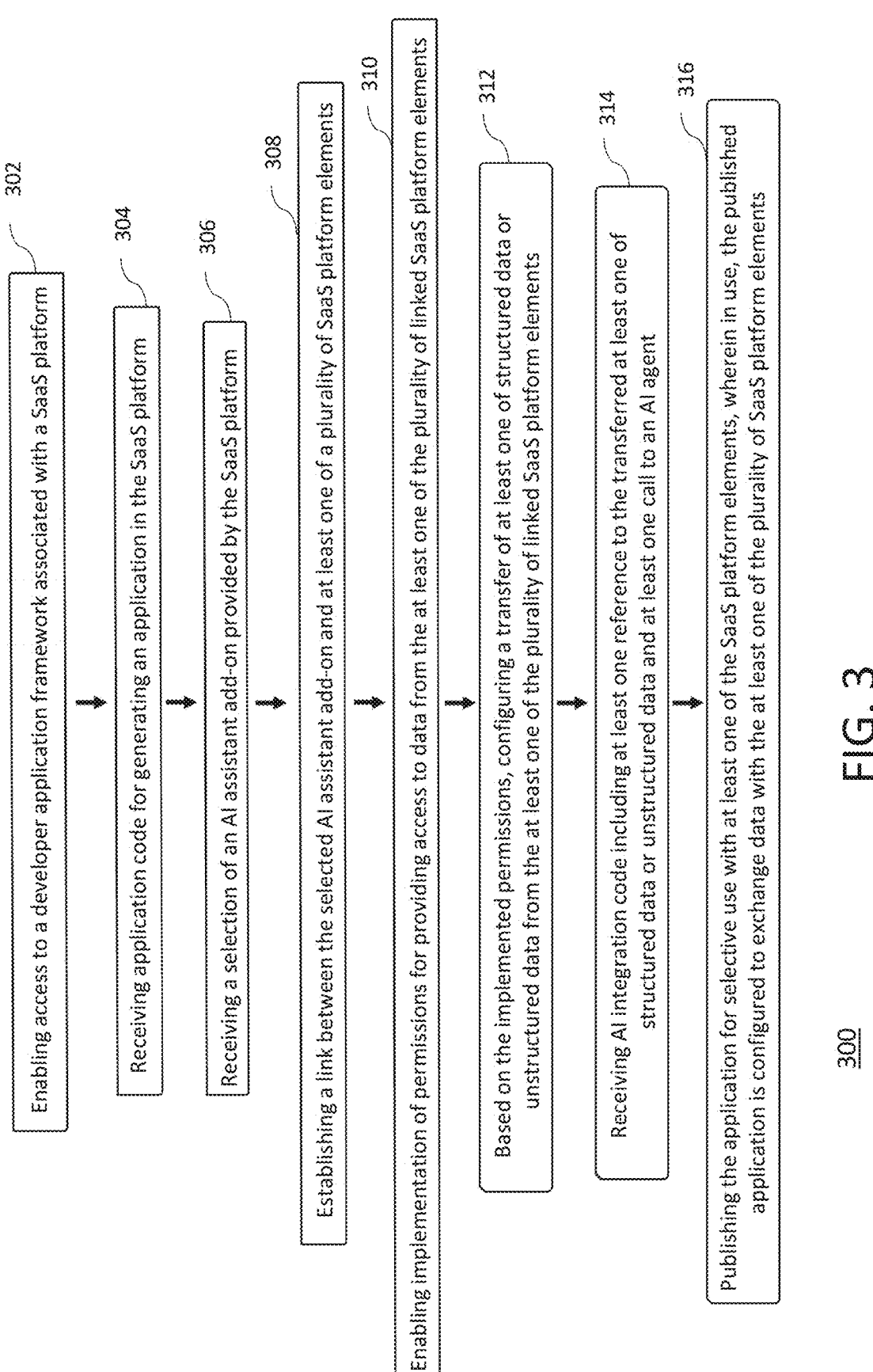

302 Enabling access to a developer application framework associated with a SaaS platform 304 Receiving application code for generating an application in the SaaS platform 306 Receiving a selection of an AI assistant add-on provided by the SaaS platform 308 Establishing a link between the selected AI assistant add-on and at least one of a plurality of SaaS platform elements 310 Enabling implementation of permissions for providing access to data from the at least one of the plurality of linked SaaS platform elements 312 Based on the implemented permissions, configuring a transfer of at least one of structured data or unstructured data from the at least one of the plurality of linked SaaS platform elements 314 Receiving AI integration code including at least one reference to the transferred at least one of structured data or unstructured data and at least one call to an AI agent 316 Publishing the application for selective use with at least one of the SaaS platform elements, wherein in use, the published application is configured to exchange data with the at least one of the plurality of SaaS platform elements

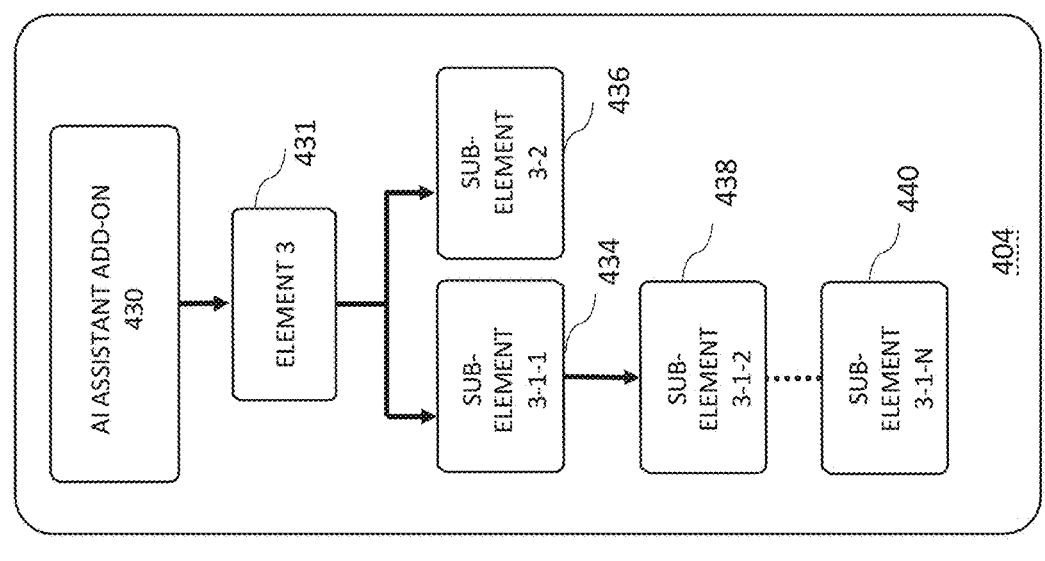
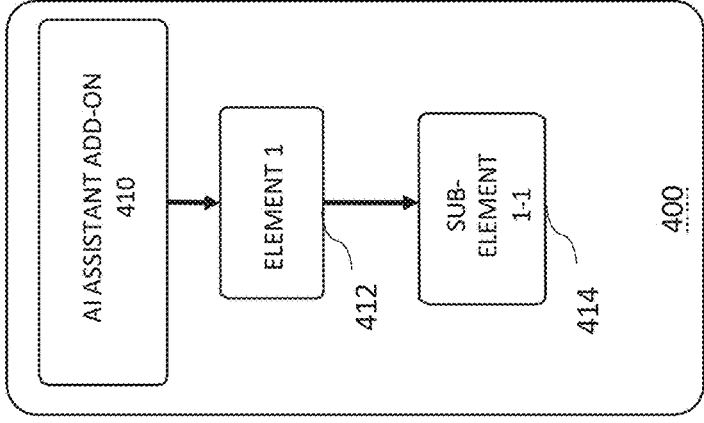
FIG. 4

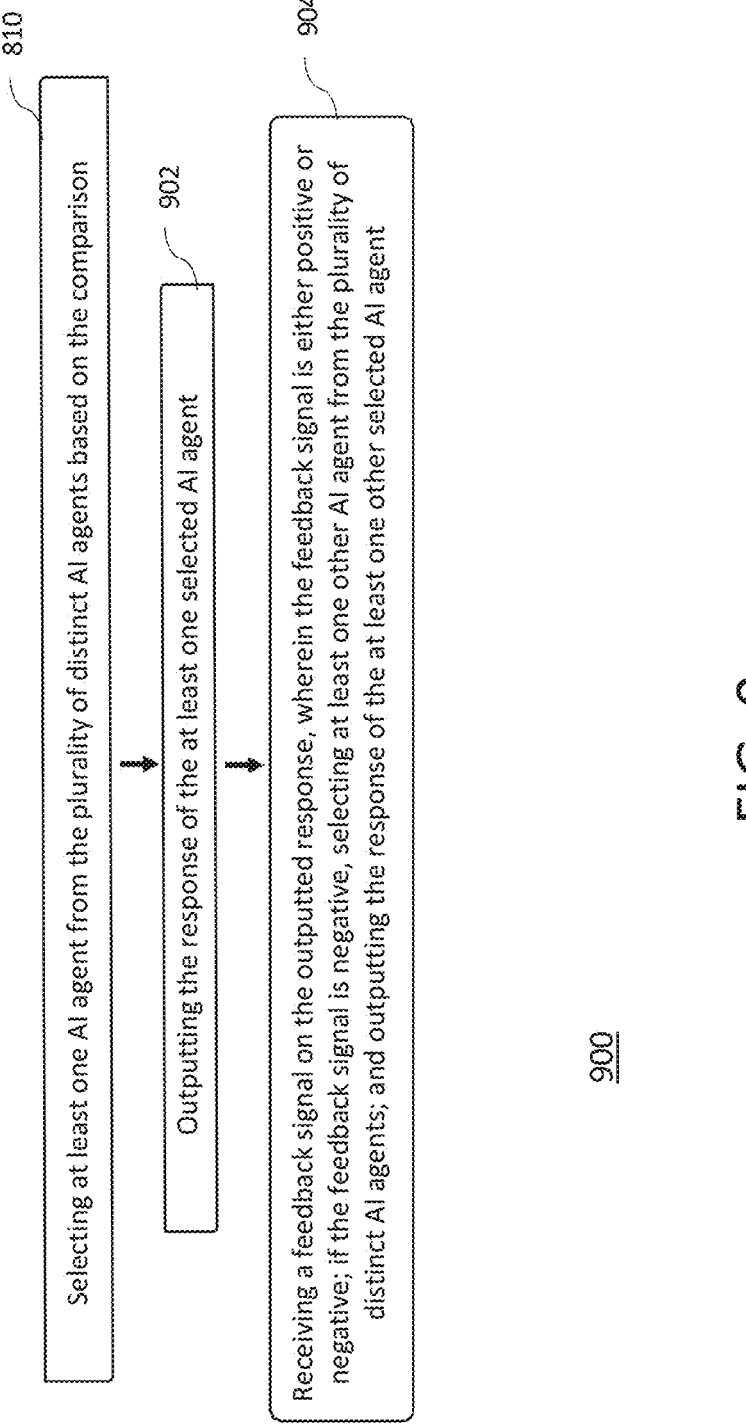

810

Selecting at least one AI agent from the plurality of distinct AI agents based on the comparison

902

Outputting the response of the at least one selected AI agent

904

Receiving a feedback signal on the outputted response, wherein the feedback signal is either positive or negative; if the feedback signal is negative, selecting at least one other AI agent from the plurality of distinct AI agents; and outputting the response of the at least one other selected AI agent

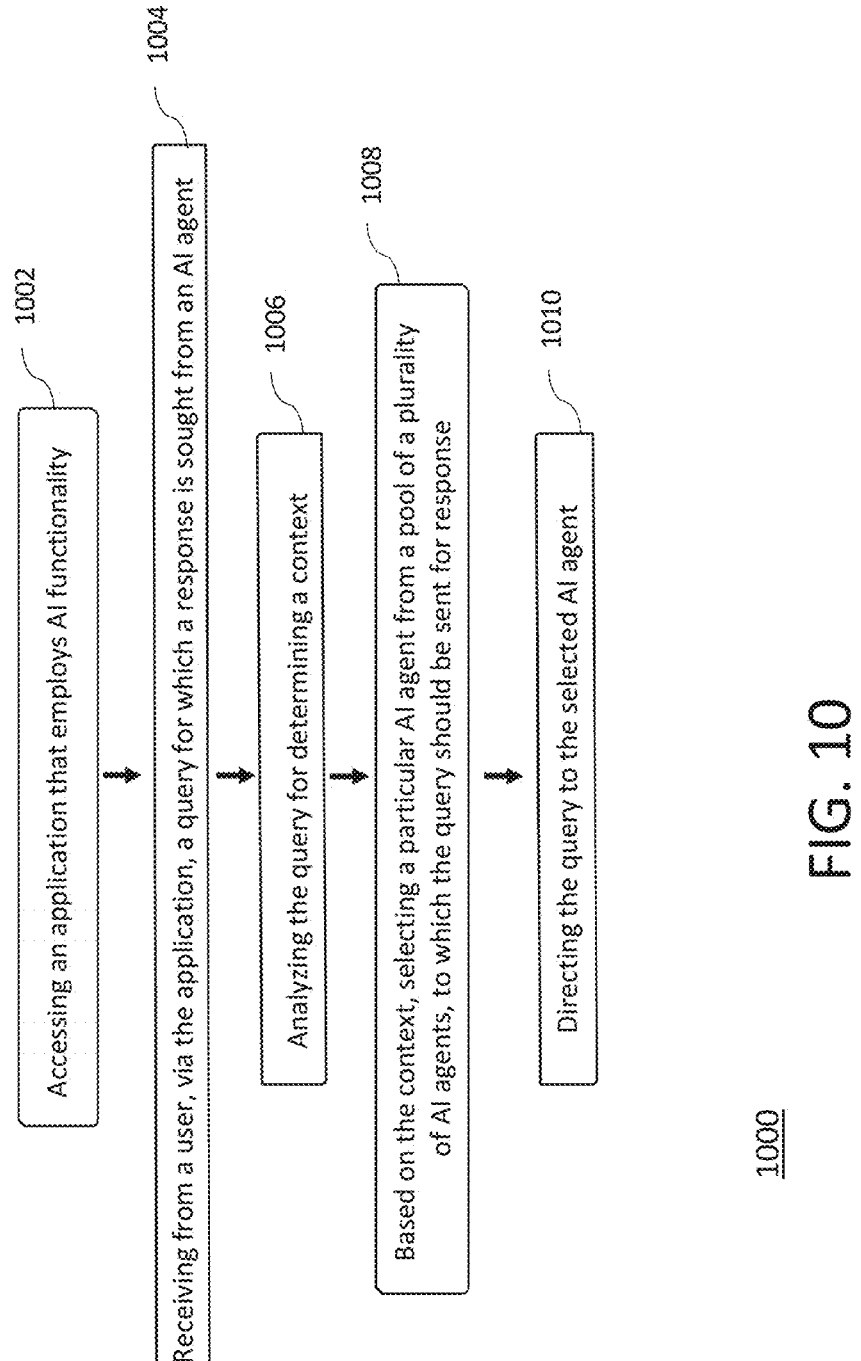

1002

Accessing an application that employs AI functionality

1004

Receiving from a user, via the application, a query for which a response is sought from an AI agent

1006

Analyzing the query for determining a context

1008

Based on the context, selecting a particular AI agent from a pool of a plurality of AI agents, to which the query should be sent for response

1010

Directing the query to the selected AI agent

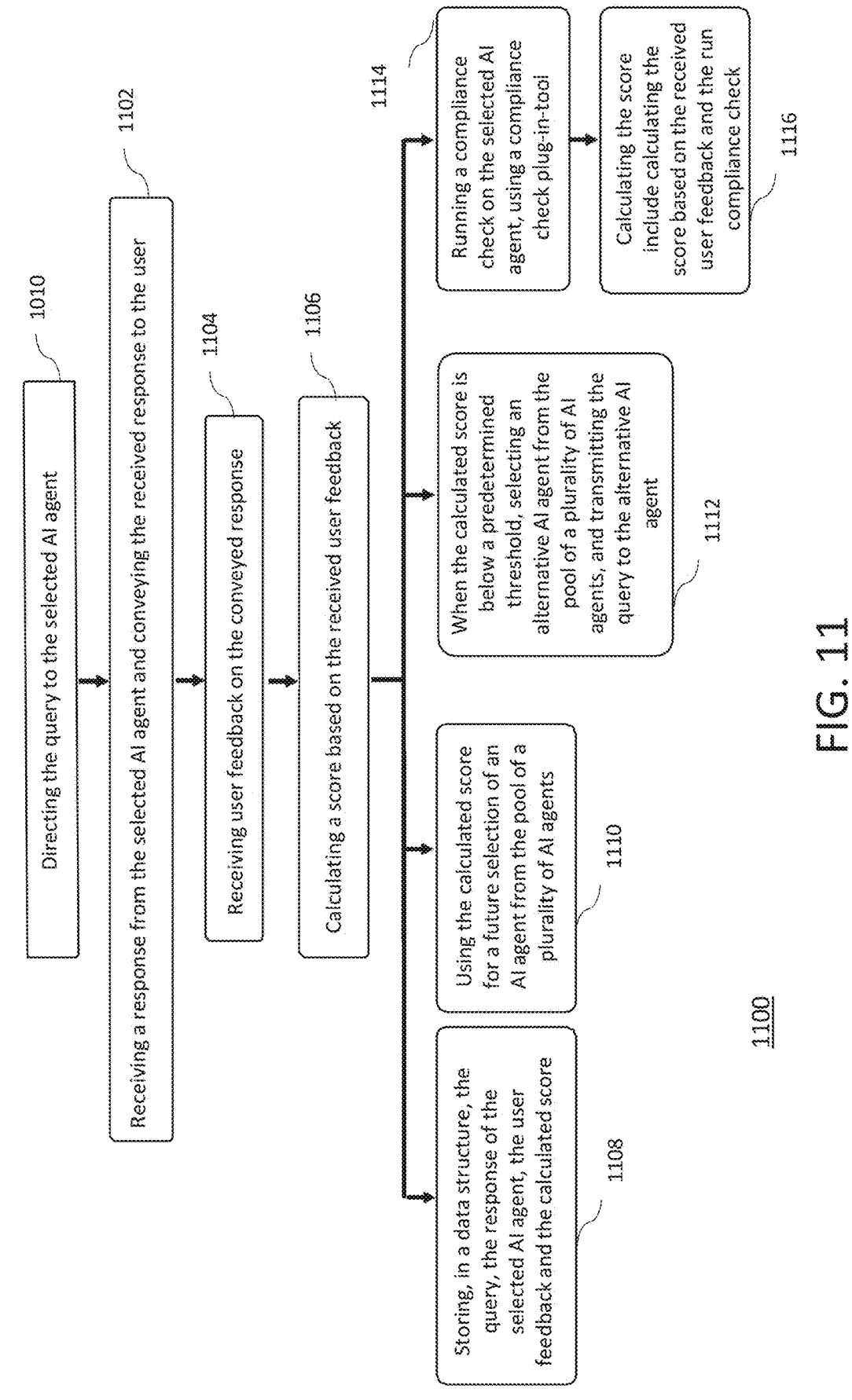

Directing the query to the selected AI agent
1010

Receiving a response from the selected AI agent and conveying the received response to the user
1102

Receiving user feedback on the conveyed response
1104

Calculating a score based on the received user feedback
1106

Storing, in a data structure, the query, the response of the selected AI agent, the user feedback and the calculated score
1108

Using the calculated score for a future selection of an AI agent from the pool of a plurality of AI agents
1110

When the calculated score is below a predetermined threshold, selecting an alternative AI agent from the pool of a plurality of AI agents, and transmitting the query to the alternative AI agent
1112

Running a compliance check on the selected AI agent, using a compliance check plug-in-tool
1114

Calculating the score include calculating the score based on the received user feedback and the run compliance check
1116

DIGITAL PROCESSING SYSTEMS AND METHODS FOR IMPLEMENTING AND MANAGING ARTIFICIAL INTELLIGENCE FUNCTIONALITIES IN APPLICATIONS

PRIORITY

This application is a continuation of International Application No. PCT/IB2023/061992, filed on Nov. 28, 2023, which claims the benefit of U.S. Provisional Application No. 63/519,519, filed on Aug. 14, 2023, both of which are incorporated herein in their entirety.

TECHNICAL FIELD

The present disclosure relates generally to Artificial Intelligence (AI) functionality implementation and management methods and digital systems. Consistent with the disclosed embodiments, non-transitory computer-readable storage media may store program instructions, which may be executable by at least one processing device and perform any of the steps and/or methods described herein.

BACKGROUND

Operation of modern enterprises can be complicated and time-consuming. In many cases, managing the operation of a single project requires integration of several employees, departments, and other resources of the entity. To manage the challenging operation, project management platforms may be used. Such platforms allow a user to organize, plan, and manage resources in collaboration with other users by providing a collaborative platform in which users share project-related information in order to optimize the time and resources spent on each project.

Project management platforms have a primary goal of automating repetitive tasks, enhancing decision-making processes, and maximizing project efficiency to streamline all aspects of project management. To achieve this objective, these platforms harness the potential of Artificial Intelligence (AI) functionality by integrating and utilizing AI capabilities within their applications.

However, implementing and managing AI capabilities within an application can be challenging due to a range of factors. Firstly, the integration of AI capabilities into existing applications or systems may involve different existing systems and/or disparate data sources. Ensuring smooth integration, scalability and compatibility with different software environments can pose challenges during the implementation process. In addition, there are many AI algorithms available, each with its own strengths and weaknesses and suitable for specific tasks. Selecting the most appropriate algorithm for a particular application requires expertise and experimentation. Tuning the selected algorithms to optimize performance can be a complex and time-consuming process. In addition, AI applications often need to comply with ethical and legal guidelines. In such situations, ensuring fairness, avoiding prejudice, and protecting users' privacy are factors to be managed. Addressing these considerations, such as data anonymization and transparency in algorithmic decision-making, can be a challenge when developing and deploying AI-based applications. The present disclosure describes solutions to address or overcome one or more of the above challenges, among other drawbacks of existing project management workflow systems employing AI functionality.

SUMMARY

Embodiments consistent with the present disclosure provide digital systems and methods for implementing and managing artificial intelligence functionalities in applications. The disclosed embodiments may be implemented using a combination of conventional hardware and software as well as specialized hardware and software.

Some embodiments consistent with the present disclosure involve systems, methods and computer readable media for building an application incorporating AI functionality. Exemplary operations may include enabling access to a developer application framework associated with a SaaS platform, receiving application code for generating an application in the SaaS platform, and receiving a selection of an AI assistant add-on provided by the SaaS platform. The operations may further include establishing a link between the selected AI assistant add-on and at least one of a plurality of SaaS platform elements, enabling implementation of permissions for providing access to data from the at least one of the plurality of linked SaaS platform elements, and based on the implemented permissions, configuring a transfer of at least one of structured data or unstructured data from the at least one of the plurality of linked SaaS platform elements. Operations may further involve receiving AI integration code including at least one reference to the transferred at least one of structured data or unstructured data and at least one call to an AI agent, and publishing the application for selective use with at least one of the SaaS platform elements, wherein in use, the published application is configured to exchange data with the at least one of the plurality of SaaS platform elements.

Some embodiments consistent with the present disclosure involve systems, methods, and computer readable media for performing selection operations for a plurality of distinct Artificial Intelligence (AI) agents. Exemplary operations include accessing an application that employs AI functionality, sending, via the application, a common prompt to a plurality of distinct AI agents, and receiving from each of the plurality of distinct AI agents a response to the common prompt. The operations may further include comparing information associated with each of the received responses, and selecting at least one AI agent from the plurality of distinct AI agents based on the comparison.

Some embodiments consistent with the present disclosure involve the performance of selection operations for improving quality of Artificial Intelligence responses. Exemplary operations include accessing an application that employs AI functionality, receiving from a user, via the application, a query for which a response is sought from an AI agent, analyzing the query for determining a context, based on the context, selecting a particular AI agent from a pool of a plurality of AI agents, to which the query should be sent for response, and directing the query to the selected AI agent.

BRIEF DESCRIPTION OF THE DRAWINGS

The accompanying drawings, which are incorporated in and constitute a part of this disclosure, illustrate various disclosed embodiments. In the drawings:

FIG. 3 is a flow chart of an exemplary process for building an application incorporating AI functionality consistent with some embodiments of the present disclosure;

FIG. 4 is an illustration of exemplary configurations of Artificial Intelligence (AI) assistant add-ons consistent with some embodiments of the present disclosure;

FIG. 5 is an illustration of an exemplary user interface of a system incorporating AI functionality, consistent with some embodiments of the present disclosure;

FIG. 9 is a block diagram of an exemplary process for assessing the selection of at least one AI agent from a plurality of AI agents consistent with some embodiments of the present disclosure;

FIG. 10 is a flow chart of an exemplary process for selection operations for improving quality of AI responses consistent with some embodiments of the present disclosure;

FIG. 11 is a block diagram of an exemplary process for assessing the quality of at least one match between a query and a selected AI agent from a plurality of AI agents consistent with some embodiments of the present disclosure;

DETAILED DESCRIPTION

Figure 1:
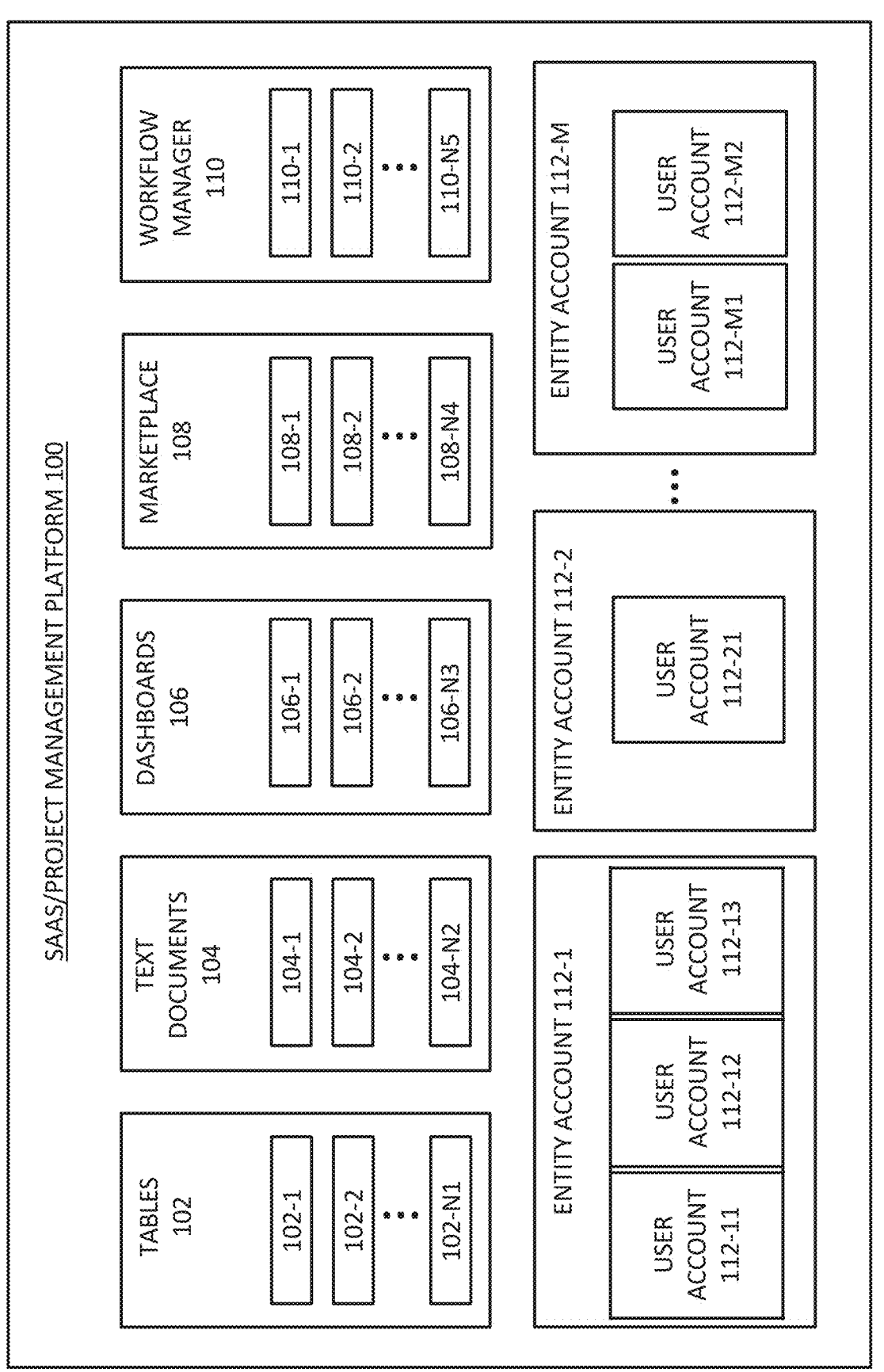
FIG. 1 is a diagram of an exemplary SaaS/project management platform, consistent with some disclosed embodiments.

Disclosed embodiments provide new and improved techniques for workflow implementing and managing artificial intelligence functionalities in applications.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspects of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience and form the word "embodiment" as used herein is intended to refer to a single embodiment or multiple embodiments of the disclosure.

Certain embodiments disclosed herein include devices, systems, and methods for collaborative work systems that may allow one or more users to interact with information in real-time. To avoid repetition, the functionality of some embodiments is described herein solely in connection with a processor or at least one processor. It is to be understood that such exemplary descriptions of functionality apply equally to methods and computer-readable media and constitute a written description of systems, methods, and computer-readable media. The underlying platform may allow a user to structure systems, methods, or computer-readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond what is displayed in a table. For example, a board may further contain cell comments, hidden rows and columns, formulas, data validation rules, filters, specific formatting, audits logs, version history, cross-referencing with different boards, external linking with data sources, permissions of access or a combination thereof. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining one or more associated data types and may further include metadata (e.g., definitions, validation rules, ranges, hyperlinks, macros . . . ). When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure but rather may be practiced in conjunction with any desired organizational arrangement. In addition, tablature may include any type of information, depending on intended use. As an example, when used in conjunction with a project/task management application, the tablature may include any information associated with one or more tasks, such as one or more status values, projects, time-frames/ deadlines, countries, persons, teams, progress statuses, a combination thereof, or any other information related to a task. In some cases, a hierarchy may be established between different items/cells in a same row. For example, a unique identifier (UID) may be assigned to an item and the other cell of the same row may then be associated with the item or the assigned UID.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. In alternative scenarios, permission may not only be provided at the board level, but also at a more granular-level such as rows, columns and even individual cells, allowing for fine-grained control over who may access, view, edit, or interact with the data included in the board. This feature may be particularly useful when dealing with collaborative boards. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real-time in collaborative work systems involving electronic collaborative word-processing documents. Electronic collaborative word processing documents (and other variations of the term) as used herein are not limited to only digital files for word processing but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information and may be linked to other sources of data for dynamic updates. Blocks may be automatically organized by the system or may be manually selected by a user according to preference. In one embodiment, a user may select a segment of any information in an electronic word-processing document and assign it as a particular block for input, editing, formatting, or any other further configuration.

An electronic collaborative word-processing document may be stored in one or more repositories connected to a network accessible by one or more users through their computing devices. In one embodiment, one or more users may simultaneously edit an electronic collaborative word-processing document. The one or more users may access the electronic collaborative word-processing document through one or more user devices connected to a network. User access to an electronic collaborative word processing document may be managed through permission settings set by an author of the electronic collaborative word processing document. Alternatively, permissions to specific portions of the electronic collaborative word processing document may be provided in order to control access, facilitate collaboration, and ensure that different users have appropriate levels of involvement and authority over different parts of the content. An electronic collaborative word-processing document may include graphical user interface (UI) elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer-readable medium described herein also constitutes a disclosure of methods implemented by the computer-readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

As used herein, a non-transitory computer-readable storage medium refers to any type of physical memory on which information or data readable by at least one processor can be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. The memory may include one or more separate storage devices collocated or disbursed, capable of storing data structures, instructions, or any other data. The memory may further include a memory portion containing instructions for the processor to execute. The memory may also be used as a working scratch pad for the processors or as temporary storage. Accordingly, the term computer-readable storage medium should be understood to include tangible items and exclude carrier waves and transient signals.

Some embodiments may involve at least one processor. Consistent with disclosed embodiments, "at least one processor" may constitute any physical device or group of devices having electric circuitry that performs a logic operation on an input or inputs. For example, the at least one processor may include one or more integrated circuits (IC), including application-specific integrated circuits (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated into a single circuit. When more than one processor is used, the processors may be configured to operate independently or collaboratively and may be co-located or located remotely from each other. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, a combination of one or more of the foregoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or an unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near-field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column-oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), or virtual reality (VR) display.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multi-dimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Certain embodiments disclosed herein may include a processor configured to perform methods that may include triggering an action in response to an input. The input may be from a user action or from a change of information contained in a user's table or board, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data with different level of granularity (e.g., a specific board, a plurality of boards . . . ) or across an entirety of an account (e.g., multiple boards, workspaces, or projects within the account). An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more automations, logical rules, logical sentence structures and logical (sentence structure) templates. While these terms are described herein in differing contexts, in the broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that responds to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyperparameters, where the hyperparameters are set manually by a person or automatically by a process external to the machine learning algorithm (such as a hyperparameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

Project management platforms are digital tools or software designed to streamline and automate various processes within an organization. They help to coordinate and manage tasks, activities, and information flow among several team members or different departments, ensuring efficient collaboration and productivity. These platforms typically provide features such as task assignment, progress tracking, notifications, and document management. In some cases, these platforms may correspond to a Software-as-a-Service (SaaS) platform. Within the context of this disclosure, a SaaS platform may refer to any kind of cloud-based software delivery model where service providers host software applications and make them accessible to users over the Internet. Instead of installing, managing, and maintaining the software locally, users access and utilize it through a web browser or thin client interface.

SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. SaaS platforms may provide several advantages including:

Accessibility: Users may conveniently and securely access software and data from any device with an internet connection.

Scalability: SaaS platforms may easily scale up or down to accommodate changing business requirements, providing flexibility and cost-effectiveness.

Cost-effectiveness: By eliminating upfront investments in hardware and software, SaaS reduces initial costs. Customers may pay subscription fees based on their usage.

Maintenance and Updates: Service providers handle software maintenance, updates, and security patches, relieving customers of these responsibilities.

Collaboration: SaaS platforms often offer collaboration features, enabling multiple users to work together, share data, and communicate within the platform.

Customization: SaaS platforms offer a high level of customization, allowing businesses to tailor the software to their specific needs. These applications can be seamlessly integrated with other business applications, particularly those offered by the same software provider. This integration enables smooth data flow and collaboration between different software systems, enhancing overall productivity and efficiency.

Some examples of SaaS platforms include monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce.

SaaS may include a plurality of SaaS Platform elements. A SaaS platform element is a component or building block that works together with other elements to deliver software applications and/or services over a network such as the Internet. Examples of such elements may include application software, infrastructure, and/or user interface. For example, a platform may offer project management capabilities to its users via dashboards, tables, text documents, a workflow manager or diverse applications offered on a marketplace, all of which constitute building blocks and therefore elements of the platform. In addition, each SaaS platform element may include a plurality of SaaS platform sub-elements which may refer to smaller components or features that are part of a larger element within a SaaS platform. These sub-elements may be designed to perform specific tasks or provide specialized functionality. The collaboration of multiple sub-elements aims to create a comprehensive and integrated SaaS solution. Examples of SaaS platform sub-elements may include a widget associated with a dashboard, a column or a cell associated with a table, or a workflow block associated with a workflow manager.

FIG. 1 is a flowchart representing the organization of an exemplary SaaS/Project management platform 100. As illustrated, SaaS platform 100 includes a plurality of SaaS platform elements, namely Tables 102, Text Documents 104, Dashboards 106, Marketplace 108 and a Workflow Manager 110. Each of these SaaS platform elements include a plurality of SaaS platform sub-elements, respectively, 102-1 through 102-N1 for Tables 102, 104-1 through 104-N2 for Text Documents 104, 106-1 through 106-N3 for Dashboards 106, APP 108-1 through APP 108-N4 for Marketplace 108 and 110-1 through 101-N5 for Workflow Manager 110, wherein N1, N2, N3, N4 and N5 represent natural numbers.

Several Entity Accounts 112-1 to 112-M, M being a natural number, may include entity or organization accounts that may be affiliated with SaaS platform 100 and managed via a user manager. Each of these entity accounts may include at least one user account. For example, in FIG. 1, Entity Account 112-1 includes three User Accounts 112-11, 112-12, and 112-13, Entity Account 112-2 includes one User Account 112-21 and Entity Account 112-M includes two User Accounts 112-M1 and 112-M2. It should be noted that this is only exemplary and, in general, an entity account may include any number of user accounts. Within the context of this disclosure, an entity account may refer to the central account managing the overall SaaS platform subscription, billing, and settings. Within this entity account, multiple user accounts may be created for different individuals within the entity/organization. User accounts may have their own login credentials, access privileges, and settings. The entity account owner or administrators may have control over access, permissions, and data segregation. User accounts may collaborate and share resources within the entity account while maintaining a personalized experience. Each of the user accounts may include different permutations of SaaS platform elements such as a plurality of tables, text documents, dashboards, marketplace applications or workflows (not shown in FIG. 1) in association with the above-mentioned SaaS platform elements. Accordingly, various SaaS platform elements or sub-elements may include metadata associated with users. Metadata associated with users may provide additional information and context about the users themselves, their profiles, roles, preferences, and interactions within the SaaS platform. Examples of metadata may include user profiles, roles and permissions, activity logs, usage indications, preferences and settings, user associations/relationships, user history or a combination thereof.

In addition, each of these user accounts may include one or more private applications (apps), that have been specifically designed and tailored to suit the needs of a user and that employ functionalities offered by or in association with SaaS platform 100 (via SaaS platform elements or their associated sub-elements). Private apps are exclusively accessible to users who are affiliated with an entity owning that app. These applications are not publicly available (i.e., not on the market) and may only be accessed by individuals who have specific authorization or are part of the designated user group. The privacy settings associated with these apps restrict access to ensure that only authorized users can use and interact with them. This level of privacy and restricted access helps maintain confidentiality, control, and security over the app's functionalities and data, limiting usage to approved individuals within the user account. Centralization of user access and authorization management is performed by a permission manager enabling administrators to control and regulate user privileges, ensuring that users have appropriate levels of access to data, features, and resources based on their roles and responsibilities. A permissions manager may offer granular control, and role-based access, facilitating efficient user management, collaboration, and compliance monitoring. Its objective is to enhance data security, streamline user administration, and maintain proper governance within the SaaS platform.

Any element or sub-element of a SaaS platform (e.g., SaaS platform 100) may be equipped with AI functionality. Within the context of this disclosure, AI functionality may refer to any kind of capability or feature exhibited by an artificial intelligence system. It involves the ability of AI systems to perform tasks that usually require human intelligence. Examples of those tasks may include comprehension of natural language, recognition of patterns or structures in a data set, or the generation of predictions/forecasts. AI functionality incorporates different techniques and technologies such as Natural Language Processing (NLP), Natural Language Generation (NLG), Machine Learning (ML), Neural Network (NN), Deep Learning (DL), Large Language Model (LLM), or Computer Vision. AI functionalities empower applications to analyze, interpret, and generate data, automate processes, optimize performance, and offer intelligent solutions for intricate problems.

Different categories of AI functionality exist, and the exact definitions of these categories remain an open question as categories of Artificial intelligence are not mutually exclusive. AI systems may possess multiple functionalities simultaneously, and their capabilities may span across different areas of AI. For instance, an AI system may have both generative AI functionality to produce new content, such as text or images, and analytical AI functionality to analyze existing data, detect patterns, make decisions, or identify anomalies like a fraud. These functionalities may be intertwined within a single AI system, allowing it to generate new content while also performing analysis on that content or other data. The field of AI is highly interconnected, and advancements in one area may influence and enhance capabilities in other areas. As AI technologies continue to evolve, the lines between different functionalities may become even more blurred, leading to increasingly integrated and versatile AI systems that combine various capabilities. Therefore, when discussing AI functionalities, it is important to recognize their potential overlap and interplay, as AI systems may exhibit a wide range of capabilities that are not limited to a single category or functionality.

In the context of SaaS platforms or project management platforms, AI functionality may manifest in the form of AI assistants working in close relation with a SaaS platform element or sub-element. An AI assistant also known as a virtual assistant may refer to any kind of digital tool or software utilizing artificial intelligence to provide interactive assistance to a user, which may be personalized to the user itself. AI assistants may act as personal assistants, chatbots, virtual customer service representatives or productivity assistants, helping to perform tasks related to project management such as scheduling, organizing, prioritizing, and providing recommendations based on data analysis and patterns. They can help streamline workflows, automate repetitive tasks, offer insights and suggestions, and enhance overall productivity and efficiency. AI assistants may simulate human-like conversational interactions and learn from user interactions and data inputs, to continuously improve their capabilities and adapt to user preferences, improving productivity and experience.

AI assistants may be powered by AI agents, also referred to as AI engines or AI core technology, i.e., components responsible for understanding user inputs, generating appropriate responses, and performing tasks on behalf of the user. An AI agent utilizes artificial intelligence technologies, such as NLP, ML, decision-making algorithms or any of the above-listed AI technologies, to interpret user queries, process information, and provide relevant and context-aware assistance. AI agents within AI assistants may incorporate various components, including perception to understanding user inputs (e.g., speech recognition or text parsing), reasoning and decision-making to generate appropriate responses, and action to execute tasks or interact with external systems. It may also involve learning capabilities to improve performance over time through user interactions and feedback. The AI agent acts as the intelligent core of the AI assistant, enabling it to understand user intent, provide accurate and helpful responses, and perform tasks or services on behalf of the user. It drives the conversational and interactive capabilities of the AI assistant, making it capable of simulating human-like interactions and assisting users with their requests. Non-limiting examples of AI assistants include Apple Siri™, Amazon Alexa™, Microsoft Cortana™, IBM Watson™, OpenAI ChatGPT-4™ and Bard™ Google's Assistant. The specific name or brand of the AI agent behind an AI assistant may vary depending on the developer or company that created it, some may not be publicly disclosed, like Siri™'s AI agent for example, while others are known, like Google's AI agent that powers Bard™, called Language Model for Dialogue Application (LaMDA). Communication and data exchange between a SaaS platform and an AI agent may be performed in various ways. For example, with reference to FIG. 1, an AI communication module may be included in the SaaS platform 100 to establish a connection between the SaaS platform and one or more AI agents.

AI agents may specialize in different types of operations or data processing based on their training, the AI technologies employed and their design. Accordingly, AI agents may be programmed and trained to specialize in specific domains, tasks, or industries. For example, different AI agents may specialize in the generation of different types of content such as text, images, code, or audio signals. In another example, different AI agents may be labelled by a specific type of data used in their training set, for example, a first AI agent may be specialized in customer relationships and trained to handle customer inquiries, a second AI agent may be specialized in financial analysis and have the ability to understand economic terminologies and analyze financial data, and a third AI agent may specialize in healthcare and generate treatment recommendation based on inquiries comprising medical terms and information. Despite the existence of these specialized AI agents, more general and versatile AI agents may handle different types of operations or data. These agents possess broader capabilities and may perform a variety of tasks across different domains. For example, an AI agent may be able to generate both text and visual presentations. It could be trained and programmed to understand natural language and then generate written content. Additionally, it could utilize its visual processing capabilities to create visual presentations or even generate images based on a given input.

In accordance with some embodiments, whenever a use of an AI agent is discovered or made in relation to an implementation of AI functionality a compliance check may be performed. One goal of compliance checks is to ensure an ethical and legal utilization of artificial intelligence by guaranteeing that an AI agent adheres to predetermined codes of conduct, regulatory requirements, and ethical guidelines. Conducting a compliance check is a process that may require one or more of the following steps:

Establish Clear Policies and Standards: Define precise policies, criteria, procedures, and standards that the AI agent must meet to in terms of transparency, fairness, reliability, and accountability. This encompasses researching and identifying relevant laws, regulations, sector-specific requirements, and ethical guidelines for AI.

Identify Purpose and Context: Understand the specific purpose and intended use of the AI agent by capturing its goals, objectives, and operational context. Evaluate the underlying AI technology, including data selection, algorithmic design, and model training techniques.

Ensure Data Privacy and Security: Monitor how data is collected, stored, and used by the AI agent. Implement practices that prioritize data privacy, such as obtaining proper consent, anonymizing or pseudonymizing personal data, and employing secure storage and processing methods.

Mitigate Bias and Unfair Treatment: Scrutinize the AI agent for potential biases that may result in unfair treatment or discrimination against individuals or groups. Enhance the diversity and representativeness of training data and incorporate fairness-aware algorithms to mitigate biases.

Monitor AI Agent Behavior: Continuously observe and analyze the behavior of the AI agent across different use cases. Keep abreast of changes in regulations and guidelines, and adapt the compliance verification process accordingly.

Conduct Audits and Reviews: Perform regular audits and reviews to evaluate ongoing compliance and identify areas for improvement. Stay informed about evolving regulations and guidelines, adapting the compliance check process accordingly.

Document the Compliance Check: Maintain comprehensive documentation of the compliance check process, including results, actions taken, and implemented changes. Keep records of compliance to demonstrate accountability and provide transparency, vis-à-vis stakeholders.

By following one or more of the above steps, entities that provide AI functionality may ensure that their AI agents operate within a clear, legal, and ethical environment, which promotes the responsible and trustworthy use of AI. Compliance checks may be performed using a compliance check digital toolkit or plug-in tool. While compliance checks may ensure ethical and regulatory adherence, there may be situations where non-compliance-related guidance or technical instructions may be provided to an AI agent to influence its behavior or output in a specific manner. The purpose of such guidance or instructions may be to shape the AI agent response to align with desired objectives or outcomes. This process may be accomplished by setting one or more of the following preferences:

Language preferences: Users may instruct the AI agent to respond in a specific language, adopt certain terminologies (e.g., industry jargon, dialects, idioms), or emulate a particular tone or style (e.g., mimicking a specific character).

Formatting preferences: Instructions may be given to the AI agent regarding the desired structure of the response, such as using a cypher, employing bullet points, or incorporating visual aids.

Specific data preferences: Users may provide guidance to the AI agent about the data or sources to be utilized in generating the response. This may include specifying the use of accurate and reliable data sources, particular databases, or considering a specific dataset.

Task-specific preferences: Users may offer instructions or guidelines to the AI agent for responding to a specific task, such as following a prescribed method or utilizing a predetermined algorithm.

By influencing an AI agent's behavior, users may obtain responses that meet their specific needs or align with their intended outcomes, even if those instructions are not related to compliance requirements. However, it is to be appreciated that a user may ensure that the provided instructions or guidance fall within the boundaries of responsible and ethical use of AI technology.

Figure 2:
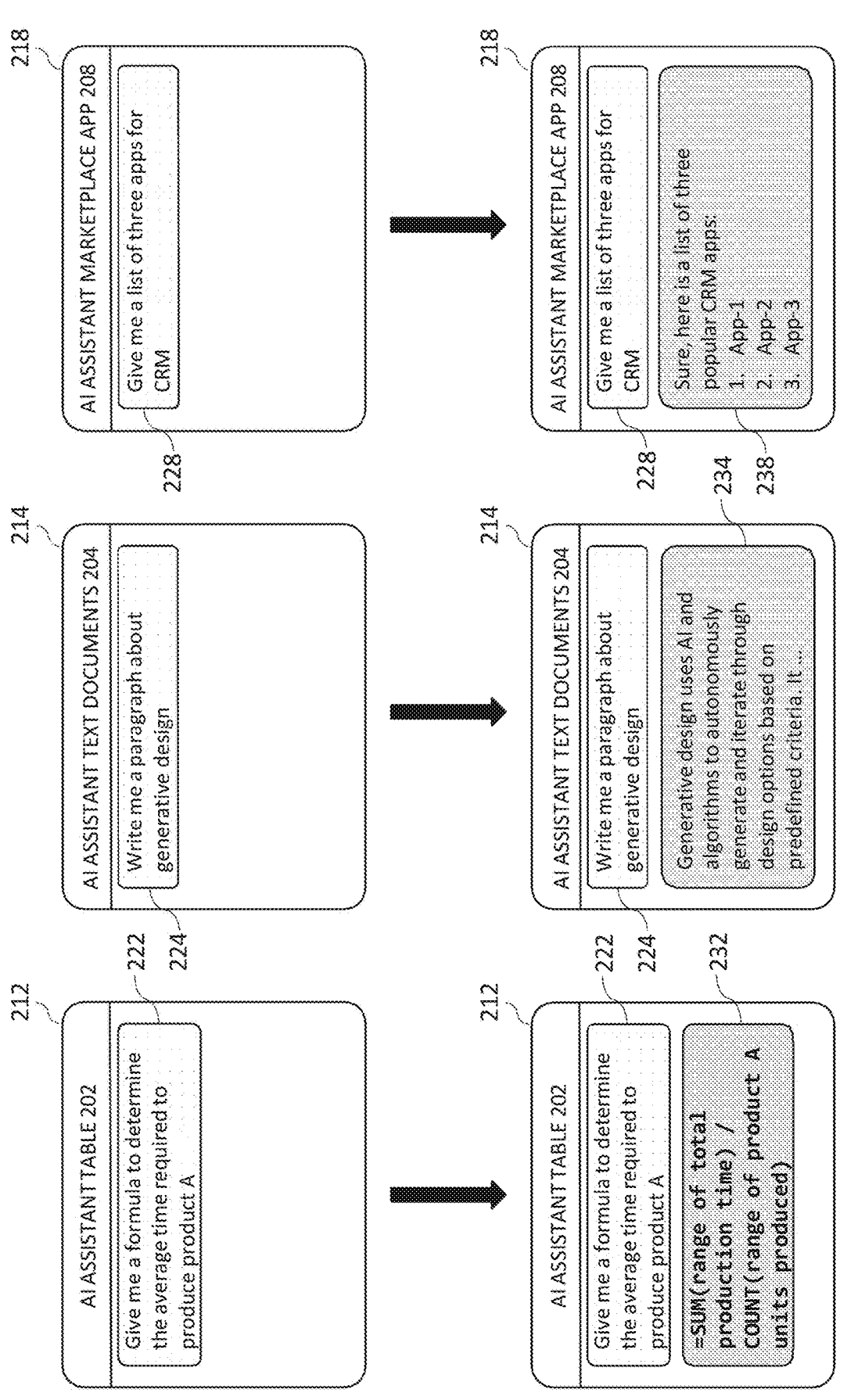
FIG. 2 is an illustration of exemplary Artificial Intelligence (AI) assistants for performing tasks in association with the SaaS platform of FIG. 1, consistent with some disclosed embodiments.

FIG. 2 depicts different exemplary AI assistants performing various tasks in association with SaaS platform 100 represented in FIG. 1. Specifically, AI Assistant Table 202 may handle tasks related to Tables 102 (SaaS platform element), AI Assistant Text Documents 204 may focus on tasks related to Text Documents 104 (SaaS platform element), and AI Assistant Marketplace App 208 may be responsible for tasks related to Marketplace Applications 108 (SaaS platform element). These AI assistants, e.g., 202, 204, and 208, are represented by chat boxes (212, 214, and 218, respectively), which serve as Graphical User Interface (GUI) components enabling user communication. In the upper section of FIG. 2, chat boxes 212, 214, and 218 display exemplary user queries (e.g., 222, 224, and 228) in the form of text bubbles. After a variable amount of time has elapsed, based on the complexity of the queries and the performance of the AI agents associated with the AI assistants, each AI assistant generates a response (e.g., 232, 234, and 238). The responses, depicted as text bubbles with different visual designs, are presented in the bottom section of FIG. 2. In an alternative scenario, each of the AI assistants may be powered by a single AI agent configured and trained to handle queries related to, for example, SaaS platforms elements.

In the context where AI functionality is provided through AI assistants by a SaaS platform provider in conjunction with various SaaS platform elements, users of the SaaS platform may have the desire to incorporate AI functionality into applications, such as, for example, their private apps. Similarly, developers might aim to create applications intended for the marketplace, offering AI functionality. However, implementing AI functionality within a SaaS platform may be a challenging undertaking. The following section provides an in-depth description of some the exemplary processes involved in ensuring the seamless integration of AI functionality within an application for use in a SaaS platform. These processes address the complexities and considerations necessary to successfully incorporate AI capabilities within an application destined for the SaaS platform ecosystem.

An inherent complexity may exist for applications that attempt to solve non-deterministic or open-ended problems, including, for example, user needs or requests, particularly in a SaaS platform. In such a platform, the use of AI functionality has the ability to enhance performance, implementation, and overall user experience. In some embodiments presented herein, processes are described explaining ways to improve the performance and user satisfaction of a SaaS platform by building an application that incorporates AI functionality.

Some embodiments of the present disclosure may include building an application incorporating AI functionality. An application (e.g., a software application) refers to a computer program or portion thereof (e.g., executable computer code instructions) designed to perform one or more tasks for providing functionality to users. A software application may be configured for a variety of electronic devices, such as mobile and/or handheld devices, wearable devices, Internet-of-Things (IOT) devices, desktop computers, tablets, embedded and/or distributed systems, and/or any other electronic computing device. A software application may be a standalone program, or a part of a broader software ecosystem configured to interact with other software applications, databases, and/or online services. A software application may include a user-interface enabling users to interact with and access features and functionalities of the software application (e.g., by providing inputs and receiving outputs). Some examples of software applications may include word processors, spreadsheets, media players, accounting software, photo editing packages, and social media applications, scheduling and workflow management software, and/or any other computerized functionality. In some cases, a software application (e.g., a child application) may be configured to be incorporated within a different application (e.g., a parent application), for example, to utilize features and function-alities (resources) and user-interfaces (design) from the parent application Some examples of incorporated applications may include spell checkers within word processors, graph maker within spreadsheets, an audio editor within media players, a personalized tax calculation feature within accounting software, AI capabilities within a photo editing package. An incorporated (e.g., child) application may be developed by a developer other than a developer of the (e.g., parent) application to which it is incorporated into (e.g., the spell checker may be developed by a first developer and the word processor into which the spell checker is incorporated may be developed by a second developer). For example, AI functionality may be incorporated as a "bot," such as an AI chatbot, which may engage with the user of an application. In this context, for example, a bot may serve to enhance a customer service process or make a user interaction with an application more efficient.

Building an application refers to generation of code, a software program, and/or a system that serves a specific purpose or provides a particular set of functionalities. Asso-ciated code may be launched on computer hardware includ-ing at least one processor provided with access to memory, and/or access to a file containing software instructions via a portable memory (e.g., a USB drive and/or flash memory). In some examples, building an application may also involve at least one processor executing software instructions via an operating system that manages system resources, such as memory management, processing capacity (e.g., CPU time), and file access. Running an application refers to executing or launching application code so that the application becomes active and functional. An application may be run as an image (e.g., an immutable image) inside a container. The applica-tion may be designed for use by a user or developer. AI functionality as used herein may be interpreted as described and exemplified elsewhere in this disclosure. AI function-ality may involve any use of a bot, AI assistant, AI agent, or interaction between AI and a SaaS platform, as described and exemplified elsewhere in this disclosure. In some embodiments, AI functionality may be incorporated into computerized systems or programs such as a document template generator, a text/content generator, a text operation pop-up window, a formula editor, a task/planning generator, an application finder, a board generator or modifier, a board structure builder, and a task automator. Tasks that may be automated may include, for example, status updates, email notifications, dependencies, due date alerts, task assign-ments, time tracking, progress updates, automated work-flows, visualizations such as Gantt charts, and building forms.

Figure 5:
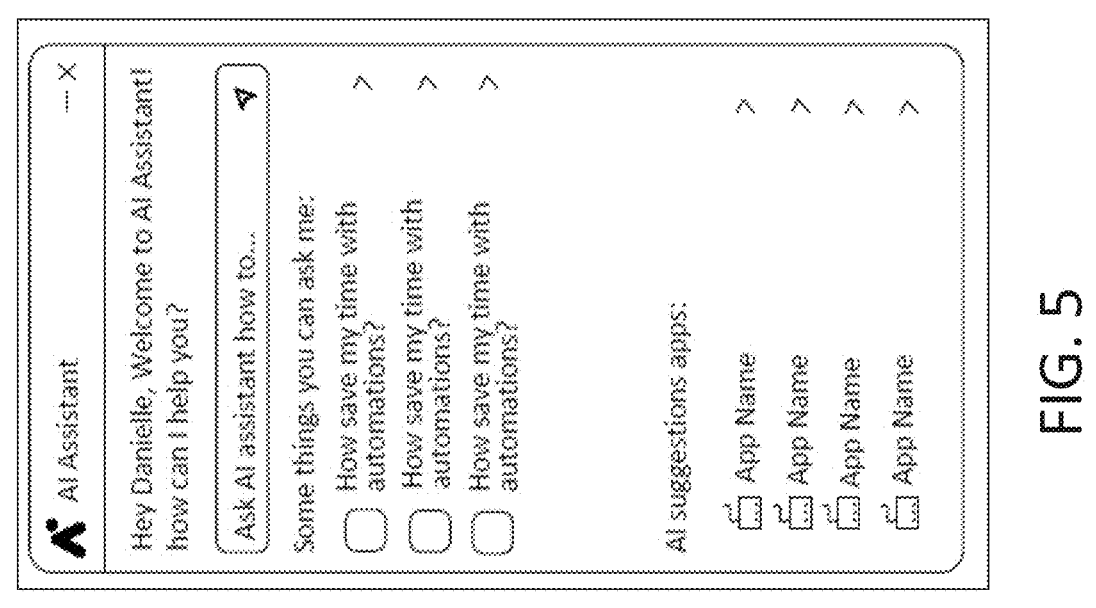

FIG. 5 illustrates a non-limiting example of an application incorporating AI functionality disclosed herein. This is merely one form in which an AI assistant add-on may occur. In this case, the AI assistant investigates what the user may need, by allowing the user to select suggested questions, or input their own query. The AI assistant may provide a list of suggested apps, for example. This AI assistant may be thought of as an add-on to the application. The use of an AI assistant may be integrated seamlessly with the main appli-cation. For example, a board may have many elements of comprised of various data types, and an AI assistant may link to the board or even integrate with it, such that a user can operate it with a single click of a button.

Some embodiments involve enabling access to a devel-oper application framework associated with a SaaS plat-form. A developer application framework refers to a tool that provides a structure to support the development of applica-tions. A developer application framework refers to a set of tools, libraries, components, or any other software that may help developers build software applications. An application framework may provide predefined structures, functionali-ties, and abstractions to streamline the development process. Frameworks may provide libraries for common tasks, code patterns and templates, development tools, abstraction lay-ers, or support for standards and patterns. Frameworks can be used to accelerate software development, improve code quality, or reduce coding effort. Frameworks may be avail-able for different programming languages and platforms, facilitating efficient or structured application development. Developers may access a developer application framework by incorporating its application program interface into their own application code, allowing them to leverage the frame-work's features and functionality within their projects. Non-limiting examples of developer application frameworks may include software development kits, frameworks, Integrated Development Environments (IDEs), libraries, middleware or DevOps Tools. Enabling access refers to providing access to a system or a developer, which may be a person, user, computer system trained to develop or update code, or a computer system used by a developer individual. Enabling access to the framework may be done by using secure methods, including, as an example, login verification check, two-factor authentication, or through the use of a security access dongle. Alternatively, enabling access may be done automatically without additional security checks. Enabling access may be done by calling up the relevant framework to build a particular application with AI functionality. For example, enabling access to a framework associated with a SaaS platform may involve a developer developing appli-cation code and utilizing an IDE that is configured to easily integrate the code with the platform software. For example, a developer application framework associated with a SaaS platform may involve all of the background code and processes that allow a user-friendly and modifiable board on a website to be operated with various sub-applications and add-ons, which may be easily added and integrated with the board or removed.

Some embodiments involve receiving application code for generating an application in the SaaS platform. As used in this context and elsewhere herein, receiving code refers to the process of capturing, obtaining, interpreting, and/or handling incoming data or signals. The term application may be understood as described elsewhere in this disclosure. Application code refers to the code used to operate or develop an application and may involve tools, functions, forms, tables, reports, a set of instructions, or any other part of a software. The code may be written in any software or programming language, with non-limiting examples including Python, C, C++, C#, PHP, HTML, Javascript, or SQL. Receiving the application code to the process of capturing, obtaining, interpreting, and/or handling incoming data or signals. Receiving the application code may be performed automatically by the system, such as through the use of an AI Agent, or manually by a user or developer. For example, application code may allow the SaaS platform or board mentioned above to operate various sub-applications or add-ons.

Consistent with some disclosed embodiments, a programming language of the application code is different from a programming language of the SaaS platform. A programming language refers to a set of rules and syntax that allows developers (including AI agents) to write code and create software applications, scripts, or algorithms that can be executed by a computer. Enabling the use of different programming language may be useful in many situations. For example, differing teams, entities, or individuals may be involved in writing an application code and SaaS platform code. Yet the two might require integration. Some application codes may be written in a simpler language, including graphical programming languages, than a platform code. A developer or user may not be familiar with the platform programming language, and it may be beneficial to allow the application code to be written in a more familiar language to the coder. In some embodiments, the application code may need to be written in another language for efficiency, which may include the need to save developer or user time and effort, or to increase, improve or optimize front end or backend software processing performance. Alternatively, an AI agent may write or modify the application code autonomously and it may be safer to keep the languages separate. A compiler may be used to convert the code where necessary. For example, an AI add-on, such as those shown in FIG. 2, may be written in a programming language different than the programming language of a board intended to integrate with the add-on.

Consistent with some disclosed embodiments, the application code is template code from a template database associated with the SaaS platform. Template code is code that may serve as a guide or reference code. Template code may refer to any code written by a developer individual or a computer system which provides a form, pattern, guide, or basis upon which more specific code, including application-specific code, may be written. As a non-limiting example, template code may include function and class operations with generic types, a pattern that a compiler uses, or a content fragment stored for later use. In practice, template code may be used as a starting point, allowing a user, developer or computer system to further modify or develop the application code. This may provide a benefit to saving development time and cost. Template code may act as a blueprint or formula for the application code. A template database refers to one or more storage locations where templates are maintained. A template database may, for example, take the form of any data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A template database may be created by a developer, administrator, or AI agent. In practice, as an example, a user may wish to use a template database as a starting point and from there may further modify or add content to the database for an application. For example, application code may be developed by a developer from template code obtained from a template database. The template code may then be used to develop or modify an application for the SaaS platform. For example, template code may be used to allow an AI agent to quickly or seamlessly integrate with a board.

Consistent with some disclosed embodiments, the application code is received from a developer. Receiving (as described and exemplified elsewhere herein) may refer to obtaining, retrieving, and/or otherwise gaining access to code. This may occur, for example, via an intermediate platform, e.g., via a communications network in accordance with a communications protocol. Receiving may also refer to interpreting the code to provide further actions by the system. By way of another example, receiving the application code may refer to enabling a developer to submit the code, or it may refer to utilizing the at least one processor for saving code to computer memory. Receiving the application code may be performed automatically by the system, such as through the use of an AI Agent, or manually through a user or developer person. As described herein, a developer may be a person, company, computer system trained to develop or update the code, or a computer system used by a developer individual that creates new content or code for the application. After development, for example, the application code may be integrated directly into the SaaS platform or integrated with the AI Agent in the SaaS platform. For example, a developer may provide or update code to an AI application that integrates with a board on a website.

Some embodiments include receiving a selection of an AI assistant add-on provided by the SaaS platform. Receiving a selection refers to obtaining a choice selected from a group or a number of options. As described herein, receiving a selection may refer to the at least one processor receiving one or more inputs from an input device or software associated with the SaaS platform. Receiving a selection may refer to the result of choosing, obtaining, categorizing, implementing, or integrating at least one AI assistant add-on for an application. An AI assistant add-on may refer to any kind of software components or extensions that adds functionality to an existing software application or system that may act as an AI assistant. For the sake of brevity, an AI assistant add-on may be referred to simply as an add-on, a bot, or an AI bot in the current disclosure. Add-ons may be designed to enhance the capabilities or provide additional features to a base software. Add-ons or bots may take various forms depending on context and the software ecosystem. For example, these forms may include analyzing content to offer suggestions, checking grammar, communicating in lieu of a human, or image searching. In one example, a user may be interested in customer relationship management and wish to streamline and optimize sales email generation using an AI add-on which is selected to provide templates for customer-facing emails. In another example, a selection may include an AI assistant that finds relevant apps for a user need. In yet another example, an AI bot may include a task/planning generator to help a user with task planning.

Consistent with some disclosed embodiments, the selection of an AI assistant add-on is performed from a library of AI assistant add-ons associated with the SaaS platform. As used herein, a library may be a collection of programs, software packages, or AI add-ons made generally available. For example, a library may contain variations of AI bots which perform unique tasks, including those shown in FIG. 2. A library may be a set of various add-ons with different or overlapping applications. In some embodiments, the add-ons may be stored in a library for use as a part of the SaaS platform.

Consistent with some disclosed embodiments, the operations further include maintaining the library of AI assistant add-ons. Maintaining the library refers to preserving the library for later access. Maintaining may also refer to may include updating the library with additional add-ons or revising or updating existing add-ons within a library using new or revised code. One exemplary advantage of maintaining a library is that it serves as a reference to streamline future project. Maintenance, in some circumstances, may allow the library to remain up to date with system-level, or browser-level software updates or patches. Additionally, where relevant, information for necessary maintenance may be provided by bug-reporting from users or developers. Maintenance may be provided by the AI agent itself or by developers. The AI agent may be able to identify problems and provide maintenance of the library. Maintenance may also refer to providing a consistent or reliable means to access the add-ons. For example, a server that houses the add-ons while providing a high bandwidth access to the add-ons would be one form of maintenance.

Consistent with some disclosed embodiments, the selection of an AI assistant add-on is made from a plurality of AI assistant add-ons. When more than one AI assistant add-on option is provided, a selection may be made from among those options. Thus, for example, a selection of an add-on may occur from a set of various add-ons with different or overlapping functions. The add-ons may be stored together as a plurality of add-ons in a set, such as in a library. Selection of the add-on may also be done by a user, developer, an AI agent alone, or any combination of the above. Selection may be done to enhance a user experience or to facilitate or streamline development, performance, or user satisfaction. For example, selecting an AI assistant may include selecting an assistant for table editing, text document editing, or marketplace apps, as shown in FIG. 2.

Consistent with some disclosed embodiments, the receipt of application code for generating an application in the SaaS platform includes receiving a first selection of a first AI assistant add-on for use with a first SaaS platform element and a second selection of a second AI assistant add-on for use with a second SaaS platform element different from the first SaaS platform element. As described earlier, a SaaS platform element is a component or building block that works together with other elements to deliver software applications and/or services over a network, such as the Internet. The term "different," in this context, refers to SaaS platform elements which may have some portion, component, style, or properties that distinguish one element from another. In some cases, each element may be associated with its own add-on. For example, a situation may arise wherein a pair of elements that may be independent from one another each require a separate add-on in an application. This may also extend to a plurality of elements each corresponding to an individual, potentially unique add-on. Alternatively, in some situations, these separate add-ons may overlap in their performance or behavior, including portions of their code. For example, using FIG. 1, selection of an AI agent to edit tables 102, and selection of a second AI agent to edit text documents 104 may occur.

Some embodiments include establishing a link between the selected AI assistant add-on and at least one of a plurality of SaaS platform elements. A link is a relationship between two entities. As used herein, a link may refer to some degree of connection or communication between the add-on and at least one of a plurality of elements. A link in this context may refer to a relationship, connection, or association between a selected add-on and at least one element. A link may be permanent or transient and may occur through software or hardware. The link may be displayed on a user interface or it may occur in the backend software. For example, the link to SaaS platform elements may include an address for the unique identifier of the at least one of a plurality of said SaaS platform elements, or a portion thereof. For example, as shown in FIG. 2, a link may be established between the AI assistant table 202 and the elements, such as columns, tables, or cells related to the formula request shown in 222.

Consistent with some disclosed embodiments, each of the AI assistant add-ons in the library is preconfigured to be linked to at least one SaaS platform element. Preconfigured as used herein refers to software that has been set up, arranged, or developed ahead of the current use. Preconfigured to be linked refers to software that has been preconfigured for use by a developer or application to be linked to another piece of software or hardware. As used herein, the link may occur between an add-on and the at least one element in the SaaS. In some cases, this may suggest that the link is programmed for a selected add-on to perform a task for specific elements. In this situation, for example, an add-on may be specialized to perform a specific task. In another example, application code or SaaS software may be developed to recognize a previous association between an add-on and an element, forming a link between the two that can be further utilized. In some cases, preconfigured may be interpreted as having a familiarity with the specific data-model of the element, and with the manners in which sub-elements function and how users commonly interconnect different sub-elements to gain a desired functionality from the element. Being familiar with the element, for example, the AI assistant add-on may be configured to be aware of the varying manners in which the element may be utilized by users, as well as aware of all the possible constraints that may derive using said element. Such configuration may be achieved by adapting the AI agent for said element by training the model or by entering each time a preconfigured prompt including all of the utilities and constraints for the AI assistant to process.

Some embodiments include enabling implementation of permissions for providing access to data from the at least one of the plurality of linked SaaS platform elements. A permission refers to an access right or privilege granted to users, groups, or processes, allowing them to perform certain actions or access specific resources on a computer system or network. By way of a few non-limiting examples, permissions may refer to filters, access control, rights, credentials, or anything that acts as a barrier or presents some level of restriction of access to data or data assets to some, yet permits it to at least one other. It may occur as part of data access management or data governance, which is the general methods utilized to organize, maintain, and handle data in a process. to ensure that the data is secure, private, accurate, available, and usable. Implementation of permissions refers to a provision of restrictions used to permit or restrict access to data. Implementation of permissions may involve user permissions, which may be a part of the user management process, wherein access may be granted to users to specific resources such as data, files, applications, networks, or devices. Permissions may refer to application permission or access control lists, wherein users are assigned roles which may describe permissions for each user or groups of users. Enabling implementation of permissions may be done automatically or manually by a developer. The implementation may, for example, be done at each individual call for access to data or it may be done at once in a way that applies to future requests for access. For example, a user may provide permissions for access to data in table 102, as in FIG. 1. For example, the AI agent may determine whether information should be classified under a single column in the database or under two columns that are either interconnected internally (for example, the options for values that can be introduced in the second column may be dependent on the value that is selected therein). An example of the permission manager is shown in FIG. 1.

Consistent with some disclosed embodiments, enabling implementation of permissions for providing access to data from the at least one of the plurality of linked SaaS platform elements includes displaying a user interface configured to enable a user to implement permissions for providing access to data from the at least one of the plurality of linked SaaS platform elements and visualize the implemented permissions. User interface is consistent with use of the term as described elsewhere herein. For example, displaying a user interface may be done by showing a message on a screen, such as a pop-up box, or a list of selectable options. A user may be able to set rules or permissions for what data in an element is accessible to an AI agent. For example, choosing rules may include textual input such as a prompt to "restrict access to those images," or non-textual input, such as selectable elements or sub-elements. For example, a user may wish to include permissions for an AI agent to access data in one column of a table, but to restrict permissions in another column. In this example, the AI agent may be able to adapt its analysis based on the rules or permissions provided by the user.

Consistent with some disclosed embodiments, receiving permissions to access data from the at least one of the plurality of linked SaaS platform elements includes initiating an authentication flow with the at least one of the plurality of linked SaaS platform elements. The same may apply to sub-elements of those SaaS platform elements. Authentication flow refers to steps and/or interactions between an entity, user, or client and a system or service to verify the user's identity and grant access to at least one resource or functionality, such as an element. Authentication flow, for example, may involve identifying and authenticating code, developers, a computer system, or permissions for data access. Authentication flow may utilize authentication libraries or industry-standard protocols to authenticate identities or provide a verification that a request to access data has the appropriate permissions. Examples of authentication flow include authorization code flow, implicit flow, or hybrid flow. In some cases, the flow may use ID tokens or access tokens to verify identity. Any part of the flow may occur with a display of information on a frontend software or a screen, or it may occur in the backend with or without a visual display of information. An exemplary implementation of authentication flow may be two-factor authentication using a third-party device or service, or any separate form of identification. Permission may be granted or restricted by a user or developer, or AI agent, on individual elements or sub-elements. For example, a user may wish to restrict access of an AI agent to one column in a table or some sub-elements within that column, but allow access for the remaining columns.

Some disclosed embodiments involve configuring a transfer of at least one of structured data or unstructured data from the at least one of the plurality of linked SaaS platform elements. Structured data refers to data that is organized and formatted in a consistent manner. For example, it may be stored in fixed fields or tables with a predefined schema, making it easy to search, analyze, and manipulate. Non-limiting examples of structured data include data in relational databases, financial records, inventory lists, and employee directories. Unstructured data refers to data that lacks a predefined structure and does not follow a specific format. For example, unstructured data may not fit neatly into traditional rows and columns as may some examples of structured data. Non-limiting examples of unstructured data include text documents, social media posts, multimedia files, sensor data, web page content images, memos, and PowerPoint files. In some embodiments, unstructured data does not have to be strictly unstructured, but rather may include semi-structured data, in which there is some degree of structure. Examples of this may include data with metadata or tags, and therefore this type of data often is organized hierarchically based on the fields and labels within the data. Compared to structured data, unstructured and semi-structured data are traditionally difficult to automate or manage. For example, if an AI agent requests structured data from a table to perform its functions, and permission is granted, then the structured data associated with the linked elements and sub-elements may be transferred to the AI agent for performing its functions.

Some disclosed embodiments may involve receiving AI integration code including at least one reference to the transferred at least one of structured data or unstructured data and at least one call to an AI agent. An AI integration code refers to programming code or scripts that enable the integration of artificial intelligence (AI) capabilities into an existing software application or system. For example, an AI integration code may be part of an integration workflow in which an integrator brings in new material, which may include data being transferred, upon pull or call requests, which may involve an AI agent or developer. This may be used in SaaS application or add-on integration. Receiving the AI integration code refers to the process of capturing, obtaining, interpreting, and/or handling incoming data or signals associated with the AI integration code. A call to an AI agent refers to an interaction or request made by a user or application to an AI-based system or agent. Some examples of SaaS integration that may be used with AI integration code include point-to-point integration, which involves connecting two or more applications directly, hub-and-spoke integration, which transfers data between an application and a central hub application, and hybrid integration, which is a combination of the above. AI integration code may help with data synchronization, sharing data, or general data flow. It may also allow for a continual adaption of the flow of data or the integration of data in applications, add-ons or between modules in a process. For example, AI integration code may be used to integrate data from platform elements with at least one AI agent. For example, if an AI assistant is to perform an analysis with a table of structured data, AI integration code may be used to allow the data to be integrated so the data from the table can be interpreted and utilized by the AI assistant.

Consistent with some disclosed embodiments, the AI agent is selectable from a plurality of available AI agents. An AI agent is "selectable" when it can be chosen for a particular action or operation. An AI agent is "available," when it is accessible and ready for use. For example, a developer or automated computer system may be given an opportunity to choose from a set or library of available AI agents. The selection may be made using code, automation, or individual decisions by a developer. The AI agents may be predefined, preestablished or pre-planned. Alternatively, the AI agents may be continually updated, modified, changed, or replaced, either by an existing AI agent, or by a developer. Selectable AI agents may include, for example, formula generators, planning generators, text generators, chat responders, and application finders.

Some disclosed embodiments involve selecting an AI agent from a plurality of available AI agents by analyzing application code, context, developer information, user information, or a combination thereof. Analyzing application code refers to examining and/or evaluating software source code to gain insights into its structure, functionality, and/or quality. For example, the analysis may involve an examination of the code, including understanding the logic, syntax, algorithms, and overall implementation of a software. Analysis may be done without executing the code, or during an execution of code. In some cases, analysis may include the use of an analysis module including the use of at least one processor. Additionally, analysis may incorporate AI functionality. For example, analyzing application code may involve elements of natural language processing, including machine learning and neural networks. In one example case, task generation can be automated based on user input, which can include a text query which is then assessed using AI functionality, an AI agent selected, and the resulting output can allow the user to select, deselect, or group tasks. In another example, an AI agent may be selected to close communication loops, including suggesting replies, rephrasing for tone, summarizing conversations, and provide automatic updates for a conversation. Further consistent with some disclosed embodiments, the analysis is performed by a predetermined AI agent. A predetermined AI agent may refer to one which was selected by a developer prior to the current operation, one which had been selected independent of developer input, one whose utility has been pre-characterized, or one that is selected in an AI process. Non-limiting examples of a predetermined AI agent include a simple reflex agent, a model-based reflex agent, a goal-based agent, a utility-based agent, or a learning agent. An AI agent may also be a multi-agent system involving coordination of other or lower-level agents. A hierarchical agent is another type of AI agent, which, for example, may include lower-level or lower-complexity AI agents that are integrated into or selected by a higher-level AI agent. For example, if an instruction is received to automatically generate a text document, then the application may use a predetermined AI agent, which may include an AI agent that had been previously reported as successfully solving the task for said user. In some embodiments, an output may be provided for every input. In some embodiments, the AI bot can be configured to provide an output tailored to the context and functionality the bot is working with, making the output more accurate and platform compatible. For example, the output can be designed based on the user input.

Some disclosed embodiments involve running a compliance check on the received selection of the AI assistant add-on, using a compliance check plug-in tool. The compliance check may also be done on the input text from a user. The terms compliance check and compliance check plug-in tools may be interpreted consistent with the descriptions of these terms elsewhere in this disclosure. Compliance checks may be useful for ensuring ethical use of AI, data, or access to data. A compliance check may be performed on an individual add-on or multiple add-ons at around the same time. The same or different plug-in tools may be used on at least one add-on. A check may be automated and initiated by an AI agent, developer, user, or automatically without independent input. The compliance plug-in tool may provide a pop-up message for a user. The plug-in may provide a means for compliance according to a standard, for example, SOC 2. The plug-in tool may be made by a third-party company and integrated with the AI agent software or system. For example, a compliance check may seek to ensure that the selected AI add-on is following the user's permissions accordingly and not using the data inappropriately. For example, an AI bot that does not pass the compliance check may be copying data from a table and sending it to another website, without the user's permission.

Some embodiments involve publishing the application for selective use with at least one of the SaaS platform elements, wherein in use, the published application is configured to exchange data with the at least one of the plurality of SaaS platform elements. Publishing an application refers to making an application made available for use to users, developers, or a system. As used herein, publishing may also refer to enabling the application to be available to at least one AI agent. The application may be published in a way that is self-contained or framework dependent. To exchange data may refer to transferring data. This may include outputting data, receiving data, or a combination thereof, between the platform elements and the application. This exchange may be done directly or go through at least one intermediary, which may, for example, be part of the same system or an entity separate from the system. The exchange may be wired or wireless and occur within the same network or between different networks, for example, through the Internet or cloud. The application allows for an exchange of data with at least one element, and it may also allow for an exchange between elements. For example, a user may wish to include formulas as elements in a board in the UI, and an AI agent can be used as a formula editor or generator to allow the user to input a desired formula in plain language and let the AI agent produce the code version of the formula.

Figure 6:
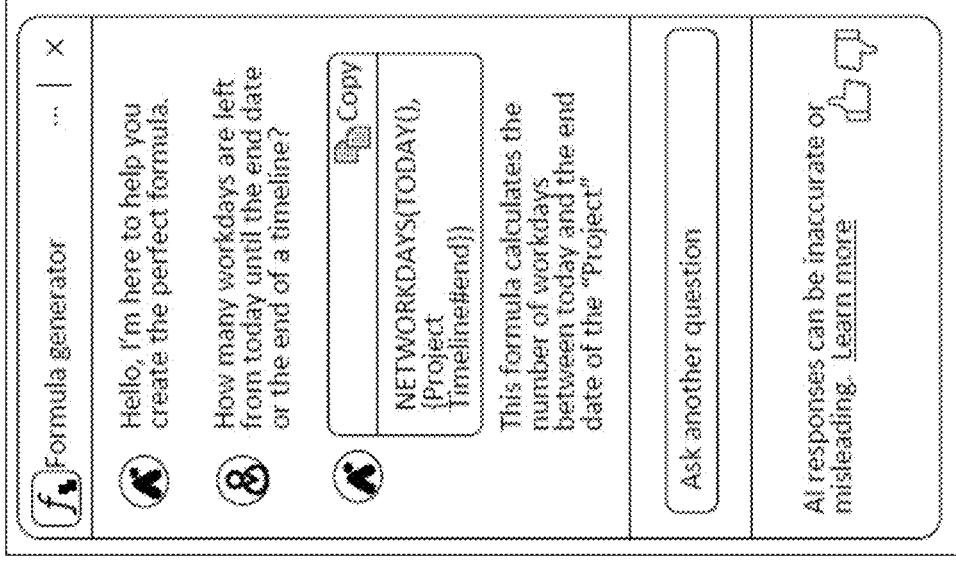
FIG. 6 is an illustration of an exemplary user interface associated with generating or editing formulas using AI functionality, consistent with some embodiments of the present disclosure.

FIG. 6 illustrates a non-limiting example of a user interface for generating or editing formulas using AI functionality. There may be other forms that a formula-generating AI agent may take without departing from the scope of the present disclosure. In this example, one or more processors may receive a query regarding how many workdays are left for a project, and the AI agent may generate a formula for calculating the workdays left automatically. The AI agent may copy the formula and paste it into a table in one or more boards, for example. The AI agent may also allow make modifications or additions to the formula based on received requests or other predetermined rules, parameters, or settings.

In another example, an AI agent be used to assess a user board on a UI to then identify to be added to the board. The tasks may be generated and added automatically to the board following the AI agent's identification, or may be provided as suggestions or options to a user. In the latter example, the one or more processors may then receive an input from the user corresponding to the provided suggestions/options.

In another example of selective use of an AI agent, a board might include a document including an input such as a "write me" feature. In this case, a new document could be created from AI using, for example, templates of documents, based on input from the user. For example, a user could type "meeting notes from community events" that causes the AI to output a well-structured template with sections or element such as event name, date, attendees, meeting goals, and action items. In this example, the user could tell the AI to "write me a document for producing meeting notes from community events." In some embodiments, the AI agent can provide a summarization of the text in a document. In these examples, the AI agent is able to provide text predictive writing, add statistical facts or extra information, or rephrase text, for example.

Figure 7:
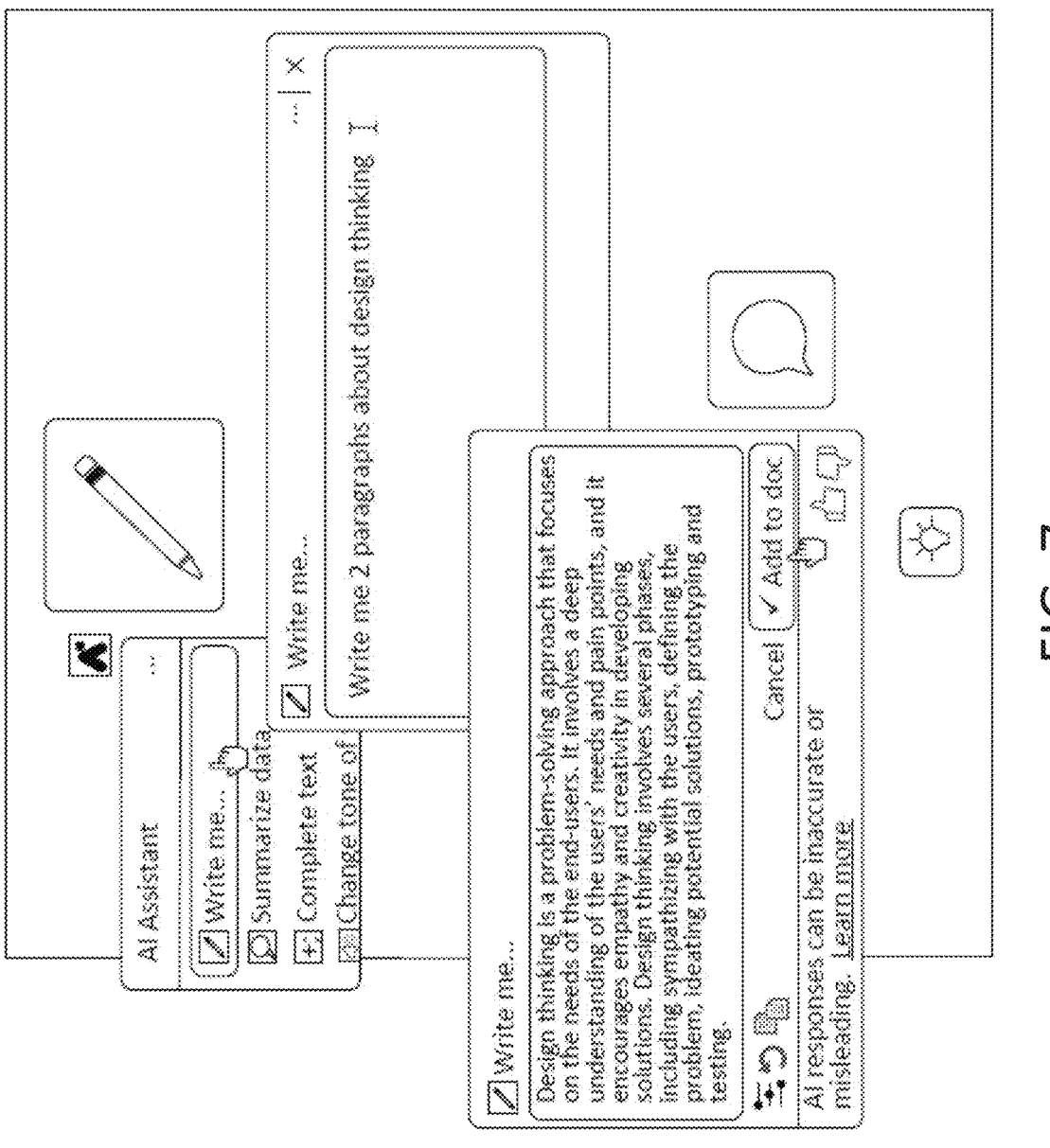
FIG. 7 is an illustration of an exemplary user interface associated with writing a document using AI functionality, consistent with some embodiments of the present disclosure.

A non-limiting example of an AI agent writing a document based on such an input is shown in FIG. 7. In this case, one or more processors may receive a user selection of "write me . . . " and a query such as "Write me 2 paragraphs about design thinking." The AI assistant then may output the 2 paragraphs as requested, and may add the paragraphs to a document automatically or following a user prompt such as "Add to doc." The AI agent may be configured to accept user feedback to improve performance. The AI agent may allow for additional operations, such as "summarize data," in which the document may be analyzed and its contents summarized. Additional options from the AI agent may include "complete text," in which the AI agent may complete a body of text that was started or initiated by a user input.

Consistent with some disclosed embodiments, the at least one of a plurality of SaaS platform elements includes at least one sub-element of at least one SaaS platform element of the plurality of SaaS platform elements. Platform elements may be understood consistent with descriptions elsewhere herein. A sub-element refers to a component, sub-category, detailed version of, or portion of an element. For example, a sub-element may be a component of an element within an add-on or application. In some cases, the use of an element may necessitate the use of a sub-element. For example, a column may be an element and a sub-element may include cells within the column. Consistent with some disclosed embodiments, the at least one of a plurality of SaaS platform elements includes at least one sub-element of one of the plurality of SaaS platform elements. In some cases, for example, a sub-element may be a component of one element, and additionally a separate element. There may be repetition of use or duplication of a sub-element across multiple elements, for example. For example, a board could include an element that is a table 102 of data values, and sub-elements can include specific data values in each cell of the table 102, as shown in FIG. 1. In another example, an element could include an image, and sub-elements could include pixel data. In some embodiments, sub-elements could include metadata or other information that describes the data.

Consistent with some disclosed embodiments, the at least one sub-element of one of the plurality of SaaS platform elements is a plurality of sub-elements, and wherein establishing a link further includes enabling selection of the at least one of the plurality of sub-elements for linking. In this exemplary iteration, establishing a link between the AI agent and the platform element extends the link to the sub-elements as well. For example, as illustrated in FIG. 4, in some embodiments, the at least one sub-element is set of multiple sub-elements grouped together as in 402, or perhaps a hierarchical group or organization of sub-elements 404. In these embodiments, the link may be extended to a selection of the sub-elements, or all of the sub-elements. For example, a developer or user may choose to allow usage permission for all of the sub-elements, or only a selection of sub-elements. Sub-elements may be independent or dependent on one another. For example, cells in a table may be linked together for use in operations by an AI agent, or granting of permissions by a user.

As a non-limiting example, FIG. 3 is a flowchart of an exemplary process (300) for building an application incorporating AI functionality, that may be executed by at least one processor. Process 300 is discussed herein for explanatory purposes and is not intended to be limiting. In some embodiments, steps of process 300 may be changed, modified, substituted, or rearranged, consistent with the present disclosure. Disclosed embodiments may include at least one processor that may be configured to execute stored instructions for building an application incorporating AI functionality. As shown in FIG. 3, process 300 may include steps 302, 304, 306, 308, 310, 312, 314, and 316, as shown. Step 302 may include enabling access to a developer application framework associated with a SaaS platform. Step 304 may include receiving application code for generating an application in the SaaS platform. Step 306 may include receiving a selection of an AI assistant add-on provided by the SaaS platform. Step 308 may include establishing a link between the selected AI assistant add-on and at least one of a plurality of SaaS platform elements. Step 310 may include enabling implementation of permissions for providing access to data from the at least one of the plurality of linked SaaS platform elements. Step 312 may include configuring a transfer of at least one of structured data or unstructured data from the at least one of the plurality of linked SaaS platform elements based on the implemented permissions. Step 314 may include receiving AI integration code including at least one reference to the transferred at least one of structured data or unstructured data and at least one call to an AI agent. Step 316 may include publishing the application for selective use with at least one of the SaaS platform elements. In some embodiments, in use, the published application may be configured to exchange data with the at least one of the plurality of SaaS platform elements.

By way of a non-limiting example, FIG. 4 depicts several exemplary processes that involve three exemplary AI assistant add-ons 410, 420, 430 and their associated elements 412, 421, 431 and various sub-elements. These are non-limiting examples of how AI assistant add-ons may be utilized in some embodiments. Many other possible configurations of AI add-ons, elements, and sub-elements may be used. In one example configuration 400, AI assistant add-on 410 uses one element 412 which is configured with a single sub-element 414. Another configuration 402 of AI assistant add-on 420 uses one element 421, configured with a group of sub-elements 424, 426, 428 in parallel operation, with the specific number of sub-elements variable to sub-element 2-N 428. Yet another configuration 404 of AI assistant add-on 430 uses one element 431, and a first level of sub-elements 434, 436. In this configuration, multiple levels of sub-elements are configured under the first sub-element 434 from sub-element 3-1-2 438 to a variable sub-element 3-1-N 440. This presents a possible hierarchical organization of sub-elements, which may involve each subsequent sub-element being dependent on the preceding one.

As depicted in FIG. 4, each AI assistant add-on 410, 420, 430, and so on, may be unique. That is, a first element may be functionalized by a first add-on, and a second element may be functionalized by a second add-on. In some embodiments, this may suggest that an add-on has a specialized purpose in a one-to-one correspondence to the element that it functionalizes. For example, AI assistant add-on 410 is in one-to-one correspondence with one element 412. In this context, functionalize may refer to the operation to implement functionality to an element. Implementing functionality may involve providing structure or content to an element 412 or sub-element 414, for example, or it may involve altering an element or sub-element in some manner.

As a non-limiting example, as shown in FIG. 4, subelements 414 are typically associated with a particular element 412, which is used by an AI agent. However, in some possible embodiments, a sub-element, or possibly a copy of a sub-element, may be used with multiple elements or AI agents.

There are many potential ways to improve the performance or reliability of a process incorporating AI functionality into an application. For example, applications that incorporate AI functionality may be presented with a complex request from a user that requires some processing or filtering to enable AI functionality with confidence. In some cases, there may be many AI agents to choose from, and an application may need some guidance to choose an appropriate AI agent. In some embodiments disclosed herein, processes are described that explain ways to select an AI agent (or agents) from a pool of AI agents.

Some embodiments of the present disclosure may involve selection operations for a plurality of distinct Artificial Intelligence (AI) agents. Selection operations in this context refers to choosing, picking, or distinguishing one or more AI agents from a group or a number of options. A distinct AI agent is one that has a characteristic or behavior that distinguishes it from other agents. For example, an AI agent may be distinct if it provides at least one function, purpose, application, solution, task, behavior, or use that distinguishes it from other agents. Distinct AI agents may be associated with individual applications or add-ons to one or more applications. For example, one distinct AI agent may be used to analyze text, while another may be used to analyze audio. Based on a developer or computer system's needs or requests, the selection operations allow for choosing appropriate AI agents. AI agents may also be distinct by the way they interpret code or respond to a request from a user or developer. Some examples of selected AI agents include a document template generator, a text/content generator, a text operation pop-up window, a formula editor, a task/planning generator, an application finder, dashboard generation/modification, board structure builder, and task automation. Task automation may include, for example, status updates, email notifications, dependencies, due date alerts, task assignments, time tracking, progress updates, automated workflows, Gantt charts, and building forms.

Some embodiments may involve accessing an application that employs AI functionality. Accessing an application refers to gaining entry into, obtaining, or retrieving an application. In some examples, accessing may include giving or receiving a permission or privilege, navigating to a desired location, being guided to a location, or reading or writing data. An accessed application is one that may be wholly or partially employed for achieving at least one function. AI functionality refers to capabilities and/or features provided by artificial intelligence (AI). For example, such capabilities may include one or more of basic tasks like pattern recognition, to complex processes involving decision-making, natural language understanding, and/or problem-solving. In some cases, an application employing AI functionality may be a sub-application within a broader application. For example, a UI may include an "assistant button," or any icon or link that facilitates a connection to access AI agents for AI functionality. This may allow a user to seamlessly or simply access various types of AI services, which may include, for example, text, image, and video automation or processing. For example, AI functionality may be incorporated as a "bot," such as an AI chatbot, which may engage with the user of an application. In this context, for example, a bot may serve to enhance a customer service process or make a user interaction with an application more efficient.

Some embodiments involve sending, via the application, a common prompt to a plurality of distinct AI agents. A prompt is a message, question, or indication presented to elicit a response or action. It can be a textual message, a dialogue box, an input field where an entity such as an AI agent is pinged or queried to provide information or make a choice. Prompts may be in the form of free language input requests for provision to an AI agent UI, as a coded message directed to an AI agent API, or a combination of both. As an example, prompts may be provided with instructions concerning the nature of the response, and such instructions can be textual within the free language prompt, included in a settings message sent to the AI agent API prior to providing the AI agent with the request, or hard coded into the API of the AI agent. A common prompt may refer to a prompt whose content is essentially similar when sent to a plurality of AI agents. In some embodiments, a common prompt may have slight differences for each configuration sent to at least one distinct AI agent in a plurality of AI agents. The instructions in a prompt may be similar even though the format may differ slightly. For example, a common prompt may be "Complete task 1", but as two AI agents involved may use a different language or format, each agent would be effectively receiving two queries with a different format, even if the essence of the two queries is the same or like a single query. Sending the prompt may occur in the backend of the application, such that a user would not be exposed to the way an AI agent is chosen. Sending the prompt may be done as a plug-in feature for an AI add-on or application. In some embodiments, each distinct AI agent may be provided by a differing entity. Alternatively, in some other embodiments, at least some of the plurality of distinct AI agents is provided by a same entity. A common prompt may include user requests, such as those shown in FIG. 2. For example, a common prompt may be an input of "write me a document summarizing our workflow."

Consistent with some disclosed embodiments, the operations further include analyzing a context associated with the common prompt. A context refers to circumstances, conditions, environment, or background in which something exists or occurs. Analyzing a context for a prompt refers to examination or consideration of surrounding information and/or relevant factors to better understand the meaning and/or intent of the prompt. For example, a context may refer to any kind of information or instructions that associates a query with a specific topic or sub-element. Increasing the context of the query may lead to a more accurate selection of an AI agent, and a better prompt which may lead to a more satisfactory response. For example, one or more processors may receive a prompt with general instructions associated with a particular result, but the prompt may not expressly include the series of actions required to achieve the result. By analyzing context associated with the prompt to determine an intent of the user, the system may generate a more accurate result. Some embodiments may determine an intent or context of the prompt consistent with techniques disclosed in U.S. Provisional Application No. 63/519,519, filed on Aug. 14, 2023, incorporated herein by reference in its entirety.

A context may be like a filter in that it may limit what a computer system or query may or may not see. A context may include a configuration, modification, addition, removal, or replacement of the prompt, or a portion of the prompt. A context may, for example, be provided from a query or input secondary from the prompt. Alternatively, a context may be held as a constant for a type or configuration of a prompt, which may improve computational efficiency or performance reliability. For example, if a prompt includes "write me a document summarizing our workflow," then the intent of the user's request is investigated by analyzing the context of that prompt, which may include, among other things, the recent history of a user's reports on the workload and progress that may be found on their board. The context may be determined using techniques such as natural language processing, or machine learning. For example, if a user's prior interaction with the AI agent may require multiple prompts and iterations between the user and the AI agent for the agent to grasp the context and the intent behind the user's request, which may have been provided either via textual or non-textual medium, or a combination thereof. In such an example, the specific query or prompt and the interpretation will be stored in the memory for that user in association with the solution that was found, to improve the speed and accuracy of responses to future prompts.

Some embodiments may involve receiving from each of the plurality of distinct AI agents a response to the common prompt. A response refers to piece of information or data that is sent as a reply to a request, query, or preliminary information preceding the response. In response to a query, the queried AI agents send responses that may provide instructions, information, or data to be further analyzed in the application. The responses may be determined at least in part using the context determined for the common prompt. Receiving a response refers to capturing, obtaining, interpreting, and/or handling the response. In some examples, receiving a response may refer to saving the response to short- or long-term memory. Receiving the response may be performed automatically by the system, such as through an interface in which the response is received. In some examples, a response may be received with the aid of an AI Agent, or manually through a user or developer. For example, a response may be presented to a user or developer, or it may be presented to backend software and not be displayed to a user or developer. Depending on particular design constraints, a received response may be interpreted, analyzed, parsed, saved, stored, processed, modified, or configured for further or future use. In operation, a query may be sent to a plurality of AI agents, and each agent may send a response that is received by operation of at least one processor. For example, each of a plurality of AI agents may respond to the common prompt by sending a data packet with information telling the application whether the AI agent is available or useful for a request associated with the prompt. In some embodiments, preliminary information included in the response to the common prompt may include an estimated time for providing the complete response, an amount of expected workload or a degree of the workload of the response, a number of times a query was sent, or any information that may relate to the efficiency or effectiveness of a response and AI agent interaction. In some cases, the response can be directed to the platform itself and contain instructions for creating elements on the platform on behalf of the user. For example, in response to a "build an event planning board" input, the response can be an actual board that is added to the user's account, a representation of the board in a new user interface, or as a live element or picture in the current user interface.

Consistent with some disclosed embodiments, receiving from each of the plurality of distinct AI agents a response to the common prompt includes receiving from each of the plurality of distinct AI agents at least a portion of a response to the common prompt. Receiving a response refers to the process of capturing, obtaining, interpreting, and/or handling the response. A portion of response refers to a section, component, representation, or piece of a response. For example, multiple AI agents may contribute a section or piece of data associated with a response. Or, for example, multiple AI agents may contribute full responses. In some examples, a response may involve various columns or pieces of data in a table, and differing columns or pieces may be contributed by differing AI agents.

Consistent with some disclosed embodiments, information associated with each of the received responses includes content of the response and a response time. Content of the response refers to information contained in the response. It may include any amount of information or data contained within the response, or the entirety of the response. Content may also include any form of data or information, including code, text strings, databases, or numbers. A response time refers to an indication of when the response was sent or received. Alternatively, a response time may refer to when a query was received by an AI agent, the time that a response time was sent, the processing time of information by AI agent, the real or absolute time of any of the aforementioned events, any input delays for processing of information, or any relative timing between signals. Information regarding response time may be useful for many purposes, including analyzing efficiency, analyzing any computer system delays, coordinating information, or assessing relative timing of events. For example, the AI agent may include, in response to a prompt to write a paragraph to an AI agent, the time it takes the AI agent to provide the paragraph. In some embodiments, the relative time required for such responses from a plurality of AI assistants may be used to help select an AI agent. For example, an AI agent associated with a lowest response time associated with similar prior prompts may be selected to address a new prompt or complete a task associated with the new prompt.

Some embodiments may involve comparing information associated with each of the received responses. Comparing information refers to examining two or more sets of data, facts, or details to identify similarities, differences, patterns, and/or relationships between them. As described herein, comparing information may be done by analyzing the responses received from a plurality of AI agents to assess their utility or applicability for addressing a query. A comparison could be made by analyzing segments or portions of information associated with each of the received responses, or by analyzing the entirety of the data or information associated with one or more queries and a plurality of AI agents. By way of non-limiting examples, the comparison may include: a reference or lookup table; preestablished information or protocols to match response information against; predictive AI in a computer system to perform the comparison; and/or a separate or integrated code used to perform the comparison. As an example, in response to a query, one AI agent may send a response "available," and another AI agent may send a response "not available." In another example, one AI agent may send a response, in which a portion of the response is "applicable," while another AI agent sends a response, with a portion that says "not applicable." In yet another example, each AI agent may send differing sets of information which are then compared to determine the set most suitable. The information in the responses may contain data in an answer to a user query, or the information may include data related to the query, but not necessarily answering it directly. For example, in response to a request to write a paragraph about generative design, as in FIG. 2, an AI agent may send a response that includes the paragraph, while another AI agent may send a response that says that it is not able to complete the task. In this example, the information would be compared between the two AI agents to compare the responses for further use. In another example, two AI agents may be able to complete the task from the previous example of writing a paragraph about generative design, and both AI agents may provide a paragraph in response, but one may be provided faster and with a greater complexity of writing, which could be determined in the comparison.

Consistent with some embodiments, the comparison of information associated with each of the received responses is performed by a predetermined AI agent. A predetermined AI agent refers to one that had previously been selected, identified, or used in an application. For example, a predetermined AI agent may refer to one which was selected by a developer prior to the current operation, one which had been selected independent of developer input, one whose utility has been pre-characterized, or one that was selected by a trained AI agent. Non-limiting examples of a predetermined AI agent include a simple reflex agent, a model-based reflex agent, a goal-based agent, a utility-based agent, or a learning agent. An AI agent in this document could also be a multi-agent system involving coordination of other or lower-level agents. A hierarchical agent is another type of AI agent, which, for example, may include lower-level or lower-complexity AI agents that are integrated into or selected by a higher-level AI agent. For example, a predetermined AI agent may be used to compare the information in two responses from multiple AI agents tasked to write a paragraph about generative design. In this example, the predetermined AI agent may assess features such as the writing complexity, language, quality, and user history, when comparing the responses.

Consistent with some embodiments, comparing information associated with each of the received responses includes determining a score for each of the received responses by analyzing information associated with each of the received responses and ranking the plurality of AI agents according to the determined scores. A score refers to a numerical or qualitative rating based on criteria or metrics. Based on assigned scores, each response may be ranked. Such rankings may provide a quantitative means to assess or analyze the comparison of information or relevance to a query for responses from AI agents. It may be helpful to use a score, because in some embodiments, the responses may have information presented in a broad spectrum or some complex manner, which could make an analysis for use in an application or matching a query difficult. For example, the information may include a combination of different types of information, and each type may contribute to differing degrees to the score. By analyzing (e.g., evaluating or assessing) information in each response in the context of criteria, a relative score may be determined. For example, when two or more responses are provided from a plurality of AI agents requested to write a paragraph about generative design, as in FIG. 2, a comparison of the responses may include metrics for analysis which provide a score for the responses, and this score may include an assessment of the appropriateness of the generated paragraph in addressing the user's needs. Additionally, a prompt or a response may be predetermined and compared to other predetermined prompts using an AI agent. In some cases, for example, the score may be used to amend the predetermined prompt.

Consistent with some embodiments, analyzing information associated with each of the received responses includes at least one of evaluating quality of content of each of the received responses, determining a response time for each of the received responses, or a combination thereof. Quality of content refers to a value or measure of the standard or condition of content. For example, quality value may relate to how well the content satisfies a particular criteria. Alternatively or additionally, quality of content may be determined relative to some other content. Quality of content may include the integrity of data, the interpretability of the content, the timeliness of the content, or how well the content achieves its goal. Quality of content may be a precursor to the analysis of information, or it may occur as a part of the analysis that may include comparing information in the responses from a plurality of AI agents. For example, responsive to a request for automatic generation of emails, the responses from AI agents may be analyzed for quality of content either by another AI agent, or based on feedback received from a user.

Consistent with some embodiments, following ranking of the plurality of AI agents according to the determined scores, the operations further include saving the determined scores in a database for influencing future comparisons. Saving may refer to storing the scores of indications of the scores in a data structure. The storage may enable later access. Saving may include saving information to memory, either short-term, including random access memory (RAM), or long-term, including server or hard drive storage. The scores may be saved in a database, which may be a structured set of data, which is typically accessible in various ways and held in a computer. Influencing future comparison may refer to some embodiments in which comparisons use previously saved information to inform the comparison or analysis.

Some embodiments may involve selecting at least one AI agent from the plurality of distinct AI agents based on the comparison. Selecting refers to choosing from a group or set. For example, an AI agent may be selected following the comparison with other AI agents. In some examples, the selection may be a most optimal AI agent or a plurality of AI agents to address a query. In other examples, a non-optimal selection may be chosen based on other criteria. Upon selection, the at least one AI agent may be assigned to further process and address one or more tasks of the query. For example, a prompt may be "complete task," and after the AI agents send responses to this query, one agent is determined to match the query, so it is selected and assigned to the task. In some embodiments, the selected agent may generate and/or provide a response to the query or prompt to a device associated with the user. In some embodiments, an AI agent may generate and/or provide automatic suggested replies, or rephrasing of text, for a conversation, such as a chat box or emails.

In one example of selecting an AI agent, a product manager may wish to ensure a smooth production of a product. In this example, the product manager may provide an input "release a new feature to production," and an AI agent is selected for providing an output including a list of tasks related to the future release, where the tasks are selected in a manner that avoids overlooking any known or previously-identified aspects that are important to a project. The system may then allow the product manager user to review the list and provide input for selecting and deselecting tasks as desired. In some embodiments, the user interface may allow the product manager to select one or more options to modify the list such as "add the items," after which the AI agent can automatically add the selected tasks to a board on the user interface.

Consistent with some disclosed embodiments, selecting at least one AI agent from the plurality of distinct AI agents based on the comparison, includes selecting at least one AI agent from the plurality of distinct AI agents based on the comparison and the analysis of the context associated with the common prompt. In some embodiments, using context analysis of the prompt in combination with a comparison of information in the responses may provide a more accurate match for a query and AI agent. For example, the context alone may not be sufficient to select an AI agent, so additional information may be needed from the comparison of responses from a pair of AI agents. As an example, the system may receive a prompt of "write me a document summarizing the available applications," and based on a contextual analysis of the prompt, the system may determine what types of applications the user is most likely referring to, allowing for selection of an AI agent that is best configured to generate such a document.

Consistent with some embodiments, selecting the at least one selected AI agent from the plurality of AI agents is based on the determined scores. For example, selection may be done by assessing the ranking of the plurality of AI agents for the AI agent with the highest score. Alternatively, in some embodiments, an AI agent may be selected despite it not having the highest score. In other words, a developer or user may choose an AI agent that does not have the highest score or rank but may be, for example, more suitable for another reason. Following a previous example, if a prompt is provided to "write me a document summarizing the available applications," selection of an AI agent may be done based on scores associated with the comparison of the responses. For example, if the responses of one AI agent is scored to be 2 out of 10, and another response is scored to be 9 out of 10, then the latter will be selected.

Consistent with some embodiments, selecting at least one AI agent from the plurality of distinct AI agents includes selecting at least two AI agents from the plurality of distinct AI agents, and merging responses of the at least two selected AI agents to generate a merged response. Merging responses refers to mixing, joining, consolidating, integrating, uniting, incorporating, or combining a plurality of responses. Merging responses may have the goal of producing a unified response, which could be managed by a third AI agent, developer, or individual. Merging may occur, for example, via addition of messages, or interpretation and combination via code. Interpretation and combination may involve, for example, listing portions, components, or information from each response, analyzing the response content, and combining the content of the responses to produce a merged response. As an example, merging responses of at least two selected AI agents may provide an efficient or clearer message to a user when at least two AI agents are selected. Two AI agents may be selected, for example, if the combination of their responses better solves a user need or query than if a single AI agent is used. In some cases, two agents may be needed because a single agent to complete a task does not yet exist. For example, a received prompt may involve generating a formula and determining or identifying data that the formula should apply to, and the selection process may determine to best use two distinct AI agents whose responses are merged to produce the desired outcome.

Consistent with some embodiments, merging responses of the at least two selected AI agents is performed by using a preestablished AI agent. A preestablished AI agent refers to one which was selected by a developer prior to the current operation, one which had been selected independent of developer input, one whose utility has been pre-characterized, or one that was selected by a trained AI agent. An AI agent may be preestablished, for example, by providing a specific prompt, a prompt selected respective to the nature of the response from a repository of queries, on the manner in which the merger should occur. Non-limiting examples of a preestablished AI agent include a simple reflex agent, a model-based reflex agent, a goal-based agent, a utility-based agent, or a learning agent. An AI agent in this document could also be a multi-agent system involving coordination of other or lower-level agents. A hierarchical agent is another type of AI agent, which, for example, may include lower-level or lower-complexity AI agents that are integrated into or selected by a higher-level AI agent. One possible benefit of using a preestablished AI agent to merge responses is that the process can be automated and can include learning and making improvements over time. For example, following receipt of a prompt to write five paragraphs about project management, a plurality of AI agents may provide responses containing five paragraphs, and analysis may determine that a combination of the responses may yield the best outcome for the user, so the responses are merged. In another example, a prompt may be a compound prompt that includes two or more requests at once. For example, a user may input "write me a document describing how to generate formulas for summarizing columns," and the output of two AI agents may be required, such that the output of a first AI agent configured to write documents may be merged with the output of another AI agent configured to generate formulas for tables.

In some disclosed embodiments, merging responses of the at least two selected AI agents includes balancing responses of the at least two selected AI agents. Balancing refers to combining a plurality of responses in accordance with some relative value presented by each response. Balancing responses refers to an act of taking into account and/or weighing two or more options to provide a measured, optimized, or well-rounded response. The result may be referred to as a "merged response." In some embodiments, balancing responses may refer to utilizing a comparison, score, or ranking of the responses to produce a merged response that combines the responses in accordance with the comparison. In some embodiments, balancing the responses may occur in the backend software without the developer or user being made aware. In some other embodiments, balancing the responses may occur with user or developer input. Balancing the responses may allow the application to provide a higher quality experience to a user or developer. For example, if two agents are selected for use, and their responses merged, a balancing of the response may occur, allowing for their use to be better coordinated to complete a task in response to a query. For example, balancing responses of two document-generating AI agents may be necessary to determine the best way to merge their responses to address a user's query.

Consistent with some embodiments, the operations further include outputting the merged response. The term outputting refers to presenting a result, data, or other information. Outputting the merged response refers to presenting or sending the response to a user, developer, computer system, AI agent, a software component, and/or any other entity. The output of the merged response may occur as a display, a printout, audio, video, textual information, or input to software or hardware applications. By way of another example, outputting may include transmitting the merged response to electronic memory for storage. Alternatively, or additionally, outputting may refer to sending the response over a network or the Internet. For example, if the merged response is outputted, it may be displayed to a user on a screen to be read, and optionally saved to computer memory.

Consistent with some embodiments, the operations further include outputting the response of the at least one selected AI agent. The output may be received by a system or device associated with a user or sender of the query, in a manner similar to that described above.

Some disclosed embodiments involve receiving a feedback signal on the outputted response, wherein the feedback signal is either positive or negative; if the feedback signal is negative, selecting at least one other AI agent from the plurality of distinct AI agents; and outputting the response of the at least one other selected AI agent. A feedback signal in this context refers to a reaction to an outputted response. The reaction may be a response or information that is sent back to a system, process, or device associated with the output. The feedback signal is received when it is captured or obtained. In some embodiments, the signal may be used as a means for improvement, analysis, or decision making. For example, a feedback signal associated with an outputted response may serve as a means to assess the quality, reliability, utility, applicability, or practicality of optional AI agents being selected from a plurality of AI agents. In some embodiments, a positive feedback signal may indicate that an AI agent may be a good option for selection and a negative feedback signal may indicate that an AI agent may be a bad fit for selection. For example, an AI agent may send a response containing the feedback "positive" when a query is sent to that AI agent, and subsequently the AI agent may be selected from a plurality of AI agents. Thus, feedback may be used to improve future responses by establishing a preference for responses with more positive feedback, while avoiding responses with negative feedback due to, for example, a significant delay or unjustified workload. In some embodiments, a feedback signal could have some combination or variation of positive or negative components. The feedback signal, for example, could be binary, an OR gate, a string, a number, text, code, or some combination of the above. The feedback signal could occur within the backend software in an application, handled by another AI agent, or the signal could be displayed to a user or developer person via code or a user interface. In some cases, the feedback can be received for the entirety of the outputted response, on single portion thereof, a single feedback on a multiple portions of the feedback or a plurality of feedbacks for respective number of portions in the feedback. For example, feedback may include a satisfactory scale from 1-10, in which a user can select at least a number from the scale to indicate their satisfaction level.

Consistent with some embodiments, the feedback signal is received from a user via a user interface. A user interface is a tool or space enabling interactions between humans and machine. For example, a user interface may include a graphical user interface, command line interface, menu-driven interface, touch user interface, voice user interface, form-based user interface, natural language user interface, or a virtual reality interface. A user may input information using a user interface. Input from a user may be used to help select an AI agent from a plurality of AI agents. Inputting may, for example, be done by a text box, code, bubble selection, dropdown, or any method of allowing a user to interact with a user interface. The user may input information in the user interface by, for example, selecting an icon, entering text, selecting a bubble, writing code, selecting from a dropdown menu or list, drawing, speaking, thinking, or gesturing. Selection may be done entirely by user input, or in combination with developer input, including another AI agent. In some cases, when the output includes elements or sub-elements of the SaaS platform, the output selection of the actual elements or sub-elements that were provided by the AI may result with opening a user interface through which feedback can be provided. For example, if the input is "build a formula column that can do X," then the output may be the elements and sub-elements from the AI agent along with a user interface allowing feedback to be provided. In another example, a user may wish to generate a form based on input questions, and solicits the help of an AI agent, which automatically generates the form and then solicits the user for feedback to improve the AI agent's performance. Examples of allowing a user to provide feedback on a user interface are shown as thumbs up and thumbs down icons in FIG. 6 and FIG. 7.

Some disclosed embodiments involve storing in a database a record of the common prompt and the at least one selected AI agent. Storing may include saving information or data, for example, to a memory associated with a computer or server for later use. In some embodiments, storing may refer to organizing, saving, filing, recording, or maintaining data in a database or file system. A record refers to one or more related data items that are grouped together and treated as a single unit. A record of the common prompt and the at least one selected AI agent may include portions or all of the data relevant to the process of sending, receiving, analyzing, comparing, or selecting an AI agent, and portions or all of the common prompt or context used to send a query to the at least one agent. For example, if a query includes "write me a document on cooking," and an AI agent provides a response and is selected, then this combination may be stored in a database for record keeping and potentially later recall. This could, for example, improve future performance of the system in addressing similar or identical queries.

Figure 8:
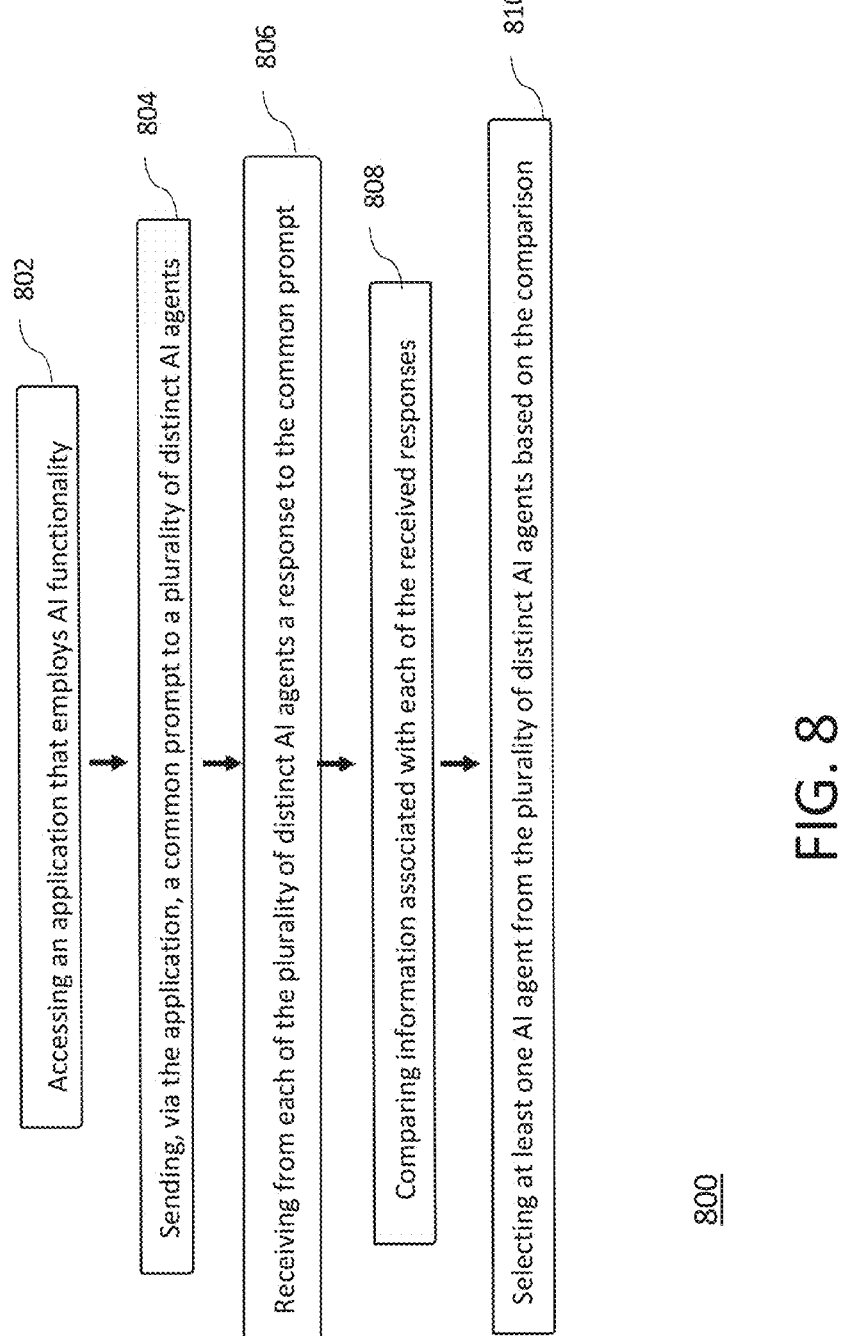
FIG. 8 is a flow chart of an exemplary process for selection operations for a plurality of distinct AI agents consistent with some embodiments of the present disclosure.

FIG. 8 is a flowchart of an exemplary process (800) for selection operations for a plurality of distinct AI agents, that may be executed by at least one processor. Process 800 is discussed herein for explanatory purposes and is not intended to be limiting. Process 800 may represent a non-transitory computer-readable medium, a method, or a system for selection operations for a plurality of distinct AI agents. In some embodiments, steps of process 800 may be changed, modified, substituted, or rearranged, consistent with the present disclosure. Disclosed embodiments may include at least one processor that may be configured to execute stored instructions for selection operations for a plurality of distinct AI agents. As shown in FIG. 8, process 800 may include steps 802, 804, 806, 808, and 810. These steps are discussed below. Step 802 may include accessing an application that employs AI functionality. Step 804 may include sending a common prompt to a plurality of distinct AI agents via the application. Step 806 may include receiving from each of the plurality of distinct AI agents a response to the common prompt. Step 808 may include comparing information associated with each of the received responses. Step 810 may include selecting at least one AI agent from the plurality of distinct AI agents based on the comparison. As exemplary selection process is described below with reference to FIG. 9.

As a non-limiting example, FIG. 9 is a flowchart of an exemplary process (900) for selecting at least one AI agent from the plurality of distinct AI agents based on the comparison. Step 902 may include outputting the merged response. Step 904 may include receiving a feedback signal on the outputted response. In some embodiments, the feedback signal may be positive or negative in regard to the response. If the feedback signal is negative, step 904 may include selecting at least one other AI agent from the plurality of distinct AI agents, followed by outputting the response of the at least one other AI agent. For example, in some embodiments, outputting the response may be followed by receiving a feedback signal from a user via a user interface.

Computer applications involving user interfaces may present an inherent complexity when attempting to understanding user requests in some circumstances. Such inherent complexities may derive from the fact that different AI agents may be trained on different data sets—and thus certain AI agents may be significantly more profound in a certain field than in others. To address this issue, applications that involve a plurality of fields may utilize AI functionality by selecting an AI agent from a pool when an application could not easily choose an AI agent from the pool without some further processing or information. One way to help select an AI agent (or agents) is to assess AI agents based on the quality that would be provided to a user, as in processes described by some embodiments presented herein. For example, a user may seek a response for a query that uses computer resources, and allocating these computer resources appropriately would benefit the response and therefore the user.

Some disclosed embodiments may involve improving quality of Artificial Intelligence responses. The quality of a response refers to the level of accuracy, relevance, completeness, and/or appropriateness of the response. Response quality may be presented as a value or measure of the response. Improving response quality may lead to an improved satisfaction of a user.

Some embodiments involve accessing an application that employs AI functionality. Accessing an application refers to gaining entry into, obtaining, or retrieving an application, as described elsewhere in this disclosure. AI functionality refers to capabilities and/or features provided by artificial intelligence (AI), also as described elsewhere in this disclosure. As previously mentioned, an application may refer to a sub-application within a broader application or the broader application itself. Some examples of AI functionality consistent with the disclosed embodiments include a document template generator, a text/content generator, a text operation pop-up window, a formula editor, a task/planning generator, an application finder, dashboard generation/modification, board structure builder, and task automation. Task automation may include, for example, status updates, email notifications, dependencies, due date alerts, task assignments, time tracking, progress updates, automated workflows, Gantt charts, and building forms. For example, AI functionality may be incorporated as a "bot," such as an AI chatbot, which may engage with the user of an application. In this context, for example, a bot may serve to enhance a customer service process or make a user interaction with an application more efficient.

Some disclosed embodiments involve receiving from a user, via the application, a query for which a response is sought from an AI agent. A user refers to any person using an application, software, or computer. In some cases, a user can include a developer. Receiving, in this context refers to capturing, obtaining, and/or handling an incoming query for which a response is sought. A query refers to a request for information or data retrieval from a database (e.g., a data structure) or other data source. A query may be a request for a response or action and may be made by a person, developer person, trained computer system, AI agent, or manually operated computer system. A response to the query may be direct or indirect. Receiving the query may be performed automatically by the system, such as through the use of an AI Agent, or manually through a user or developer. The query may be presented to a user or developer, or it may occur in the backend software and not be displayed to a user or developer. A message may be provided to the user or developer indicating that a query has been received. For example, a user may input the query "generate a paragraph about our workflow."

Some embodiments involve analyzing the query for determining a context. Analyzing a context for a query refers to examination or consideration of surrounding information and/or relevant factors to better understand the meaning and/or intent of the query. Computer software may be used to analyze or assess a query. In some examples, analyzing a received query may include interpreting, parsing, saving, storing, processing, modifying, or configuring the query for further or future use. The analysis may involve the use of at least one AI agent which may include the use of natural language processing, machine learning, long short-term memory network, recurrent neural network, recursive neural network, convolutional neural network, or other types of deep learning or AI models. Context, as described elsewhere herein, may be any information that can improve the understanding or interpretability of the query. For example, context may include any kind of information or instructions that associates a query with a specific topic or sub-element. Greater context for a query may lead to a more accurate selection of an AI agent, and a better result for the query, which may lead to a more satisfactory response. In some exemplary instances, context may be used like a filter in that it may limit what a computer system or query may or may not see, for example. In some examples, context may include a configuration, modification, addition, removal, or replacement of the query, or it may include a portion of the query for a theme, topic, user details, or any other information that may be useful for analyzing the query. For example, a user may input the query, "generate a paragraph about the current state of electric motors," after which the application receives the query and uses designated software to perform an analysis on the query to determine its context. Following a previous example, if a query says "generate a paragraph about our workflow," then the query may be broken down and analyzed for context and intent.

Some embodiments involve, based on the context, selecting a particular AI agent from a pool of a plurality of AI agents, to which the query should be sent for response. Selecting refers to choosing one from among others. The others, are referred to as a pool. A pool refers to a set, group, subset of a group. In some examples, AI agents which are generally more relevant than others may be excluded from the pool. Selecting an AI agent may involve, for example, the action of utilizing information from an analysis and context of a user query. The selection of an agent may result in choosing a suitable AI agent or a plurality of AI agents to address a query. In operation, as an example, a query may be sent to a plurality of AI agents, and each agent may send a response that is received by operation of at least one processor. A user may input the query "generate a paragraph about solid state batteries." In some examples, the application receives the query and uses designated software to perform an analysis on the query to determine a context for said query. The analysis and context may then be used to select an AI agent that is suitable (or most suitable) for addressing the query. For example, if a user query included "generate a paragraph about our workflow," the context may include an analysis of said workflow, and a document-generating AI agent may be selected from a pool to complete the task.

Consistent with some embodiments, selecting the particular AI further includes accessing a repository associating a plurality of contexts with differing AI agents in the pool. A repository refers to a library, a table, a collection, database, or other data structure. For example, a repository may be a storage location. "Associating a plurality of contexts with differing AI agents" refers to a linking of particular surrounding circumstances, conditions, or environments to differing AI agents. In some embodiments, a repository may contain variations of possibly unique AI agents and previously analyzed queries or contexts for performing unique tasks, some examples of which are shown in FIG. 2. A repository may include a list associating different AI agents with different contexts. For example, a first AI agent associated with questions related to places, a second AI agent associated with questions related to people, or some other association. A repository may include a set of various contexts or AI agents that may be used to address different or overlapping queries. An AI agent, context, or a combination may be stored in a repository for use in an application. The combination of AI agent and context or query may have previously been determined to be a successful match. Consistent with some embodiments, selecting the particular AI agent from the pool of a plurality of AI agents includes accessing historical data on an ability of the particular AI agent to provide satisfactory responses in a context similar to the determined context. Historical data, as used herein, refers to any information regarding previous combinations of contexts, queries, and AI agents. Historical data may provide insights into the historical usage of an application, AI agent, user, or system. Satisfactory responses refer to responses that produce positive outcomes or which represent a positive input. For example, a satisfactory response may include any responses which were determined to result in a positive experience for a user or developer, or result in a successful pairing of an AI agent with a query. In some cases, an iterative process may be implemented, in which user feedback is used to continually improve both an AI agent's functionality and also its selection from a pool.

Inquiring a user for direct feedback may not always be necessary for improvements. For example, a user interview may be performed that automatically learns or adapts based on user responses or input. An example of a user interview with an AI agent is shown in FIG. 12.

Figure 12:
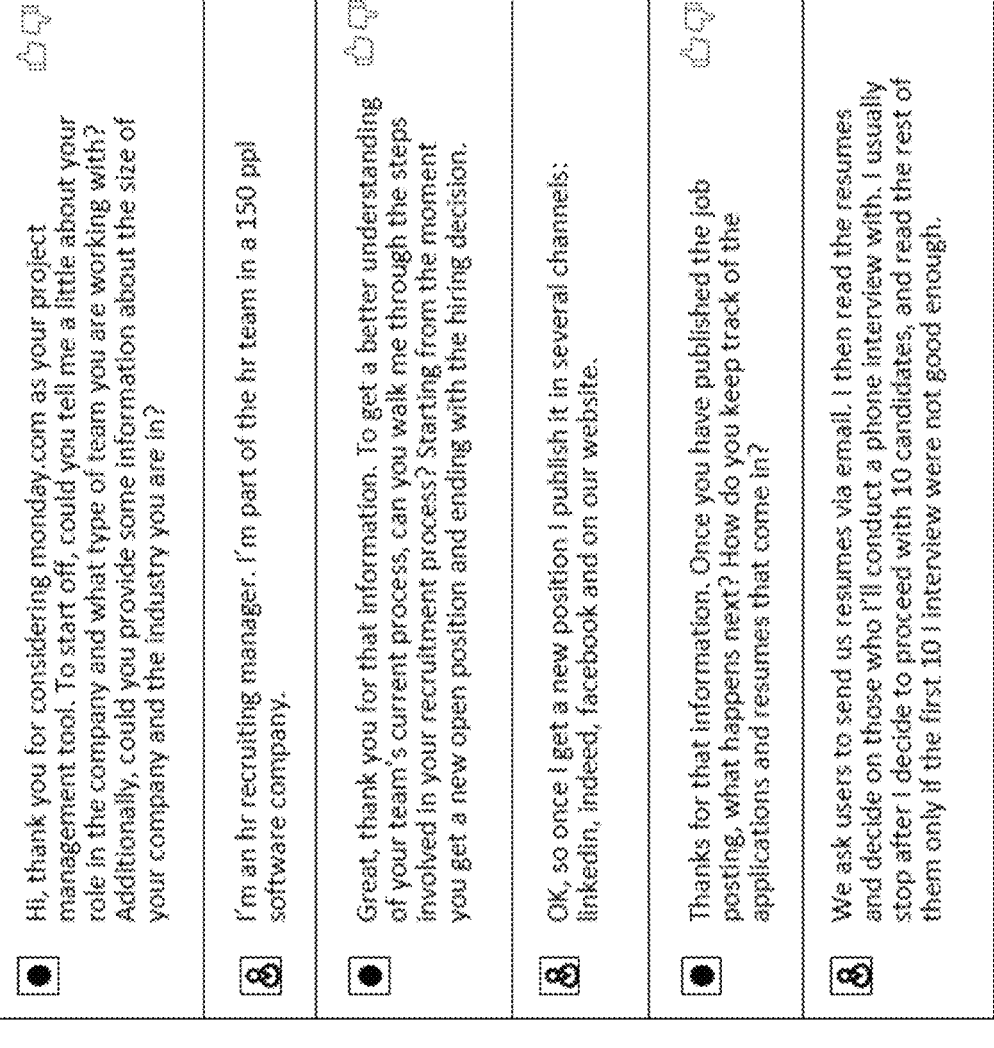
FIG. 12 is an illustration of an exemplary user interface of a system incorporating AI functionality, consistent with some embodiments of the present disclosure.

FIG. 12 is an illustration of a non-limiting exemplary case for an AI agent to investigate a user's needs and perform a user interview. The interview may be initiated by a user request or action. For example, a one or more processors may receive a selection of an icon requesting AI assistance. In some cases, the AI agent may be initiated by some automated action. For example, background processes on a board may determine that AI assistance would help a user with a task. The AI agent's questions may be generic and repeated, or the questions may be determined through AI. A user may provide feedback, for example, by selecting an icon such as a thumbs up or thumbs down for each AI generated question or response. Many other forms of questions and responses from the AI other than those shown in FIG. 12 may occur.

Consistent with some embodiments, the operations further include accessing a library associating a plurality of queries with the pool of a plurality of AI agents. A library refers to a repository. In the instant context, the library associates queries with AI agents, enabling selection of an appropriate AI agent based on a received query. Having a library available as a reference may improve performance or efficiency in an application. For example, a previous query "produce a formula to analyze X data" and its resulting output and AI agent selection may be used to improve accuracy or performance of the selection process. Consistent with some embodiments, selecting the particular AI agent from the pool of a plurality of AI agents, includes selecting from the library the particular AI agent associated with one of the plurality of queries matching the received query. Selecting from the library may include choosing a particular AI agent out of a pool or library of AI agents to best match the query. Matching the query may refer to a positive association between the AI agent and the query, for example. For example, AI agents may have descriptions or metadata that indicate their uses and when a user query is provided, the descriptions may allow for selection from the pool.

Some embodiments involve directing the query to the selected AI agent. Directing a query refers to navigating, assigning, guiding, suggesting, or sending a query to a desired location or position. In some examples, directing a query may include converting the query to a format easily interpretable by at least one AI agent or developer. The query may be directed to a single AI agent that best matched the context, or a plurality of AI agents may receive the directed query. When an application receives a query it may use designated software to perform an analysis on the query to determine a context for the query. The analysis and context may be used to select a matching AI agent that is capable of addressing the query. In this example, query would then be directed to the AI agent, which would then be expected to send a response indicating its capability or availability. In response to a query, the queried AI agents may send responses that provide instructions, information, or data to be further analyzed in the application. For example, a query might include creating or editor formulas within a board. In this example, the query might be "write me a formula for performing function X on the cells in the table," which is then provided to a selected AI agent that generates the formula, and the AI agent may include an explanation of the formula and its implementation or use. This can reduce the complexity of code syntax for a user and decrease the difficulty of operation. Another example of directing a query can include an input from a user to generate or edit a document. In this example, a user could input "write me a document summarizing our project progress," and the query may be directed to a selected AI agent that produces a document based at least partially on information from a user board summarizing the state, progress, or course of a project.

Consistent with some embodiments, the operations may further include receiving a response from the selected AI agent and conveying the received response to the user. A response, as described elsewhere herein, may refer to one or more pieces of information or data sent as a reply to a request or query. In response to a query or context, the selected AI agent may send a response that can provide instructions, information, or data to be further analyzed in the application. In some examples, receiving a response may refer to allowing a reply to be taken and interpreted or saved. Receiving the response may be performed automatically by the system, such as through the use of an AI Agent, or manually through a user or developer person, and the response may be presented to a user or developer, or it may occur in the backend software and not be displayed to a user or developer. In some examples, a received response may be interpreted, analyzed, parsed, saved, stored, processed, modified, or configured for further or future use. In some examples, a query may be sent to a plurality of AI agents, and each agent may send a response that is received by operation of at least one processor. Conveying the response to the user may include sending a message to the user, and conveying may refer to taking, transferring, expressing, interpreting, or communicating. Conveying may occur in the backend software, or it may occur through a displayed message. In some embodiments, the user may be presented with an opportunity to interact with the message. For example, a user query may include "generate a board based on my workflow" and a selected AI agent may send a response back to the user that includes one or more optional boards that the user can choose.

Consistent with some embodiments, the operations further include receiving user feedback on the conveyed response. User feedback refers to a reaction to the response by a user. The feedback is received when it is captured or obtained. In some examples, the feedback may be generated by a person such as a user or developer, and in others it may be generated at least partially by an AI agent or a computer system. Alternatively, user feedback may be input without any request from software. For example, a generic input box or interface may be placed in the application that allows a user to interact at any time to provide feedback. The feedback could occur upon completion of a received response, or during the reception of a response. For example, a response may come in segments or portions, wherein the user is prompted or requested for feedback after a partial response has been received, or wherein the response is composed of a plurality of responses. For example, an AI agent may output data for fields for each task for a user based on a suggested cost or priority, and the user may provide feedback on this output. In another example, the AI agent may respond with one or more structured board populated with fields as requested by a user, and the user may be prompted to provide feedback on these boards. Examples of allowing the user to provide feedback are shown as thumbs up and thumbs down icons in FIG. 12.

Consistent with some embodiments, the operations further include calculating a score based on the received user feedback. A score refers to a numerical or qualitative rating based on criteria or metrics. Based on how the user reacts (e.g., via the feedback) a score may be calculated. Calculation may involve a relative weighting, or it may be a binary indicator (e.g., acceptable/non-acceptable). A score may be calculated in any manner depending on system/software design. In some examples, based on assigned scores, each response may be ranked. Such rankings may provide a quantitative means to assess or analyze user feedback. It may be beneficial to use a score, where in some embodiments, the responses may have information presented in a broad spectrum or some complex manner, which could make an analysis for use in an application or matching a query difficult. For example, the information may be comprised of a combination of different types of information, and each type may effectively be a component comprising the score. A score may, for example, include a satisfaction score from 1-10, and may be assessed for specific feedback provided or for average feedback. For example, a specific feedback for one line generated by the AI agent in a user interview may be 100%, but the average of a user's feedback on all of the AI agent responses in an interview may be determined to provide a score of 86% satisfaction.

Some disclosed embodiments involve storing, in a data structure, the query, the response of the selected AI agent, the user feedback and the calculated score. A data structure, as described elsewhere herein, may be a storage used to store, organize, arrange, or provide data. A data structure may, for example, include a database, vector, scalar, string, algorithm, or a combination thereof. The data structure may also store meta data. For example, the query, response, user feedback, and score for each scenario may be stored together, which would allow for future operations to learn from past operations, or allow for a general improvement in performance or efficiency. For example, if a user has requested something from an AI agent in the past and it took a few iterations between the user and the AI bot for the bot to grasp the context and the intent behind the user's request, which may have been provided either via textual or non-textual medium, or a combination thereof, then, the specific query and the interpretation will be stored in the memory for that user in association with the solution that was found.

Some disclosed embodiments involve using the calculated score for a future selection of an AI agent from the pool of a plurality of AI agents. Future selection refers to selection of an AI agent at any later point in time. A future selection of an AI agent may be any situation in which a previously calculated score is used for later selection of an AI agent, or it may be any situation in which a calculated score may be used in the future. In the former situation, the calculated score may be called up from a database, data structure, or lookup table, and in the latter situation, the calculated score is saved to memory for later use. For example, a discovery interview could be used to understand a user's needs, as shown in FIG. 12, and an iterative process of reviewing the workflow and updating the AI selection process based on user needs may begin, where a board structure is generated on the UI, the user provides feedback, and then subsequent selection may take this feedback into consideration. In such a case, multiple AI agents may be used over time to optimize the outcome for a user. In another example, marketplace applications may be indexed using embeddings in OpenAI, and a user may prompt for an application functionality, then an AI agent may select an application based on the prompt, and seek feedback from the user, whose feedback may then update how the AI agent selects an application in future queries.

Some embodiments involve, when the calculated score is below a predetermined threshold, selecting an alternative AI agent from the pool of a plurality of AI agents, and transmitting the query to the alternative AI agent. A threshold, as used herein, may refer to a quantitative value or number that serves as a reference point that should be exceeded to proceed. A threshold may include a baseline, a limit (e.g., a maximum or minimum), a tolerance, a starting point, and/or an end point for a measurable quantity. A predetermined threshold may be a standard, goal, calculation, requirement, or suggestion. In some embodiments, the predetermined threshold may be preselected and stored in the system (e.g., during setup). The threshold may also be provided as an input from a user, developer person, AI agent, or computer system. Determining if the threshold has been achieved may be done by the application, an AI agent, a user, or a developer, for example, by comparison. An alternative AI agent may be determined to be below the threshold, and in this situation, another alternative AI agent may be determined. This could continue a single time or for any number of iterations. If a threshold is not met, the query may then be transmitted to an alternative AI agent. For example, the rationale for this approach may be to provide another AI agent an opportunity to respond to the query in a manner that will exceed the threshold. For example, a user may be dissatisfied with the responses by an AI agent in a chat box, and when the score goes below the threshold, a new AI agent may be selected for use in the chat box.

Consistent with some embodiments, the operations further include running a compliance check on the selected AI agent, using a compliance check plug-in-tool. A compliance check in this context refers to evaluating and verifying whether an AI agent adheres to specific rules, regulations, standards, or policies. In some examples, compliance checks may be useful for ensuring ethical use of AI, data, or access to data. A plug-in-tool refers to a software component that adds specific functionality or features to an existing software application. The same or different plug-in tools may be used for each AI agent. The check may be automated and initiated by an AI agent, developer, user, or automatically without independent input. The compliance plug-in tool may provide a pop-up message for a user. It may provide a means for achieving compliance according to a standard, for example, SOC 2. The plug-in tool may be made by a third party company and integrated with the AI agent software or system. Consistent with some embodiments, calculating the score includes calculating the score based on the received user feedback and the run compliance check. By way of example, calculating the score using this combination may be done using some weighting algorithm, AI, machine learning, or logic gating. The combination of compliance check and user feedback may enable the best or most appropriate quality or outcome for a user. For example, a score for the user feedback may be 86% and the compliance check score may be 66% and a new score that combines these two values may be calculated.

Some disclosed embodiments involve analyzing the query for determining a context includes at least one of: analyzing and breaking down a language used in the query; identifying keywords; classify the query; inferring an intent; analyzing details associated with the user, or a combination thereof. Analyzing may be interpreted consistent with the description of the term elsewhere in this disclosure. As used herein, breaking down may refer to deconstructing elements of a language for analysis. A language used in the query may be a text, string, linguistic language, or a software language. Breaking down the language may involve steps or phases such as lexical or structure analysis, parsing, semantic analysis, discourse integration, and pragmatic analysis. Analyzing and breaking down a language may refer to natural language processing or preprocessing techniques, which can include deconstructing, disassembling, or parsing words, sentences, or other linguistic elements. The analysis may include natural language processing algorithms, using techniques including supervised or unsupervised machine learning, tokenization, tagging, classification, machine translation, topic modeling, named entry recognition, sentiment analysis, lemmatization and stemming, keyword extraction, text mining, or summarization. Keywords may refer to any elements of language that are categorizable or indicative of a broader or common use. As used herein, identifying keywords may refer to using the analysis and breakdown of the language to find commonly used or representative elements. Classify, as used herein, refers to a natural language processing technique that involves labeling or organizing data or elements of a language. Inferring an intent refers to implicit or explicit intent identification to classify elements of language based on what the user wants to achieve, or what the user is perceived to want. Intent extraction, in which an encoder-decoder topology may be commonly used could be a method to infer an intent, for example. Analyzing details associated with the user may refer to personalizing the analysis based on characteristics of a user or user needs. For example, a user may request an AI agent to build an element in the platform for a specific purpose and the AI agent can analyze the input in order to understand the desired element the client wishes it to build and the set of functionalities the AI agent should have access to in order to fulfill the intention behind the input, albeit being absent from the input. For example, analyzing a user query of "write me a paragraph about our project," may involve parsing the words, and performing analyses involving keywords, classification, context and intent inference, and user characterization.

Consistent with some embodiments, details associated with the user include at least one of a user profile, previous queries of the user, an ongoing conversation, a user location, or a combination thereof. A user profile refers to a representation or collection of information associated with a user. For example, a user profile may refer to characteristics of a user which are provided by an AI agent, developer, or the user. In some examples, a user profile may contain identification information including name, address, phone number, or relationships. Previous queries of the user refers to queries the user made in the past. Previous queries may be saved in memory to record the history or behavior of a user and may be associated with the user profile. Previous queries may be utilized or analyzed to improve the user experience with an application. An ongoing conversation may be a discussion with another user, a developer, or an AI agent. For example, ongoing conversation may refer to a chat box, help desk, or email exchange. A user location may be stored and utilized to help make predictions that could improve the overall user experience. For example, a user may want results that are more relevant to their location, and upon moving to another location, may want the results to be reflective of the updated location. In another example, a user profile may include user interface board layouts or table layouts that the user prefers. In yet another example, a user interview may be saved in memory and analyzed for later use in future interviews.

Some disclosed embodiments may involve receiving a response from the selected AI agent and conveying the received response to the user. Receive a response refers to capturing or obtaining the response. Conveying a response refers to expressing, translating, or communicating a response. The response may be conveyed to the user in any manner. In some embodiments, conveying the received response to the user may include displaying the response or a portion of the response on a screen, sending a message to a user's device, or prompting the user by using a message that reflects the response. For example, should a user ask how many interactions were made for a specific provider, the AI bot may scan the database, and/or knowledge databases available thereto, for counting the number of interactions conforming to the question made by the user and provide the real number to the user.

Consistent with some embodiments, the operations further include receiving user feedback on the conveyed response. Receiving may be interpreted consistent with the description of this term elsewhere herein. For example, receiving may include retrieving, acquiring, or otherwise gaining access to the feedback or an indication of the feedback. Receiving may include reading data from a device (e.g., a user interface device) via a wired and/or wireless communications channel. User feedback may include one or more of qualitative or quantitative data relevant to a user experience. For example, the user feedback may include a user's assessment or opinion on the conveyed response from the AI agent. This may allow a user to approve, disapprove, select, or modify the response or AI agent in the application. For example, a user may send a query "generate a sales email" and a selected AI agent may produce a sales email based partially on existing emails, and a user may provide feedback, for example on a satisfaction scale from 1-10. In another example, the system may receive user feedback by allowing the user to select between binary options of thumbs up or thumbs down, as shown in FIG. 12.

FIG. 10 is a flowchart of an exemplary process (1000) for selection operations for improving quality of AI responses, that may be executed by at least one processor. Process 1000 is discussed herein for explanatory purposes and is not intended to be limiting. Process 1000 may represent a non-transitory computer-readable medium, a method, or a system for selection operations for a plurality of distinct AI agents. In some embodiments, steps of process 1000 may be changed, modified, substituted, or rearranged, consistent with the present disclosure. Disclosed embodiments may include at least one processor that may be configured to execute stored instructions for selection operations for a plurality of distinct AI agents. As shown in FIG. 10, process 1000 may include steps 1002, 1004, 1006, 1008, and 1010, as shown, discussed in further detail below. Step 1002 may include accessing an application that employs AI functionality. Step 1004 may include receiving from a user, via the application, a query for which a response is sought from an AI agent. Step 1006 may include analyzing the query for determining a context in the process of selection operations for improving quality of AI responses 1000. Step 1008 may include selecting a particular AI agent from a pool of a plurality of AI agents to which the query should be sent for response based on the context. Step 1010 may include, directing the query to the selected AI agent. An exemplary process of directing the query will be described below with reference to FIG. 105-4.

FIG. 11 is a flowchart of an exemplary process (1100) for directing the query to the selected AI agent. Process 1100 is discussed herein for explanatory purposes and is not intended to be limiting. In some embodiments, steps of process 1100 may be changed, modified, substituted, or rearranged, consistent with the present disclosure. Disclosed embodiments may include at least one processor that may be configured to execute stored instructions for directing the query to the selected AI agent 1010. As shown in FIG. 11, process 1100 may include steps 1010, 1102, 1104, 1106, 1108, 1110, 1112, 1114, and 1116, as shown, discussed in further detail below. Step 1102 may include, receiving a response from the selected AI agent and conveying the received response to the user. Step 1104 may include, receiving user feedback on the conveyed response. Step 1106 may include, calculating a score based on the received user feedback. Step 1108 may include, storing, in a data structure, the query, the response of the selected AI agent, the user feedback and the calculated score. Step 1110 may include, using the calculated score for a future selection of an AI agent from the pool of a plurality of AI agents. Step 1112 may include, when the calculated score is below a predetermined threshold, selecting an alternative AI agent from the pool of a plurality of AI agents, and transmitting the query to the alternative AI agent. Step 1114 may include, running a compliance check on the selected AI agent, using a compliance check plug-in-tool. Additionally, step 1116 of process 1100 may include calculating the score include calculating the score based on the received user feedback and the run compliance check.

Figure 13:
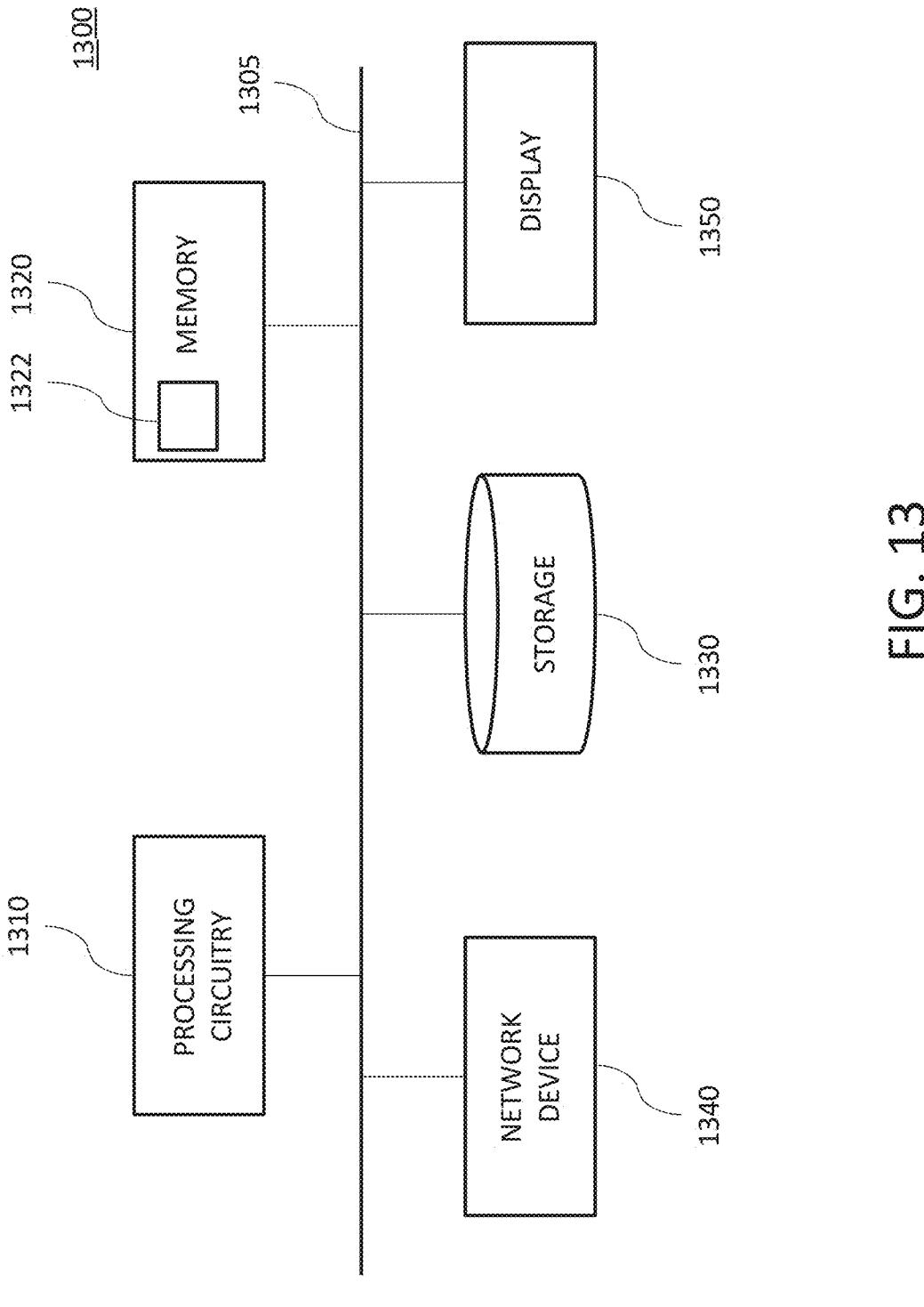
FIG. 13 is a block diagram of an exemplary computing device or system consistent with some embodiments of the present disclosure.

FIG. 13 is a block diagram of an exemplary computing device 1300 consistent with some embodiments. In some embodiments, computing device 1300 may be similar in type and function to user device 1420, discussed with respect to FIG. 14. As shown in FIG. 13 computing device 1300 may include processing circuitry 1310, such as, for example, a central processing unit (CPU). In some embodiments, the processing circuitry 1310 may include, or may be a component of, a larger processing unit implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 1310 may be coupled via a bus 1305 to a memory 1320.

The memory 1320 may further include a memory portion 1322 that may contain instructions that when executed by the processing circuitry 1410, may perform the methods described in more detail herein. The memory 1320 may be further used as a working scratch pad for the processing circuitry 1310, a temporary storage, and others, as the case may be. The memory 1320 may be a volatile memory such as, but not limited to, random access memory (RAM), or non-volatile memory (NVM), such as, but not limited to, flash memory. The processing circuitry 13 10 may be further connected to a network device 1340, such as a network interface card, for providing connectivity between the computing device 1300 and a network, such as a network 1410, discussed in more detail with respect to FIG. 14 below. The processing circuitry 1310 may be further coupled with a storage device 1330. The storage device 1330 may be used for the purpose of storing single data type column-oriented data structures, data elements associated with the data structures, or any other data structures. While illustrated in FIG. 13 as a single device, it is to be understood that storage device 1330 may include multiple devices either collocated or distributed.

The processing circuitry 1310 and/or the memory 1320 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

In some embodiments, computing device 1300 may include one or more input and output devices (not shown in figure). Computing device may also include a display 1350, such a touchscreen display or other display types discussed herein.

Figure 14:
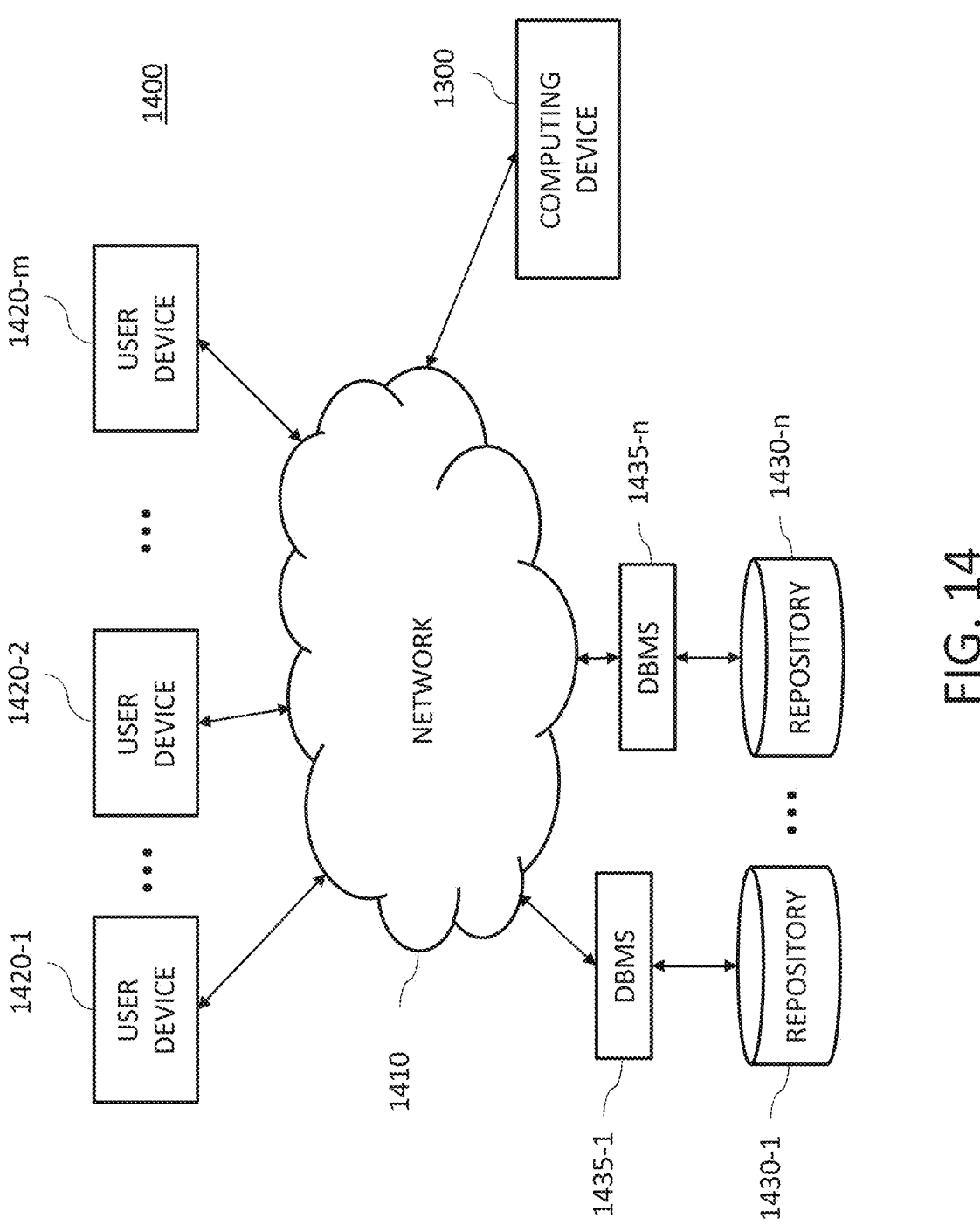
FIG. 14 is a block diagram of an exemplary computing architecture for collaborative work systems consistent with some embodiments of the present disclosure.

FIG. 14 is a block diagram of computing architecture 1400 that may be used in connection with various disclosed embodiments. The computing device 1300, as described in connection with FIG. 13, may be coupled to network 1410. The network 1410 may enable communication between different elements that may be communicatively coupled with the computing device 1300, as further described below. The network 1410 may include the Internet, the world-wide-web (WWW), a local area network (LAN), a wide area network (WAN), a metro area network (MAN), and other networks capable of enabling communication between the elements of the computing architecture 1400. In some disclosed embodiments, the computing device 1300 may be a server deployed in a cloud computing environment.

One or more user devices 1420-1 through user device 1420-m, where 'm' in an integer equal to or greater than 1, referred to individually as user device 1420 and collectively as user devices 1420, may be communicatively coupled with the computing device 1300 via the network 1410. A user device 1420 may be for example, a smartphone, a mobile phone, a laptop, a tablet computer, a wearable computing device, a personal computer (PC), a smart television and the like. A user device 1420 may be configured to send to and receive from the computing device 1300 data and/or meta-data associated with a variety of elements associated with single data type column-oriented data structures, such as columns, rows, cells, schemas, and the like.

One or more data repositories 1430-1 through data repository 1430-n, where 'n' is an integer equal to or greater than 1, referred to individually as data repository 1430 and collectively as data repository 1430, may be communicatively coupled with the computing device 1300 via the network 1410, or embedded within the computing device 1300. Each data repository 1430 may be communicatively connected to the network 1410 through one or more database management services (DBMS) 1435-1 through DBMS 1435-n. The data repository 1430 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network-accessible storage device or a component of the computing device 1300. Furthermore, external third-party application providers such as an AI agent provider 1450 may be communicatively coupled with the computing device 1300 via the network 1410.

The embodiments disclosed herein are exemplary and any other means for performing and facilitating display navigation operations may be consistent with this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from and to transmit data and instructions to, a storage system, at least one input device, and at least one output device.

Although the present disclosure is described with regard to a "computing device", a "computer", or a "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smartwatch or a PDA (personal digital assistant). Any two or more of such devices in communication with each other may optionally include a "network" or a "computer network".

To provide for interaction with a user, the systems and techniques described here can be implemented on a computer having a display device (a LED (light-emitting diode), OLED (organic LED), or LCD (liquid crystal display) monitor/screen) for displaying information to the user and a touch-sensitive layer such as a touchscreen, or keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, software (program codes), or a combination of hardware and software. If implemented by software, it can be stored in the above-described computer-readable media. The software, when executed by the processor can perform the disclosed methods. The computing units and other functional units described in the present disclosure can be implemented by hardware, software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as examples only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer-readable medium containing instructions that when executed by at least one processor cause the at least one processor to perform selection operations for improving quality of Artificial Intelligence responses, the operations comprising:

accessing an application that employs AI functionality, the application including a user interface and a plurality of platform elements, wherein each of the plurality of platform elements is configurable to communicate with at least one of a plurality of AI agents;

receiving from a user, via at least one of the plurality of platform elements, a query for which a response is sought from an AI agent of the plurality of AI agents;

analyzing the query for determining a context;

based on the context, selecting a particular AI agent from a pool of the plurality of AI agents, to which the query should be sent for response, by accessing a repository associating a plurality of contexts with differing AI agents in the pool;

directing the query to the selected AI agent;

receiving a response from the selected AI agent;

modifying, by the application, the received response; and conveying the modified response to the user via the at least one of the plurality of platform elements.

2. The non-transitory computer-readable medium of claim 1, wherein the operations further include receiving user feedback on the conveyed response.

3. The non-transitory computer-readable medium of claim 2, wherein the operations further include calculating a score based on the received user feedback.

4. The non-transitory computer-readable medium of claim 3, wherein the operations further include storing, in a data structure, the query, the response of the selected AI agent, the user feedback and the calculated score.

5. The non-transitory computer-readable medium of claim 3, wherein the operations further include using the calculated score for a future selection of an AI agent from the pool of a plurality of AI agents.

6. The non-transitory computer-readable medium of claim 3, wherein the operations further include, when the calculated score is below a predetermined threshold, selecting an alternative AI agent from the pool of a plurality of AI agents, and transmitting the query to the alternative AI agent.

7. The non-transitory computer-readable medium of claim 3, wherein the operations further include running a compliance check on the selected AI agent, using a compliance check plug-in-tool.

8. The non-transitory computer-readable medium of claim 7, wherein calculating the score include calculating the score based on the received user feedback and the run compliance check.

9. The non-transitory computer-readable medium of claim 3, wherein the calculated score is used to amend a predetermined prompt.

10. The non-transitory computer-readable medium of claim 1, wherein selecting the particular AI agent from the pool of a plurality of AI agents includes accessing historical data on an ability of the particular AI agent to provide satisfactory responses in a context similar to the determined context.

11. The non-transitory computer-readable medium of claim 1, wherein the operations further include accessing a library associating a plurality of queries with the pool of a plurality of AI agents.

12. The non-transitory computer-readable medium of claim 11, wherein selecting the particular AI agent from the pool of a plurality of AI agents, includes selecting from the library the particular AI agent associated with one of the plurality of queries matching the received query.

13. The non-transitory computer-readable medium of claim 1, wherein analyzing the query for determining a context includes at least one of:

analyzing and breaking down a language used in the query;

identifying keywords;

classify the query;

inferring an intent;

analyzing details associated with the user, or a combination thereof.

14. The non-transitory computer-readable medium of claim 13, wherein details associated with the user include at least one of a user profile, previous queries of the user, an ongoing conversation, a user location, or a combination thereof.

15. The non-transitory computer-readable medium of claim 1, wherein the selected AI agent is an hierarchical agent.

16. The non-transitory computer-readable medium of claim 1, wherein the operations further comprise selecting, based on the context, a second particular AI agent from the pool of the plurality of AI agents, to which the query should be sent for response and sending the query to the second particular AI agent.

17. The non-transitory computer-readable medium of claim 16, wherein the operations further comprise receiving a second response from the second particular AI agent, and modifying, by the application, the received second response.

18. The non-transitory computer-readable medium of claim 17, wherein the operations further comprise merging the modified response and the modified second response to produce a merged response.

19. The non-transitory computer-readable medium of claim 1, wherein the plurality of distinct AI agents are operated by one or more other processors, and the at least one processor is communicatively coupled with the one or more other processors via one or more networks.

20. The non-transitory computer-readable medium of claim 1, wherein the context is based in part on information associated with the at least one of the plurality of platform elements, and wherein the context is stored for later use by the application or by the plurality of AI agents.

21. The non-transitory computer-readable medium of claim 1, wherein the at least one of the plurality of platform elements comprises a table, a dashboard, a text document, a workflow manager, or a marketplace application.

22. The non-transitory computer-readable medium of claim 21, wherein the at least one of the plurality of platform elements comprises at least one of a plurality of platform sub-elements, the at least one of a plurality of sub-elements comprising at least one of a column or a cell associated with the table, a widget associated with the dashboard, or a workflow block associated with the workflow manager.

23. A method for improving quality of Artificial Intelligence responses, the method comprising:

accessing an application that employs AI functionality, the application including a user interface and a plurality of platform elements, wherein each of the plurality of platform elements is configurable to communicate with at least one of a plurality of AI agents;

receiving from a user, via at least one of the plurality of platform elements, a query for which a response is sought from an AI agent in the plurality of AI agents;

analyzing the query for determining a context;

based on the context, selecting a particular AI agent from a pool of the plurality of AI agents, to which the query should be sent for response, by accessing a repository associating a plurality of contexts with differing AI agents in the pool;

directing the query to the selected AI agent;

receiving a response from the selected AI agent;

modifying, by the application, the received response; and conveying the modified response to the user via the at least one of the plurality of platform elements.

24. The method of claim 23, wherein the operations further include receiving user feedback on the conveyed response.

25. The method of claim 24, wherein the operations further include calculating a score based on the received user feedback.

26. A system for improving quality Artificial Intelligence responses, the system comprising:

at least one processor configured to:

access an application that employs AI functionality, the application including a user interface and a plurality of platform elements, wherein each of the plurality of platform elements is configurable to communicate with at least one of a plurality of AI agents;

receive from a user, via at least one of the plurality of platform elements, a query for which a response is sought from an AI agent in the plurality of AI agents;

analyze the query for determining a context;

based on the context, select a particular AI agent from the pool of a plurality of AI agents, to which the query should be sent for response, by accessing a repository associating a plurality of contexts with differing AI agents in the pool;

direct the query to the selected AI agent;

receive a response from the selected AI agent;

modify, by the application, the received response; and convey the modified response to the user via the at least one of the plurality of platform elements.

*    *    *    *    *